(12) United States Patent
Min

(10) Patent No.: US 11,423,864 B2
(45) Date of Patent: Aug. 23, 2022

(54) UNDER-DISPLAY SENSOR

(71) Applicant: Hangzhou Single Micro Electronic Co., LTD., Zheijang (CN)

(72) Inventor: Byung Il Min, Zheijang (KR)

(73) Assignee: HANGZHOU SINGLE MICRO ELECTRONIC CO., LTD., Zheijang (CN)

( * ) Notice: Subject to any disclaimer, the term of this patent is extended or adjusted under 35 U.S.C. 154(b) by 0 days.

(21) Appl. No.: 17/248,324

(22) Filed: Jan. 20, 2021

(65) Prior Publication Data

US 2021/0256932 A1 Aug. 19, 2021

(30) Foreign Application Priority Data

Jan. 21, 2020 (WO) ............... PCT/CN2020/073635
Apr. 26, 2020 (WO) ............... PCT/CN2020/087075
Nov. 18, 2020 (CN) ........................ 202011298797.X
Jan. 12, 2021 (CN) .......................... 202110037625.5

(51) Int. Cl.
| | |
|---|---|
| *G06F 3/038* | (2013.01) |
| *G09G 5/10* | (2006.01) |
| *H04N 9/04* | (2006.01) |
| *G02B 5/30* | (2006.01) |

(52) U.S. Cl.
CPC ............ *G09G 5/10* (2013.01); *G02B 5/3025* (2013.01); *H04N 9/04557* (2018.08); *G09G 2360/142* (2013.01); *G09G 2360/144* (2013.01); *G09G 2370/04* (2013.01)

(58) Field of Classification Search
CPC ............... G09G 5/10; G09G 2360/142; G09G 2360/144; G09G 2370/04; G02B 5/3025; G02B 27/283; H04N 9/04557; H04N 9/04555; G01J 1/4204
See application file for complete search history.

(56) References Cited

U.S. PATENT DOCUMENTS

| | | | |
|---|---|---|---|
| 9,612,152 B2 | 4/2017 | Dejong et al. | |
| 10,777,623 B2 | 9/2020 | Rhee et al. | |
| 2019/0079236 A1 | 3/2019 | Hung | |
| 2020/0191648 A1* | 6/2020 | Wang | ................... G09G 3/3208 |

FOREIGN PATENT DOCUMENTS

JP 2009229908 10/2009

* cited by examiner

*Primary Examiner* — Adam R. Giesy
(74) *Attorney, Agent, or Firm* — Kevin J. Carroll; Grossman, Tucker, Perreault & Pfleger PLLC

(57) ABSTRACT

Under-display sensor disclosed. The under-display sensor includes a light selection layer, having a first optical path and a second optical path through which a display circularly-polarized light generated by an ambient light and an unpolarized light generated by a pixel pass, and an optical sensor, having a first receiver configured for measuring light that has passed the first optical path and a second receiver configured for measuring light that has passed the second optical path, wherein the first optical path passes all of the display circularly-polarized light and the unpolarized light, wherein the second optical path blocks the display circularly-polarized light and passes the unpolarized light.

36 Claims, 33 Drawing Sheets

UNDER-DISPLAY SENSOR

FIELD

The present invention relates to an under-display sensor.

BACKGROUND

The illuminance sensor is used not only in portable electronic devices such as mobile phones and tablets, but also in image electronic devices such as TVs and monitors. The illuminance sensor is a sensor that measures the brightness around an electronic device. In recent years, designs in which displays occupy almost the entire front of an electronic device are increasing. Although the size of the display increases according to the demand for a large screen, at least a portion of the front surface must still be secured in order to place a camera, in particular, the illuminance sensor. Proximity sensors using ultrasonic waves or the like can be applied to a display occupying the entire front, but it is difficult to integrate an illuminance sensing function. Meanwhile, although the illuminance sensor may be located in an area other than the front surface, it may be impossible to detect ambient light due to a case for protecting the electronic device. Therefore, the most ideal position where the illuminance sensor can be installed is the front of the electronic device, but in a design where the display occupies the entire front, it is difficult to secure a position to place a commercially-available proximity-illuminance sensor.

SUMMARY

It is intended to provide an under-display sensor applicable to electronic devices with a design in which the display occupies the entire front.

There is provided an under-display sensor of measuring brightness of ambient light and being disposed under a display having a pixel configured for generating light, and a display retardation layer and a display polarization layer, both being disposed over the pixel. The under-display sensor includes a light selection layer, having a first optical path and a second optical path through which a display circularly-polarized light generated by an ambient light and an unpolarized light generated by a pixel pass, and an optical sensor, having a first receiver configured for measuring light that has passed the first optical path and a second receiver configured for measuring light that has passed the second optical path, wherein the first optical path passes all of the display circularly-polarized light and the unpolarized light, wherein the second optical path blocks the display circularly-polarized light and passes the unpolarized light.

In one embodiment, the light selection layer may include a first sensor retardation layer, having a first slow axis and extending in a first direction, a second sensor retardation layer, being alternately disposed with the first sensor retardation layer, having a second slow axis perpendicular to the first slow axis, and extending in the first direction, a first sensor polarization layer, being disposed under the first sensor retardation layer and the second sensor retardation layer, configured for forming the first optical path under the first sensor retardation layer and the second optical path under the second sensor retardation layer, and extending in a second direction, and a second sensor polarization layer, being alternately disposed with the first sensor polarization layer under the first sensor retardation layer and the second sensor retardation layer, configured for forming the second optical path under the first sensor retardation layer and the first optical path under the second sensor retardation layer, and extending in the second direction.

In one embodiment, the light selection layer may include a first sensor retardation layer, a first sensor polarization layer, configured for forming the first optical path under the first sensor retardation layer, and a second sensor polarization layer, configured for forming the second optical path under the first sensor retardation layer, wherein the first sensor polarization layer and the second sensor polarization layer are disposed in a zigzag arrangement.

In one embodiment, the light selection layer may include a first sensor retardation layer, having a first slow axis, a second sensor retardation layer, having a second slow axis perpendicular to the first slow axis, and a sensor polarization layer, configured for forming the first optical path under the first sensor retardation layer and the second optical path under the second sensor retardation layer, wherein the first sensor retardation layer and the second sensor retardation layer are disposed in a zigzag arrangement.

In one embodiment, the light selection layer may include a first sensor retardation layer, having a first slow axis and extending in a second direction, a second sensor retardation layer, being alternately disposed with the first sensor retardation layer, having a second slow axis orthogonal to the first slow axis, and extending in the second direction, and a first sensor polarization layer, being disposed under the first sensor retardation layer and the second sensor retardation layer, and configured for forming the first optical path under the first sensor retardation layer and the second optical path under the second sensor retardation layer.

In one embodiment, the light selection layer may include a first sensor retardation layer, a first sensor polarization layer, configured for forming the first optical path under the first sensor retardation layer, and a second sensor polarization layer, being alternately disposed with the first sensor polarization layer, and configured for forming the second optical path under the first sensor retardation layer.

In one embodiment, the light selection layer may include a first sensor retardation layer, a first light transmission layer, being alternately disposed with the first sensor retardation layer, a second sensor polarization layer, configured for forming the second optical path under the first sensor retardation layer, and a second light transmission layer, being disposed under the first light transmission layer.

In one embodiment, the first receiver is configured for measuring a first sensor linearly-polarized light derived from the display circularly-polarized light and a second sensor linearly-polarized light derived from the unpolarized light, and the second receiver is configured for measuring a third sensor linearly-polarized light derived from the unpolarized light.

In one embodiment, the under-display sensor may further include a color filter layer, interposed between the light selection layer and the optical sensor, and configured for passing light that has passed the first optical path and the second optical path for each wavelength band, wherein the first receiver and the second receiver are configured for measuring light in the same wavelength band.

In one embodiment, the color filter layer may include a plurality of repeated unit color patterns, wherein the unit color pattern is composed of 2n×N (n, N are natural numbers greater than 1, N is the number of types of color filter) color filters, wherein the unit color pattern comprise 2n same-type color filter.

In one embodiment, the first receiver in the unit color pattern is disposed under n of 2n same-type color filters and the second receiver in the unit color pattern is disposed under remaining n same-type color filters, respectively.

In one embodiment, two same-type color filters in the unit color pattern are disposed to contact each other.

In one embodiment, two same-type color filters in the unit color pattern are disposed to be spaced apart.

In one embodiment, the optical sensor measures the brightness of light for each of N wavelength bands by use of N types of color filters.

In one embodiment, a plurality of the first receivers and a plurality of the second receivers respectively measure the brightness of light from a sensor detection region defined on a bottom surface of the display, wherein a plurality of measurements are used to calculate an average brightness of light from the sensor detection region.

In one embodiment, the under-display sensor may further include a color filter layer, interposed between the light selection layer and the optical sensor, and having a plurality of single color filters configured for passing light that has passed the first optical path and the second optical path for each wavelength band, wherein a plurality of the first receivers and a plurality of second receivers are disposed under the single color filter.

In one embodiment, the plurality of single color filters may include a red color filter, configured for passing light belonging to a red wavelength band, a green color filter, configured for passing light belonging to a green wavelength band, and a blue color filter, configured for passing light belonging to a blue wavelength band.

In one embodiment, the optical sensor measures brightness of light for each of a plurality of wavelength bands by use of the plurality of single color filters.

In one embodiment, a unit transmission pattern composed of the first optical path and the second optical path defined by the light selection layer is repeated under each of the plurality of single color filters.

In one embodiment, the unit transmission pattern is composed of two first optical paths and two second optical paths, wherein same type of optical paths are disposed diagonally.

In one embodiment, the unit transmission pattern is composed of two first optical paths and two second optical paths, wherein same type of optical paths are disposed to contact each other.

In one embodiment, the unit transmission pattern is composed of one first optical path and one second optical path.

In one embodiment, the plurality of the first receivers and the second receivers located in a same color receiving area receive light from a same pixel region on a pixel layer of the display.

In one embodiment, the plurality of the first receivers and the second receivers respectively measure brightness of light from the same pixel region, wherein a plurality of measurements are used to calculate an average brightness of light from the same pixel region.

In one embodiment, the first receiver and the second receiver are respectively located in at least two chips that are physically separated, wherein the under-display sensor is simultaneously driven under the control of a controller when at least two chips are connected to the controller through $I^2C$ communication.

In one embodiment, each of the two or more chips may include an enable input/output pad, an $I^2C$ communication unit configured for receiving a first register value designating any one of a master chip and a slave chip and a second register value indicating an operating start from the controller through a data line, a register/memory configured for storing the first register value in a first register address and storing the second register value in a second register address, and a peripheral circuit configured for outputting an operating standby signal through the enable input/output pad when set as the master chip by the first register value, and configured for outputting an operating start signal through the enable input/output pad based on the second register value.

In one embodiment, when set as the slave chip by the first register value, the peripheral circuit is configured for receiving the operating standby signal through the enable input/output pad, and is configured for starting when receiving the operating start signal through the enable input/output pad.

In one embodiment, the under-display sensor may further include a clock input/output pad for providing an operating clock to another chip connected through the $I^2C$ communication when set as a clock master by the controller, and is configured for receiving the operating clock from one of the other chips or from an external device when set as a clock slave.

In one embodiment, the under-display sensor may further include a clock generator configured for generating the operating clock to be outputted through the clock input/output pad.

In one embodiment, the two or more chips start operating at a same operating start time and operating end at a same operating end time.

In one embodiment, each of the two or more chips may include an $I^2C$ communication unit configured for receiving a register value designating any one of a master chip and a slave chip from the controller through a data line, and configured for monitoring an operating start of the slave chip through the data line, a register/memory for storing the register value, and a peripheral circuit configured for starting when set as the master chip by the register value and the slave chip being monitored starts operating.

In one embodiment, when set to the master chip by the register value, the $I^2C$ communication unit is configured for storing a chip address of the slave chip provided by the controller, capturing a chip address being transmitted through the data line and comparing the stored chip address with the capture chip address, if the captured chip address is the same as the stored chip address, capturing a register address being transmitted to the slave chip, and comparing the captured register address with a register address in which a register value indicating the operating start is stored, wherein the master chip does not transmit a response signal to the controller even if the captured chip address is the same as the stored chip address.

In one embodiment, the peripheral circuit is configured for starting when the captured register address is the register address in which the register value indicating the operating start is stored.

In one embodiment, the $I^2C$ communication unit is configured for capturing the register value being transmitted to the slave chip, if the captured register address is the register address in which the register value indicating operating start is to be stored, wherein the peripheral circuit is configured for starting when the captured register value is the register value indicating the operating start.

In one embodiment, when the controller transmits an operating start command, the peripheral circuit waits until the slave chip starts operating.

In one embodiment, the under-display sensor may further include a clock input/output pad for providing an operating clock to another chip connected through the $I^2C$ communication when set as a clock master by the controller, and is configured for receiving the operating clock from one of the other chips or from an external device when set as a clock slave.

The under-display sensor according to embodiments of the present invention can be applicable to electronic devices with a design in which the display occupies the entire front.

BRIEF DESCRIPTION OF THE DRAWINGS

Hereinafter, embodiments of the invention will be described with reference to the accompanying drawings. For the purpose of easy understanding of the invention, the same elements will be referred to by the same reference signs. Configurations illustrated in the drawings are examples for describing the invention, and do not restrict the scope of the invention. Particularly, in the drawings, some elements are slightly exaggerated for the purpose of easy understanding of the invention. Since the drawings are used to easily understand the invention, it should be noted that widths, thicknesses, and the like of elements illustrated in the drawings might change at the time of actual implementation thereof.

DETAILED DESCRIPTION

Figure 1:
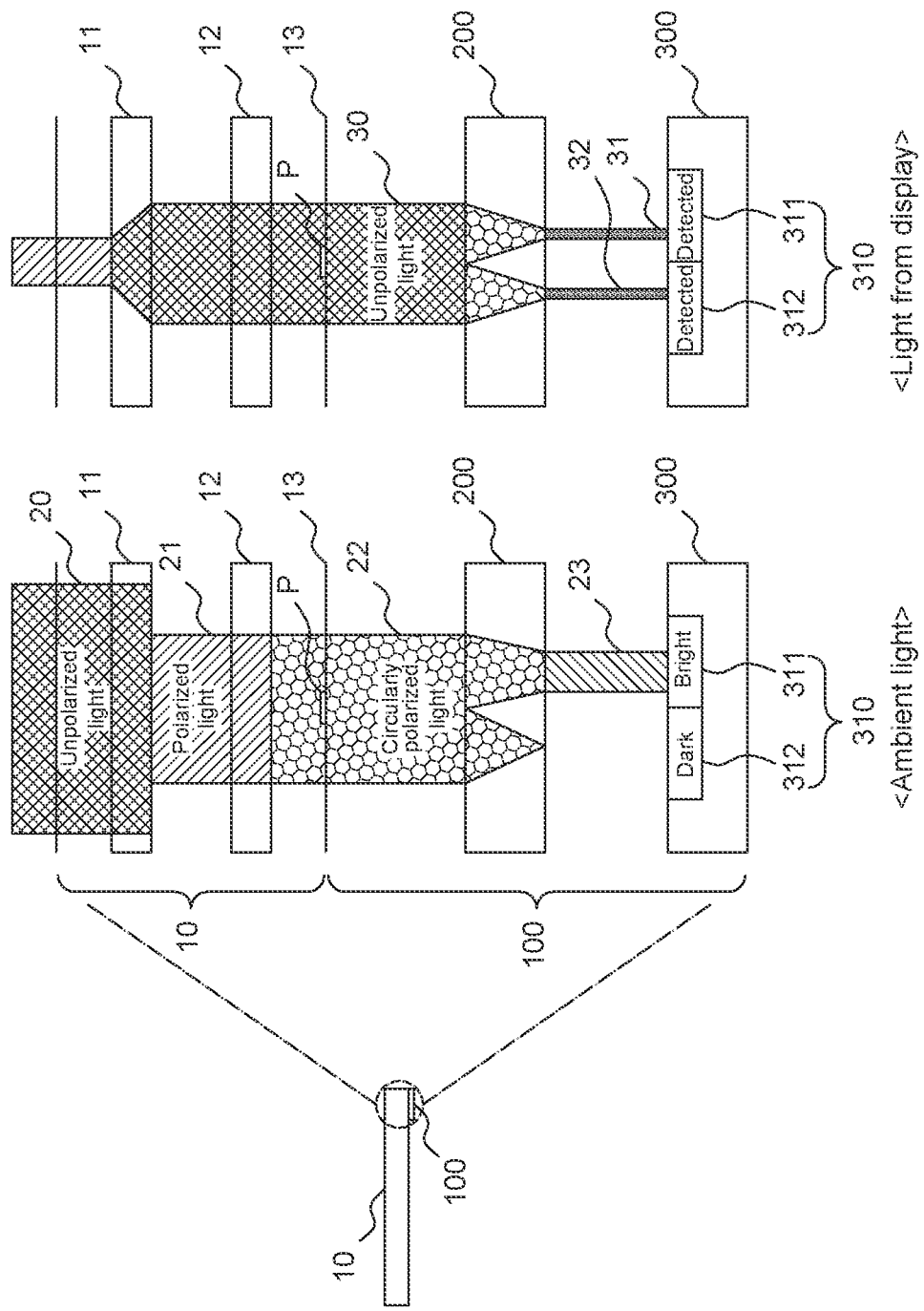
FIG. 1 exemplarily illustrates the mechanism of under-display sensor.

Embodiments which will be described below with reference to the accompanying drawings can be implemented singly or in combination with other embodiments. But this is not intended to limit the present invention to a certain embodiment, and it should be understood that all changes, modifications, equivalents or replacements within the spirits and scope of the present invention are included. Especially, any of functions, features, and/or embodiments can be implemented independently or jointly with other embodiments. Accordingly, it should be noted that the scope of the invention is not limited to the embodiments illustrated in the accompanying drawings.

On the other hand, among terms used in this specification, terms such as "substantially," "almost," and "about" are used to take consideration of a margin or an error at the time of actual embodiment. For example, "substantially 90 degrees" should be construed to include angles at which the same advantages as at 90 degrees can be expected. For example, "almost zero" should be construed to include a quantity which is slightly present but is ignorable.

On the other hand, unless otherwise mentioned, "side" or "horizontal" is used to mention a right-left direction in the drawings, and "vertical" is used to mention an up-down direction in the drawings. Unless otherwise defined, an angle, an incidence angle, and the like are defined with respect to a virtual straight line perpendicular to a horizontally flat surface illustrated in the drawings.

Throughout the accompanying drawings, the same or similar elements are referred to using the same reference numerals.

FIG. 1 exemplarily illustrates the mechanism of under-display sensor.

The under-display sensor 100 is disposed under the display 10. The display 10 includes a pixel layer 13 on which a plurality of pixels P configured for generating light are formed, a display polarization layer 11 and a display retardation layer 12 stacked above the pixel layer 13. On the bottom of the display 10, in order to protect the display polarization layer 11, the display retardation layer 12, and the pixel layer 13, a protective layer formed of a light-opaque material, for example, metal or synthetic resin, may be provided. In one embodiment, the under-display sensor 100 composed of a light selection layer 200 and the optical sensor 300 may be disposed in a region in which a part of the protective layer has been removed (hereinafter, 'completed structure'). In another embodiment, the light selection layer 200 of the under-display sensor 100 may be manufactured in the form of a film and attached to the bottom surface of the display 10. The optical sensor 300 may be attached to the bottom surface of the light selection layer 200 to implement an under-display sensor (hereinafter, 'assembled structure'). Hereinafter, in order to avoid duplication of description, a description will be given focusing on the completed structure.

The display polarization layer 11 and the display retardation layer 12 improve the visibility of the display 10. Ambient light 20 incident through an upper surface of the display 10 is unpolarized light. When the ambient light 20 is incident on the upper surface of the display polarization layer 11, only display linearly-polarized light 21 substantially coincident with a polarization axis of the display polarization layer 11 passes through the display polarization layer 11. When the display linearly-polarized light 21 has passed through the display retardation layer 12, it becomes a display circularly-polarized light (or elliptically-polarized light) 22 that rotates clockwise or counterclockwise. When the display circularly-polarized light 22 is reflected by the pixel layer 13 and incident on the display retardation layer 12 again, it becomes the reflected linearly-polarized light. If the polarization axis of the display retardation layer 12 is inclined by about 45 degrees with respect to a slow axis, the polarization axis of the display linearly-polarized light 21 and the polarization axis of the reflected linearly-polarized light are perpendicular to each other. For this reason, the reflected linearly-polarized light, that is, ambient light reflected by the pixel layer 13 is blocked by the display polarization layer 11 and is prevented from going out of the display. Accordingly, the visibility of the display 10 may be improved.

The unpolarized light 30 generated by the pixel P propagates toward the bottom surface as well as the upper surface of the display 10. In addition, a portion of the unpolarized light 30 that has propagated toward the upper surface is reflected inside the display 10 and propagates toward the bottom surface again. Unlike the display circularly-polarized light 22, the unpolarized light 30 passes through the display retardation layer 12 as it is, becomes a linearly-polarized light by the display polarization layer 11 and goes out of the display.

The under-display sensor 100 includes a light selection layer 200 having two optical paths and an optical sensor 300 that measures light that has passed through each optical path. Light incident on the under-display sensor 100 is the display circularly-polarized light 22 derived from ambient light and the unpolarized light 30 that is generated inside the display. The first optical path and the second optical path in the light selection layer 200 act differently for the display circularly-polarized light 22 and the unpolarized light 30. The first optical path passes both the display circularly-polarized light 22 and the unpolarized light 30. On the other hand, the second optical path passes the unpolarized light 30 and substantially blocks the circularly polarized display 22. The display circularly-polarized light 22 that has passed through the first optical path becomes the first sensor linearly-polarized light 23, and the unpolarized light 30 that has passed through the first optical path and the second optical path becomes the second sensor linearly-polarized light 31 and the third sensor linearly-polarized light 32.

The optical sensor 300 includes the first receiver 311 corresponding to the first optical path and the second receiver 312 corresponding to the second optical path. For example, the first receiver 311 generates the first pixel current that is substantially proportional to the intensity of light of the first sensor linearly-polarized light 23 and the second sensor linearly-polarized light 31, and the second receiver 312 generates the second pixel current that is substantially proportional to the intensity of light of the third sensor linearly-polarized light 32. The receiver 311 or 312 may be composed of, for example, one photodiode or a plurality of photodiodes (hereinafter, PD array). In one embodiment, one or two photodiodes may correspond to one pixel P. In another embodiment, the PD array may correspond to one pixel P. In still another embodiment, one or two photodiodes may correspond to a plurality of pixels P. In still another embodiment, the PD array may correspond to a plurality of pixels P. Here, the first and second receivers 311, 312 may commonly measure any one of light belonging to different wavelength bands, such as red, green, blue, and white.

The illuminance sensor is a device for measuring the brightness of ambient light, and the color sensor is a device for measuring the brightness of ambient light for each of two or more wavelength bands. When the illuminance sensor and/or the color sensor is disposed under the display, not only ambient light that has passed through the display but also light generated inside the display may be incident on the sensor. Therefore, in order for the illuminance sensor to accurately measure the brightness of ambient light, and for the color sensor to individually and at the same time accurately measure the brightness of ambient light belonging to at least two or more wavelength bands, it is necessary to measure the brightness of light generated inside the display. If only the brightness of light generated inside the display can be measured, the measured brightness of ambient light can be corrected using this. The structure illustrated in FIG. 1 is commonly applied to the under-display illuminance sensor and the under-display color sensor. The under-display color sensor further includes a color filter layer applied to the structure illustrated in FIG. 1.

As described above, the second and third sensor linearly-polarized lights 31, 32 derived from the unpolarized light 30 may be measured by the first receiver 311 and the second receiver 312, respectively. In particular, since the sensor internal linearly-polarized light derived from the display circularly-polarized light 22 is not substantially incident on the second receiver 312, the second receiver 312 can measure only the brightness of the third sensor linearly-polarized light 32 derived from the unpolarized light 30. Meanwhile, as will be described in detail below, the brightness of the second and third sensor linearly-polarized lights 31, 32 may be substantially the same, but, conversely, may be different.

However, since the second and third sensor linearly-polarized lights 31, 32 are derived from the unpolarized light 30 generated by one or a plurality of pixels, a linear proportional relationship or a nonlinear proportional relationship is established in the brightness between the two. The nonlinear proportional relationship may be due to various causes such as structural characteristics of the display 10, differences in pixel regions corresponding to each receiver, and a wavelength band of the unpolarized light 30. The proportional relationship between the second and third sensor linearly-polarized lights 31, 32 may be measured in an environment not affected by ambient light. According to the proportional relationship, the degree to which the second sensor linearly-polarized light 31 contributes to the brightness measured by the first receiver 311 can be calculated from the brightness of the third sensor linearly-polarized light 32 measured by the second receiver 312. Through this, it is possible to independently and accurately measure the brightness of light for different wavelength bands.

Hereinafter, throughout the accompanying drawings, the hatching line indicated on the retardation layer indicates the direction of the slow axis, and the hatching line indicated on the polarization layer exemplarily indicates the direction of the polarization axis with respect to the slow axis extending in the horizontal direction. Meanwhile, it is shown that both the slow axis of the display retardation layer and the slow axis of the sensor retardation layer extend in the horizontal direction, or the slow axis of the display retardation layer and the slow axis of the sensor retardation layer extend in the vertical direction. It should be understood that this is merely a simple expression to aid understanding, and it is not necessary to align the slow axis of the sensor retardation layer with the slow axis of the display retardation layer. On the other hand, in order to simplify the drawing, with respect to the unpolarized light from the pixel P, only light that has passed through the light selection layer is displayed.

Figure 2:
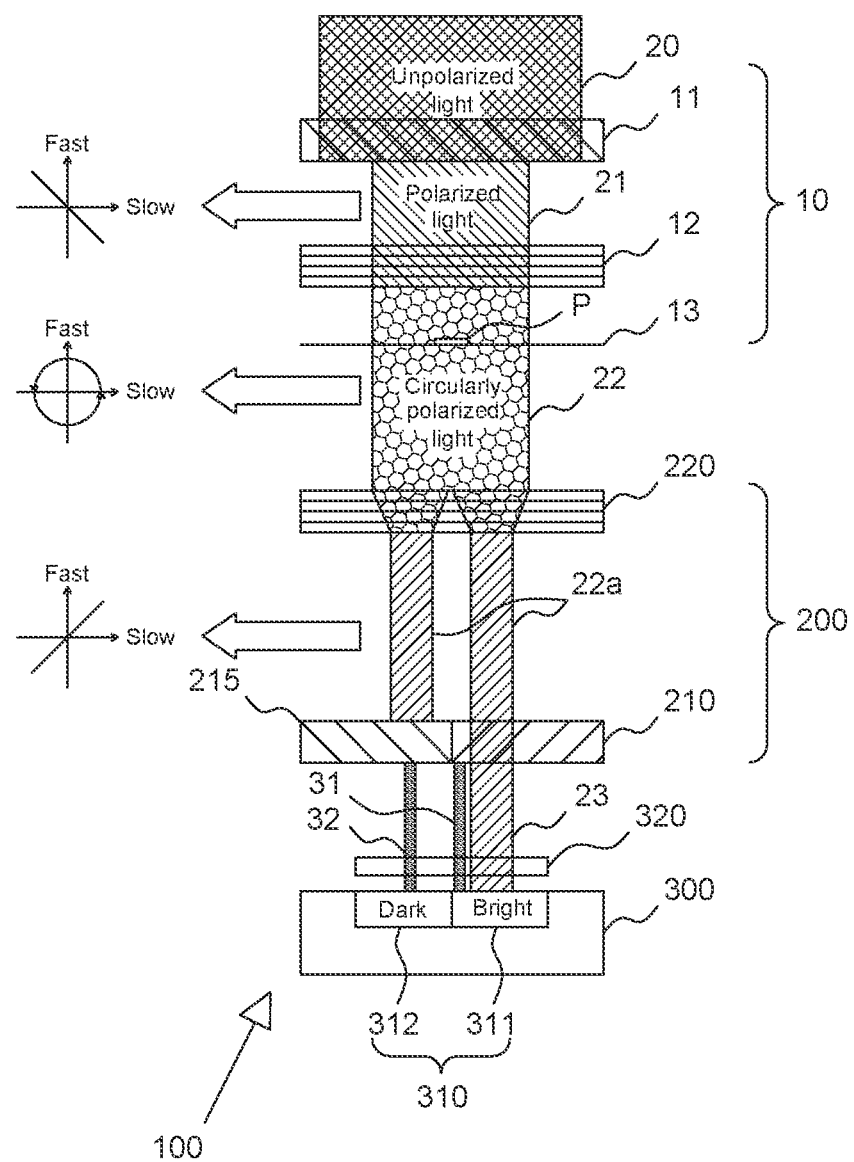
FIG. 2 exemplarily illustrates one embodiment of under-display sensor.

FIG. 2 exemplarily illustrates one embodiment of under-display sensor.

The under-display sensor 100 includes the light selection layer 200 and the optical sensor 300. The light selection layer 200 includes the first sensor retardation layer 220, the first sensor polarization layer 210, and the second sensor polarization layer 215. The first sensor retardation layer 220 is disposed over the first sensor polarization layer 210 and the second sensor polarization layer 215, and the optical sensor 300 is disposed under the first sensor polarization layer 210 and the second sensor polarization layer 215. The under-display color sensor may further include a color filter layer 320 that is interposed between the first sensor polarization layer 210 and the second sensor polarization layer 215 and the optical sensor 300, and defines a wavelength band of light to be incident on the receiver 310. The receiver 310 of the optical sensor 300 includes the first receiver 311 and the second receiver 312. The first receiver 311 is disposed under the first sensor polarization layer 210, and the second receiver 312 is disposed under the second sensor polarization layer 215. In one embodiment, the light selection layer 200 may be manufactured by stacking the first sensor retardation layer 220 on the upper surfaces of the first sensor polarization layer 210 and the second sensor polarization layer 215. The light selection layer 200 may be attached to the bottom surface of the display 10. The optical sensor 300 may be attached to the bottom surface of the light selection layer 200. In another embodiment, the optical sensor 300 may be implemented with a thin film transistor. Accordingly, the under-display sensor 100 may be manufactured by stacking the first sensor retardation layer 220, the first and second sensor polarization layers 110, 115, and the optical sensor 300, all in the form of a film.

The polarization axis of the first sensor polarization layer 210 and the polarization axis of the second sensor polarization layer 215 are inclined at different angles with respect to the slow axis of the first sensor retardation layer 220. The polarization axis of the first sensor polarization layer 210 is inclined at the first angle, for example, +45 degrees with respect to the slow axis of the first sensor retardation layer 220, and the polarization axis of the second sensor polarization layer 215 is inclined at the second angle, for example, −45 degrees with respect to the slow axis of the first sensor retardation layer 220.

The first receiver 311 of the optical sensor 300 measures the first sensor linearly-polarized light 23 and the second sensor linearly-polarized light 31 from the first sensor polarization layer 210, and the second receiver 312 measures the third sensor linearly-polarized light 32 from the second sensor polarization layer 215. In the under-display illuminance sensor, the receivers 310 may generate the pixel current having size corresponding to the intensity of measured light. Meanwhile, in the under-display color sensor, since the first sensor linearly-polarized light 23, the second sensor linearly-polarized light 31, and the third sensor linearly-polarized light 32 pass through the color filter layer 320, it is possible for the receiver 310 to generate pixel currents corresponding to the intensitys of light in each wavelength band. The receiver 310 may be, for example, a photodiode, but is not limited thereto.

The color filter layer 320 is interposed between the optical sensor 300 and the light selection layer 200. The color filter layer 320 may include, for example, red R, green G, blue B, and white W filters. Each color filter may be disposed substantially vertically over the first receiver 311 or the second receiver 312. The color filter passes light belonging to a specific wavelength band and blocks light that does not belong to the specific wavelength band.

Hereinafter, the operation of the under-display sensor 100 having the light selection layer 200 having the above-described structure will be described.

The display circularly-polarized light 22 and unpolarized light (not shown; 30 in FIG. 1) are incident on the upper surface of the light selection layer 200, that is, the upper surface of the first sensor retardation layer 220. The display circularly-polarized light 22 is the ambient light 20 that has passed through the display polarization layer 11 and the display retardation layer 12, and the unpolarized light 30 propagates downwardly from the pixel P toward the light selection layer 200.

The display polarization layer 11 may have the polarization axis inclined at the second angle, for example, −45 degrees with respect to the slow axis of the display retardation layer 12. Accordingly, the display linearly-polarized light 21 that has passed through the display polarization layer 11 may be incident at the second angle with respect to the slow axis of the display retardation layer 12. When the first polarization element of the display linearly-polarized light 21 projected along the fast axis and the second polarization element of the display linearly-polarized light 21 projected along the slow axis pass through the display retardation layer 12, a phase difference λ/4 occurs between them. For this reason, the linearly-polarized light 21 that has passed through the display retarder 12 may become the display circularly-polarized light 22 rotating in a counter-clockwise direction.

The display circularly-polarized light 22 having the phase difference of λ/4 between the fast axis and the slow axis becomes the sensor internal linearly-polarized light 22a by the first sensor retardation layer 220. The polarization axis of the sensor internal linearly-polarized light 22a and the polarization axis of the display linearly-polarized light 21 of the display become perpendicular to each other. Meanwhile, the unpolarized light 30 passes through the first sensor retardation layer 220 as it is.

Since the polarization axis of the first sensor polarization layer 210 and the polarization axis of the sensor internal linearly-polarized light 22a are substantially parallel, the sensor internal linearly-polarized light 22a from the first sensor retardation layer 220 can pass through the first sensor polarization layer 210. On the other hand, since the polarization axis of the second sensor polarization layer 215 is substantially perpendicular to the polarization axis of the sensor internal linearly-polarized light 22a, the sensor internal linearly-polarized light 22a may be blocked by the second sensor polarization layer 215. The unpolarized light 30 from the sensor retardation layer 220 has passed through the first sensor polarization layer 210 and the second sensor polarization layer 215, respectively, and becomes the second sensor linearly-polarized light 31 and the third sensor linearly-polarized light 32. In the under-display color sensor, the first sensor linearly-polarized light 23, the second sensor linearly-polarized light 31 and the third sensor linearly-polarized light 32 have passed through the same type of color filter (hereinafter, the same-type color filter), and are incident on the sensor 300. That is, through the first optical path composed of the first sensor retardation layer 220-the first sensor polarization layer 210, the first receiver 311 may be configured for measuring the first sensor linearly-polarized light 23 and the second sensor linearly-polarized light 31, and through the second optical path composed of the first sensor retardation layer 220-the second sensor polarization layer 215, the second receiver 312 may be configured for measuring the third sensor linearly-polarized light 32.

Figure 3:
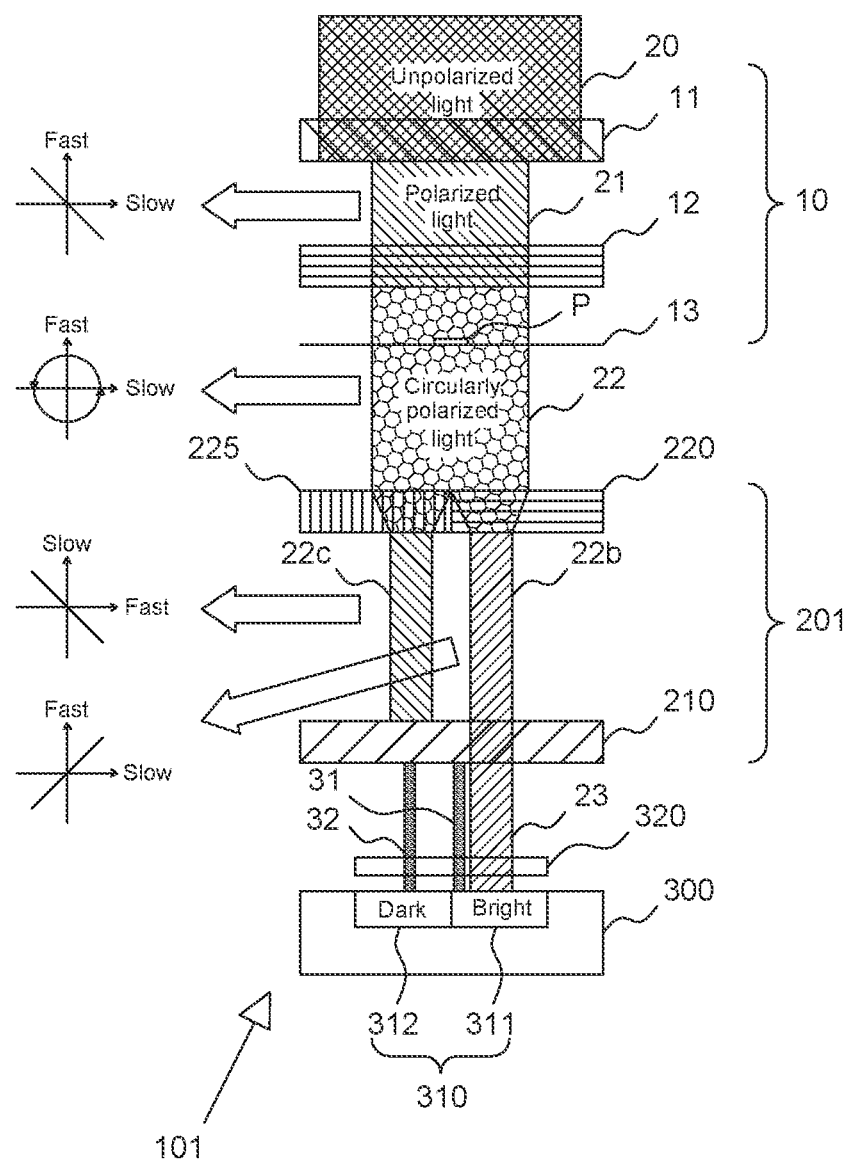
FIG. 3 exemplarily illustrates another embodiment of under-display sensor.

FIG. 3 exemplarily illustrates another embodiment of under-display sensor.

The under-display sensor 101 includes a light selection layer 201 and the optical sensor 300. The light selection layer 201 includes the first sensor retardation layer 220, the second sensor retardation layer 225, and the first sensor polarization layer 210. The first sensor retardation layer 220 and the second sensor retardation layer 225 are disposed over the first sensor polarization layer 210, and the optical sensor 300 is disposed under the first sensor polarization layer 210. The under-display color sensor may further include the color filter layer 320 that is interposed between the first sensor polarization layer 210 and the optical sensor 300 and defines wavelength bands of light to be incident on the receiver 310. The first receiver 311 of the optical sensor 300 is disposed at a position where the light from the first sensor retardation layer 220 reaches after passing through the first sensor polarization layer 210, and the second receiver 312 is disposed at a position where light from the second sensor retardation layer 225 reaches after passing through the first sensor polarization layer 210. In one embodiment, the light selection layer 201 may be manufactured by stacking the first sensor retardation layer 220 and the second sensor retardation layer 225 on the upper surface of the first sensor polarization layer 210. The light selection layer 201 may be attached to the bottom surface of the display 10. The optical sensor 300 may be attached to the bottom surface of the light selection layer 201. In another embodiment, the optical sensor 300 may be implemented with the thin film transistor. Accordingly, the under-display sensor 101 may be manufactured by staking the first and second sensor retardation layers 220, 225, the first sensor polarization layer 210, and the optical sensor 300, all in the form of the film.

The slow axis of the first sensor retardation layer 220 and the slow axis of the second sensor retardation layer 225 are substantially perpendicular to each other. The polarization axis of the first sensor polarization layer 210 may be inclined at the first angle, for example, +45 degrees with respect to the slow axis of the first sensor retardation layer 220, or may be inclined at the second angle, for example, −45 degrees with respect to the slow of the second sensor retardation layer 215.

The first receiver 311 of the optical sensor 300 is disposed vertically under the first sensor retardation layer 220 so that first sensor linearly-polarized light 23 and the second sensor linearly-polarized light 31 derived from the display circularly-polarized light 22 that has passed the first sensor retardation layer 220 are measured. The second receiver 312 of the optical sensor 300 is disposed vertically under the second sensor retardation layer 225 to measure the third sensor linearly-polarized light 32. The receivers 311, 312 may generate the pixel currents corresponding to the intensity of measured light. In the under-display color sensor, the receiver 310 may generate the pixel currents corresponding to the intensity of light for each wavelength band. The receiver 310 may be, for example, the photodiode, but is not limited thereto.

The color filter layer 320 is interposed between the optical sensor 300 and the light selection layer 200. In detail, the color filter layer 320 may include, for example, red R, green G, blue B, and white W filters. Each color filter may be disposed substantially vertically over the first receiver 311 or the second receiver 312. The color filter passes light belonging to a specific wavelength band and blocks light that does not belong to the specific wavelength band.

Hereinafter, the operation of the under-display sensor 101 having the light selection layer 201 having the above-described structure will be described. The description of the display circularly-polarized light 22 and the unpolarized light 30 is the same as that of FIG. 2, and thus will be omitted.

The display circularly-polarized light 22 and unpolarized light (not shown; 30 in FIG. 1) are incident on the upper surface of the light selection layer 201, that is, the upper surfaces of the first sensor retardation layer 220 and the second sensor retardation layer 225. The display circularly-polarized light 22 having the phase difference of λ/4 between the fast axis and the slow axis becomes the first sensor internal linearly-polarized light 22b by the first sensor retardation layer 220, and becomes the second sensor internal linearly-polarized light 22c by the second sensor retardation layer 225. Since the slow axis of the first sensor retardation layer 220 and the slow axis of the second sensor retardation layer 225 are perpendicular to each other, the polarization axis of the first sensor internal linearly-polarized light 22b and the second sensor internal linearly-polarized light 22c may be also perpendicular to each other. In detail, the display circularly-polarized light 22 having the phase difference of λ/4 between the first polarization element and the second polarization element may become, by adding a phase difference of λ/4 by the first sensor retardation layer 220, the second sensor internal linearly-polarized light 22b having the polarization axis perpendicular to the polarization axis of the display linearly-polarized light 21. On the other hand, since the phase difference is eliminated by the second sensor retardation layer 225, the display circularly-polarized light 22 may become the second sensor internal linearly-polarized light 22c having the polarization axis substantially parallel to the polarization axis of the display linearly-polarized light 21. Meanwhile, the unpolarized light 30 passes through the first and second sensor retardation layers 120, 125 as it is.

The first sensor internal linearly-polarized light 22b from the first sensor retardation layer 220 may pass through the first sensor polarization layer 210, but the second sensor internal linearly-polarized light 22c may not pass through the first sensor polarization layer 210. The first sensor polarization layer 210 has the polarization axis inclined at the first angle, for example, +45 degrees, with respect to the slow axis of the first sensor retardation layer 220, or at the second angle, for example −45 degrees, with respect to the slow axis of the second sensor retardation layer 215. Therefore, since the polarization axis of the first sensor internal linearly-polarized light 22b is substantially parallel to the polarization axis of the first sensor polarization layer 210, the first sensor internal linearly-polarized light 22b may pass through first sensor polarization layer 210 substantially without loss. On the other hand, since the polarization axis of the second sensor internal linearly-polarized light 22c is substantially perpendicular to the polarization axis of the first sensor polarization layer 210, the second sensor internal linearly-polarized light 22c may be blocked by the first sensor polarization layer 210. The unpolarized light 30 that has passed through the first and second sensor retardation layers 220, 225 passes through the first sensor polarization layer 210 to become the second sensor linearly-polarized light 31 and the third sensor linearly-polarized light 32. In the under-display color sensor, the first sensor linearly-polarized light 23, the second sensor linearly-polarized light 31 and the third sensor linearly-polarized light 32 are incident on the optical sensor 300 after passing through the same-type color filter. That is, through the first optical path composed of the first sensor retardation layer 220 and the first sensor polarization layer 210, the first receiver 311 may be configured for measuring the first sensor linearly-polarized light 23 and the second sensor linearly-polarized light 31. Meanwhile, through the second optical path composed of the second sensor retardation layer 225 and the first sensor polarization layer 210, the second receiver 312 may be configured for measuring the third sensor linearly-polarized light 32.

Figure 4:
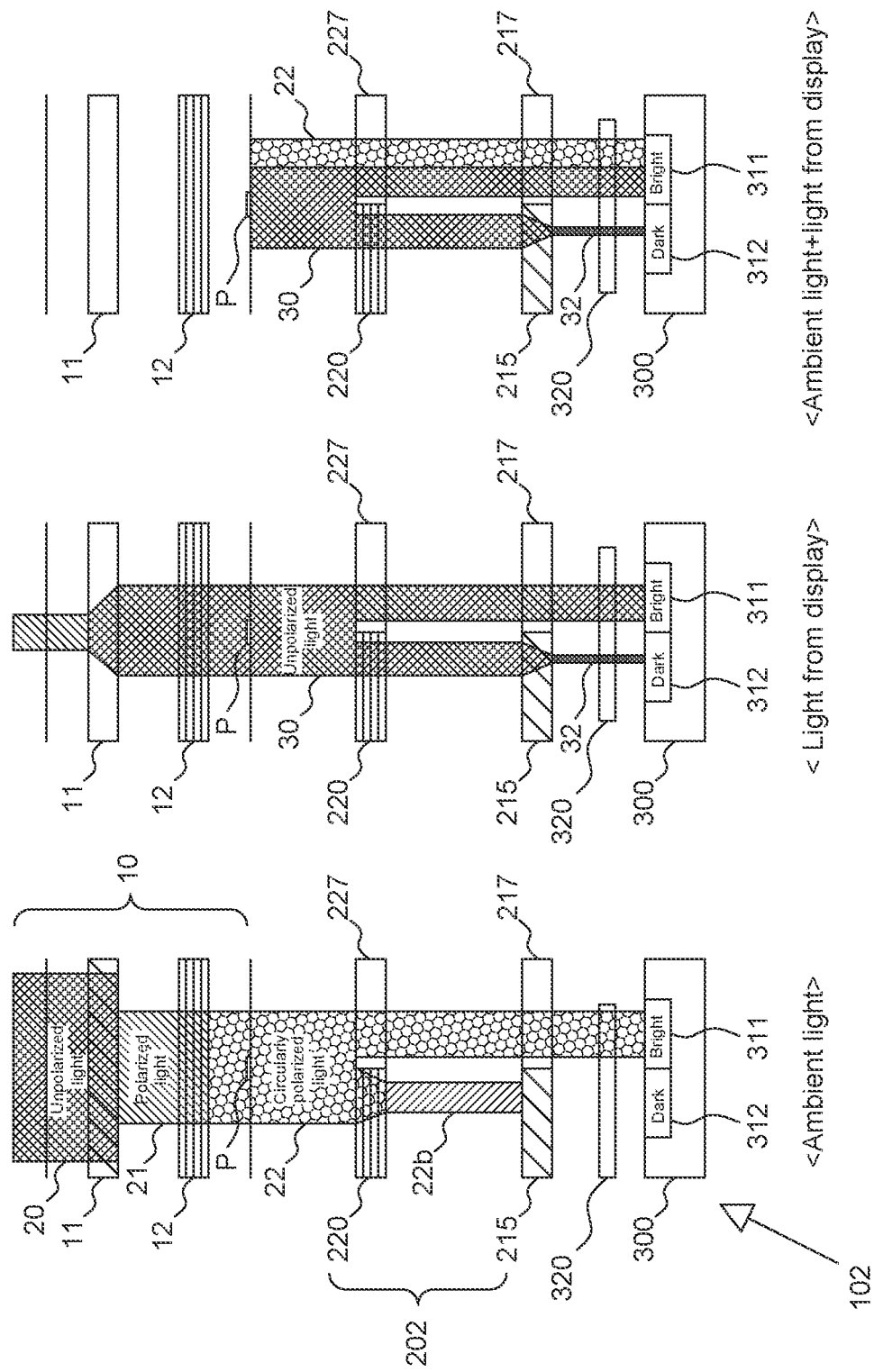
FIG. 4 exemplarily illustrates still another embodiment of under-display sensor.

FIG. 4 exemplarily illustrates still another embodiment of under-display sensor. Same descriptions of FIGS. 1 to 3 will be omitted, and differences will be focused.

The under-display sensor 102 is disposed under the display 10. The under-display sensor 102 includes a light selection layer 202 having two optical paths, and the optical sensor 300 disposed under the light selection layer 202 and configured for measuring light that has passed through each optical path. The under-display color sensor may further include the color filter layer 320 interposed between the light selection layer 202 and the optical sensor 300. Light incident on the under-display sensor 102 is the display circularly-polarized light 22 derived from the ambient light 20 and the unpolarized light 30 generated inside the display.

The first optical path and the second optical path in the light selection layer 202 act differently for the display circularly-polarized light 22 and the unpolarized light 30. The first optical path allows the display circularly-polarized light 22 and the unpolarized light 30 to pass through as it is. The display circularly-polarized light 22 and the unpolarized light 30 that have passed through the first optical path reach the first receiver 311. On the other hand, the second optical path passes the unpolarized light 30 and substantially blocks the display circularly-polarized light 22. The unpolarized light 30 that has passed through the second optical path becomes the third sensor linearly-polarized light 32 and reaches the second receiver 312.

The light selection layer 202 includes the second sensor polarization layer 215 having the second polarization axis, the first light transmission layer 217, the first sensor retardation layer 220 having the first slow axis, and the second light transmission layer 227. The first slow axis may be inclined at the second angle with respect to the second polarization axis of the second sensor polarization layer 215. The second sensor polarization layer 215 and the first light transmission layer 217 are alternately disposed, and the first sensor retardation layer 220 and the second light transmission layers 227 are alternately disposed. The second light transmission layer 227 is disposed over the first light transmission layer 217, and the first sensor retardation layer 220 is disposed over the second sensor polarization layer 215. The first light transmission layer 217 and the second light transmission layer 227 may be formed of a material having the same or similar light transmittance, and may pass incident light substantially without loss.

The display circularly-polarized light 22 and the unpolarized light 30 may be measured by the first receiver 311, and the third sensor linearly-polarized light 32 may be measured by the second receiver 312. Since linearly-polarized light derived from the display circularly-polarized light 22 cannot be incident on the second receiver 312 by the light selection layer 202, the second receiver 312 may be configured for measuring only the brightness of the third sensor linearly-polarized light 32. The first proportional relationship is established between the brightness of the display circularly-polarized light 22 and the ambient light 20, and the second proportional relationship is established between the unpolarized light 30 and the third sensor linearly-polarized light 32. The first proportional relationship and the second proportional relationship may be linear or nonlinear proportionality, and the first proportional relationship may be determined from measurements that are measured with all pixels of the display 10 being turned off, and the second proportional relationship may be determined from measurements that are measured with the pixels of the display 10 being turned on and in the absence of the ambient light 20. After correcting the brightness measured by the first receiver 311 by the second proportional relationship and the first proportional relationship is applied to the corrected brightness, the brightness of the ambient light 20 may be determined.

Figure 5:
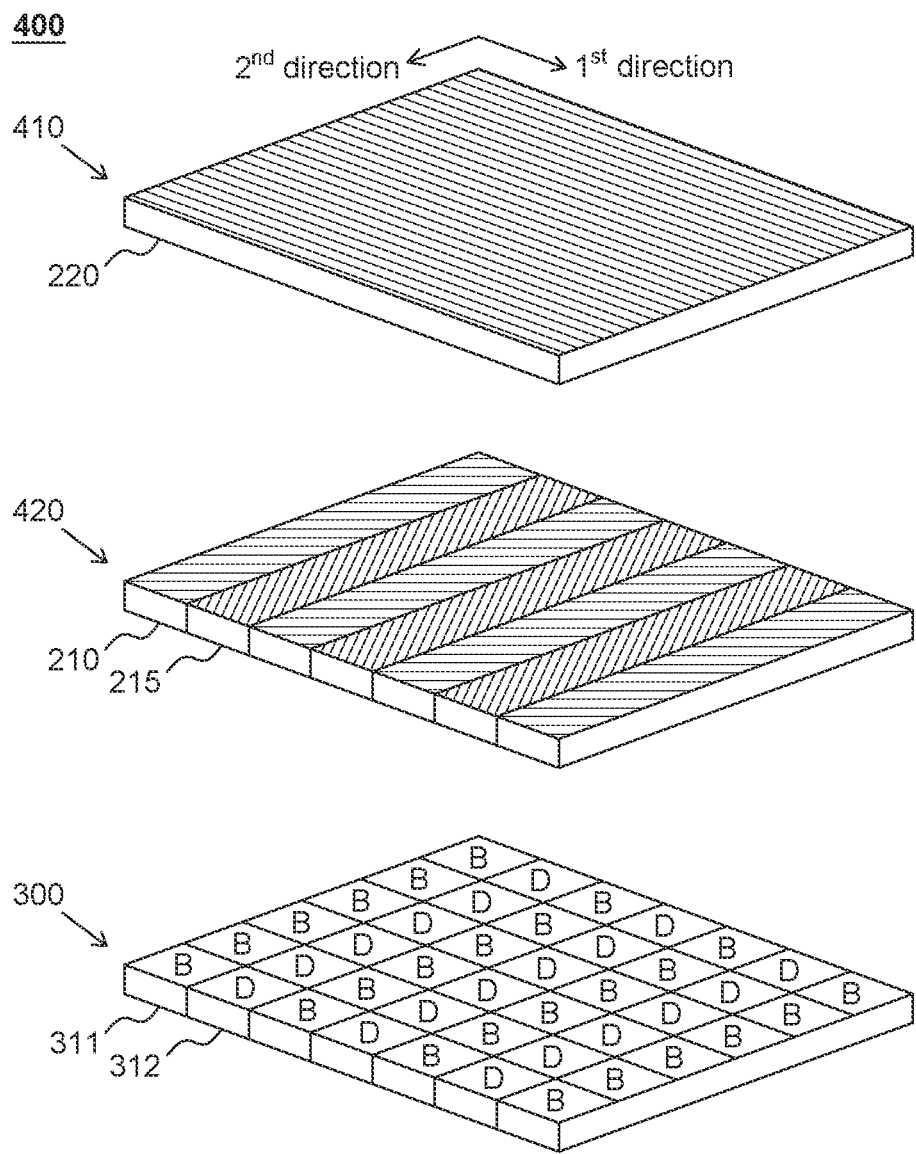
FIG. 5 is an exploded perspective view for exemplarily illustrating one embodiment of under-display illuminance sensor.

FIG. 5 is an exploded perspective view for exemplarily illustrating one embodiment of under-display illuminance sensor.

As described above, the under display illuminance sensor 400 may be manufactured by stacking a sensor retardation layer 410, a sensor polarization layer 420 and the optical sensor 300, all in the form of the film. The sensor retardation layer 410 may be the first sensor retardation layer 220 of which the slow axis is substantially horizontally formed over the entire surface.

The sensor polarization layer 420 may be formed by alternately arranging in the first direction the first and the second sensor polarization layers 210, 215 having different polarization axes. The first and second sensor polarization layers 210, 215 may have a rectangular shape extending in the second direction. The polarization axis of the first sensor polarization layer 210 may be inclined at the first angle with respect to the slow axis of the sensor retardation layer 410, and the polarization axis of the second sensor polarization layer 215 may be inclined at the second angle with respect to the slow axis of the sensor retardation layer 410.

The optical sensor 300 includes a plurality of receivers 311, 312. The plurality of receivers 311, 312 output pixel currents corresponding to the intensity of incident light. The first receiver 311 and the second receiver 312 are substantially the same receiver, and the first receiver 311 at the position on which relatively large intensity of light is incident is denoted by 'B' and the second receiver 312 at the position on which relatively small intensity of light is incident is denoted by 'D'.

Since the first sensor polarization layer 210 passes the first sensor linearly-polarized light and the second sensor linearly-polarized light (that is, the first optical path), the first receiver 311 is disposed under the first sensor polarization layer 210 along the first direction. On the other hand, since the second sensor polarization layer 215 passes only the third sensor linearly-polarized light (that is, the second optical path), the second receiver 312 is disposed under the second sensor polarization layer 215 along the first direction.

Figure 6:
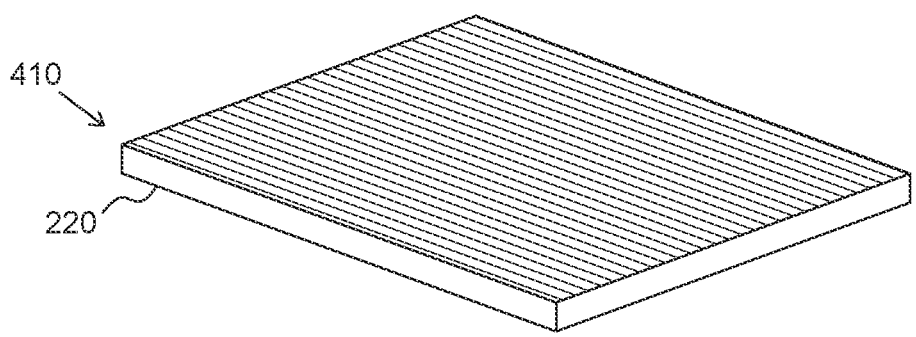
FIG. 6 is an exploded perspective view for exemplarily illustrating another embodiment of under-display illuminance sensor.
Figure 6:
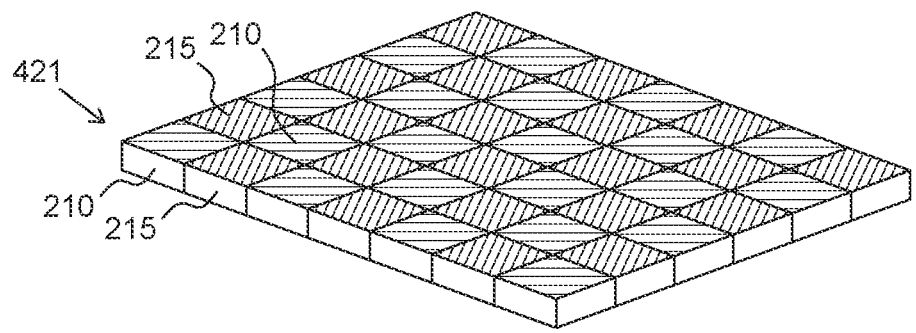
Figure 6:
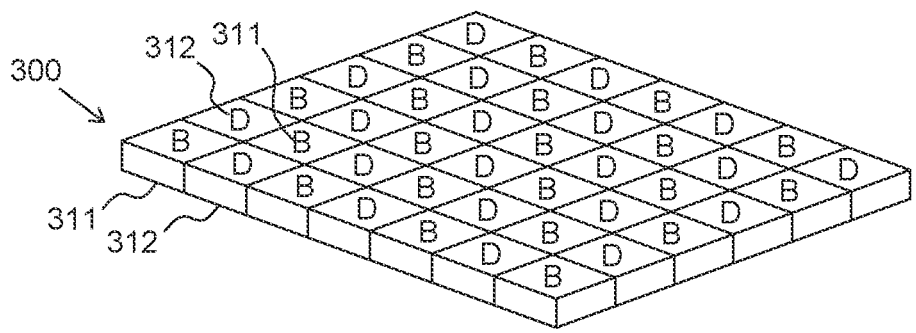

FIG. 6 is an exploded perspective view for exemplarily illustrating another embodiment of under-display illuminance sensor.

The under display illuminance sensor 401 may be manufactured by stacking the sensor retardation layer 410, a sensor polarization layer 421 and the optical sensor 300, all in the form of the film. The sensor retardation layer 410 may be the first sensor retardation layer 220 in which the slow axis is substantially horizontally formed over the entire surface.

The sensor polarization layer 421 may be formed by alternately arranging the first and the second sensor polarization layers 210, 215 having different polarization axes. The first and second sensor polarization layers 210, 215 may have a square shape. Therefore, the sensor polarization layer 421 have an arrangement in which each side of the first sensor polarization layer 210 is in contact with the four second sensor polarization layers 215, or each side of the second sensor polarization layer 215 is in contact with the four first polarization layers 210. The polarization axis of the first sensor polarization layer 210 may be inclined at the first angle with respect to the slow axis of the sensor retardation layer 410, and the polarization axis of the second sensor polarization layer 215 may be inclined at the second angle with respect to the slow axis of the sensor retardation layer 410.

Since the first sensor polarization layer 210 passes the first sensor linearly-polarized light and the second sensor linearly-polarized light (that is, the first optical path), the first receiver 311 is disposed under the first sensor polarization layer 210. On the other hand, since the second sensor polarization layer 215 passes only the third sensor linearly-polarized light (that is, the second optical path), the second receiver 312 is disposed under the second sensor polarization layer 215. Accordingly, the planar arrangement of the first receiver 311 and the second receiver 312 may be substantially the same as that of the sensor polarization layer 421.

Figure 7:
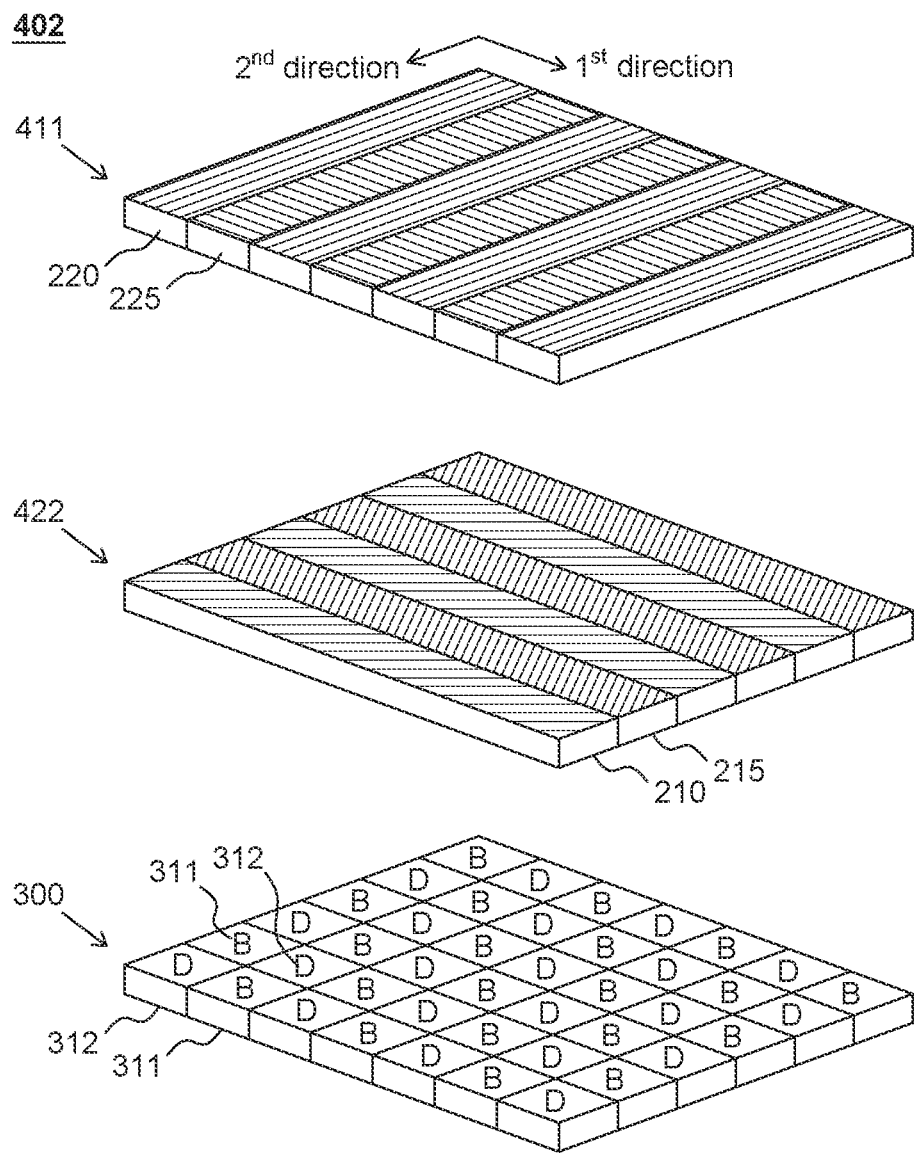
FIG. 7 is an exploded perspective view for exemplarily illustrating still another embodiment of under-display illuminance sensor.

FIG. 7 is an exploded perspective view for exemplarily illustrating still another embodiment of under-display illuminance sensor.

The under display illuminance sensor 402 may be manufactured by stacking a sensor retardation layer 411, a sensor polarization layer 422 and the optical sensor 300, all in the form of the film The sensor retardation layer 411 may be formed by alternately arranging the first and the second sensor retardation layers 220, 225 having slow axes substantially perpendicular to each other. The first and second sensor retardation layers 220, 225 may have a rectangular shape extending in the second direction.

The sensor polarization layer 422 may be formed by alternately arranging the first and second sensor polarization layers 210, 215 having different polarization axes. The first and second sensor polarization layers 210, 215 may have a rectangular shape extending in the first direction perpendicular to the second direction. The polarization axis of the first sensor polarization layer 210 may be inclined at the second angle with respect to the slow axis of the first sensor retardation layer 220, and the polarization axis of the second sensor polarization layer 215 may be inclined at the first angle with respect to the slow axis of the first sensor retardation layer 220.

The first sensor retardation layer 220-the first sensor polarization layer 210 and the second sensor retardation layer 225-the second sensor polarization layer 215 are the first optical path that passes the first sensor linearly-polarized light and the second sensor linearly-polarized light. The first sensor retardation layer 220-the second sensor polarization layer 215 and the second sensor retardation layer 225-the first sensor polarization layer 210 are the second optical path that passes only the third sensor linearly-polarized light of the third sensor. Accordingly, in the planar arrangement of the first receiver 311 and the second receiver 312, each side of the first receiver 311 is in contact with the four second receivers 312 or each of side of the second receiver 312 is in contact with the four first receiver 311.

Figure 8:
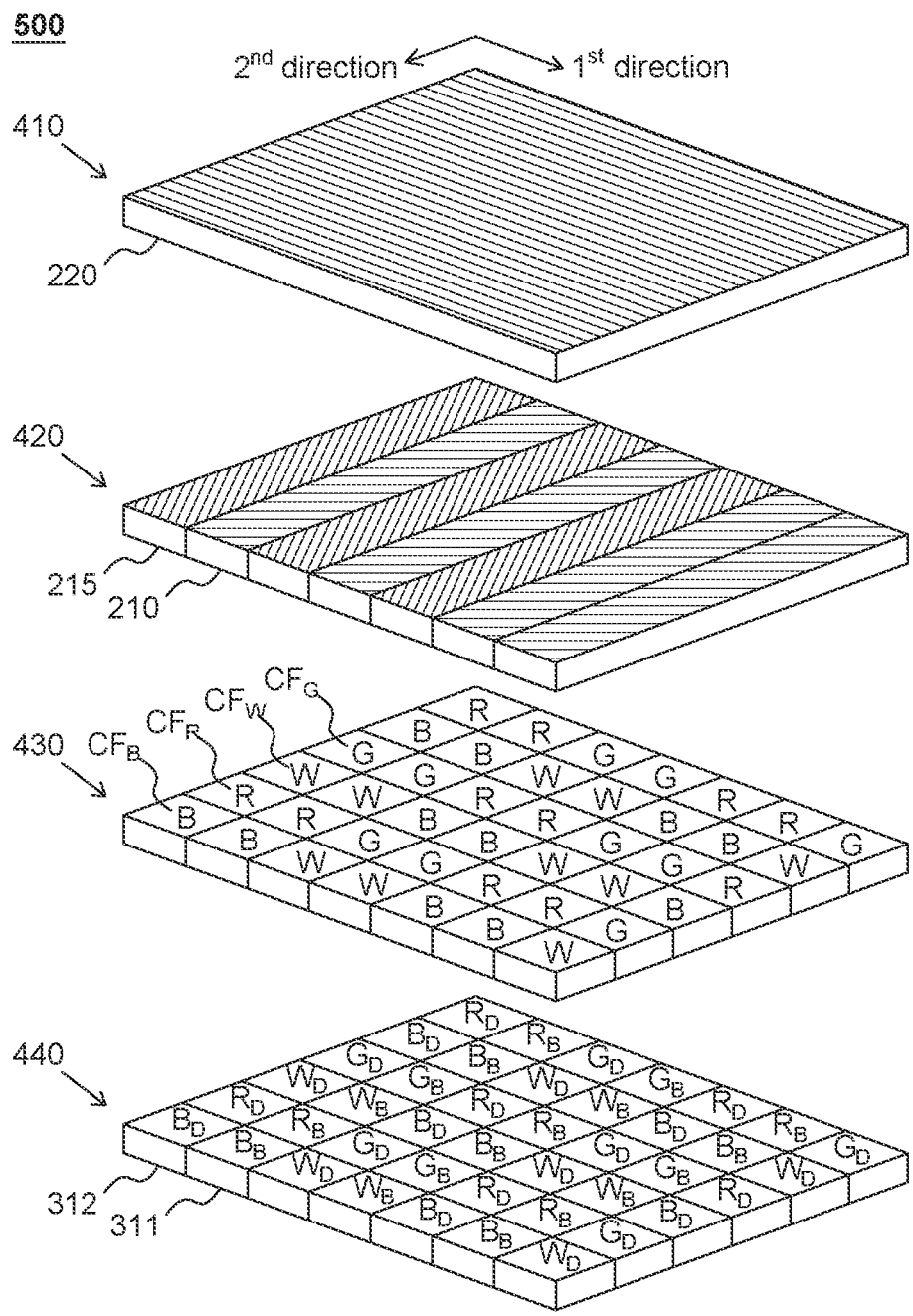
FIG. 8 is an exploded perspective view for exemplarily illustrating one embodiment of under-display color sensor.

FIG. 8 is an exploded perspective view for exemplarily illustrating one embodiment of under-display color sensor.

The under-display color sensor 500 may be manufactured by stacking the sensor retardation layer 410, the sensor polarization layer 420, a color filter layer 430, and an optical sensor 440. At least the sensor retardation layer 410 and the sensor polarization layer 420 may be in the form of the film.

The sensor retardation layer 410 may be the first sensor retardation layer 220 in which the slow axis is substantially horizontally formed throughout.

The sensor polarization layer 420 is disposed under the sensor retardation layer 410. The sensor polarization layer 420 may be formed by alternately arranging in the first direction the first sensor polarization layer 210 and the second sensor polarization layer 215, each having different polarization axes. The first sensor polarization layer 210 and the second sensor polarization layer 215 may have a rectangular shape extending in the second direction. The polarization axis of the first sensor polarization layer 210 may be inclined at the first angle with respect to the slow axis of the sensor retardation layer 410, and the polarization axis of the second sensor polarization layer 215 may be inclined at the second angle with respect to the slow axis of the sensor retardation layer 410.

The color filter layer 430 is disposed under the sensor polarization layer 420. The color filter layer 430 may pass light belonging to a specific wavelength band and block light belonging to other wavelength bands. The color filter layer 430 may include, for example, a red filter $CF_R$ for passing only light in a red wavelength band, a $CF_G$ for passing only light in a green wavelength band, a blue filter $CF_B$ for passing only light in a blue wavelength band, and a $CF_W$ for passing only light in a white wavelength band. The color filters included in the color filter layer 430 may be disposed vertically over the receiver so as to correspond to each receiver of the optical sensor 440. In the accompanying drawings, the color filter layer 430 is illustrated in the form of a separate film, such as the sensor retardation layer 410 and the sensor polarization layer 420, but this is only an example. That is, the color filter may already be formed on the optical sensor 440.

The color filter layer 430 is composed of a plurality of repeated unit color patterns. In the unit color pattern, the number of same-type color filters is a multiple of 2, that is, 2n (n≥1). The 2n same-type color filters are arranged to be in contact with each other so that no different types of color filters (hereinafter, different-type color filters) exist between the two same-type color filters, or are arranged to be spaced apart at a certain distance (that is, a certain number of different-type color filters exist between two same-type color filters).

Due to the sensor retardation layer 410 and the sensor polarization layer 420, light with a relatively large intensity of light and light with a relatively small intensity of light pass through the color filter layer 430. Light with the relatively large intensity of light may be the first sensor linearly-polarized light 23 and the second sensor linearly-polarized light 31, light with the relatively small intensity of light may be the third sensor linearly-polarized light 32, and the term 'relative' is to compare the two. Among 2n same-type color filters included in the unit color pattern, n color filters pass only light in a specific wavelength band included in light with the relatively large intensity of light, and the remaining n color filters pass only light in the same specific wavelength band included in light with the relatively small intensity of light. For example, of the first and second red filters included in the unit color pattern, the first red filter passes only light in the red wavelength band included in light having the relatively large intensity of light, and the second red filter passes only light in the red wavelength band included in light having the relatively small intensity of light.

The optical sensor 440 is disposed under the color filter layer 430. The optical sensor 440 includes at least a pair of receivers 311, 312 configured for measuring light belonging to the same wavelength band. At least one pair of receivers 311, 312 correspond to at least one pair of the same-type color filters included in the color filter layer 430, respectively. The plurality of receivers 311, 312 output pixel currents corresponding to the intensity of light incident through the color filter. The wavelength band of light measured by the first receiver 311 and the second receiver 312 is determined according to the type of the color filter that is substantially vertically positioned over the receivers. The pair of receivers 311, 312 are substantially the same receivers. The first receiver 311 at a position on which light with the relatively large intensity of light belonging to the same wavelength band is incident is denoted by a subscript 'B' and the second receiver 312 at a position on which light with the relatively small intensity of light is incident is denoted by a subscript 'D'.

Since the first sensor polarization layer 210 of the sensor polarization layer 420 passes the first sensor linearly-polarized light 23 and the second sensor linearly-polarized light 31 (that is, the first optical path), the receiver disposed under the first sensor polarization layer 210 along the length direction of the layer 210, that is, in the second direction, is the first receiver 311. On the other hand, since the second sensor polarization layer 215 passes only the third sensor linearly-polarized light 32 (that is, the second optical path), the receiver disposed under the second polarization layer 215 along the length direction of the second sensor polarization layer 215, that is, in the second direction is the second receiver 312.

Figure 9:
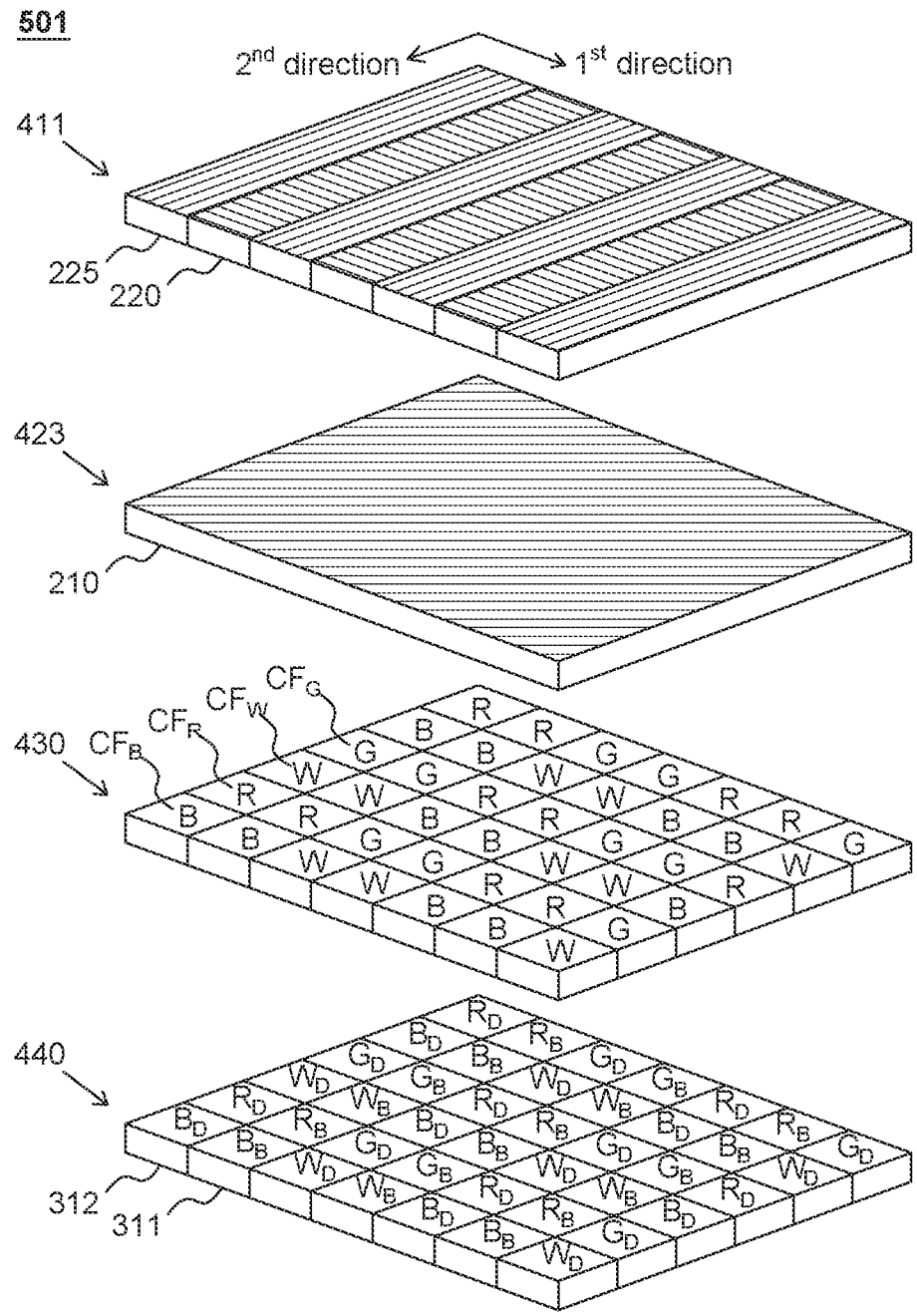
FIG. 9 is an exploded perspective view for exemplarily illustrating another embodiment of under-display color sensor.

FIG. 9 is an exploded perspective view for exemplarily illustrating another embodiment of under-display color sensor. The same description as in FIG. 8 will be omitted, and differences will be described.

The under-display color sensor 501 may include the sensor retardation layer 411, a sensor polarization layer 423, the color filter layer 430, and the optical sensor 440.

The sensor retardation layer 411 may be formed by alternately arranging the first sensor retardation layer 220 having the first slow axis and the second sensor retardation layer 225 having the second slow axis in the first direction. The first slow axis and the second slow axis may be substantially perpendicular to each other. The first sensor retardation layer 220 and the second sensor retardation layer 225 may have a rectangular shape extending in the second direction. The first slow axis may be inclined at the first angle with respect to the polarization axis of the sensor polarization layer 423, and the second slow axis may be inclined at the second angle with respect to the polarization axis of the sensor polarization layer 423.

The sensor polarization layer 423 is disposed under the sensor retardation layer 411. The sensor polarization layer 423 may be the first sensor polarization layer 210 having the same polarization axis throughout.

The color filter layer 430 is disposed under the sensor polarization layer 423, and the color filter layer 430 is composed of the plurality of repeated unit color patterns. The optical sensor 440 is disposed under the color filter layer 430. The optical sensor 440 includes at least a pair of receivers 311, 312 configured for measuring light belonging to the same wavelength band.

Since the sensor polarization layer 423 passes the first sensor internal linearly-polarized light 22b that has passed through the first sensor retardation layer 220 and the second sensor linearly-polarized light 31, the receiver disposed under the sensor polarization layer 423 along the length direction of the first sensor retardation layer 220, that is, in the second direction, is the first receiver 311. On the other hand, since the sensor polarization layer 423 passes only the third sensor linearly-polarized light 32 that has passed through the second sensor retardation layer 225, the receiver disposed under the sensor polarization layer 423 along the length direction of the second sensor retardation layer 225, that is, in the second direction is the second receiver 312.

Figure 10:
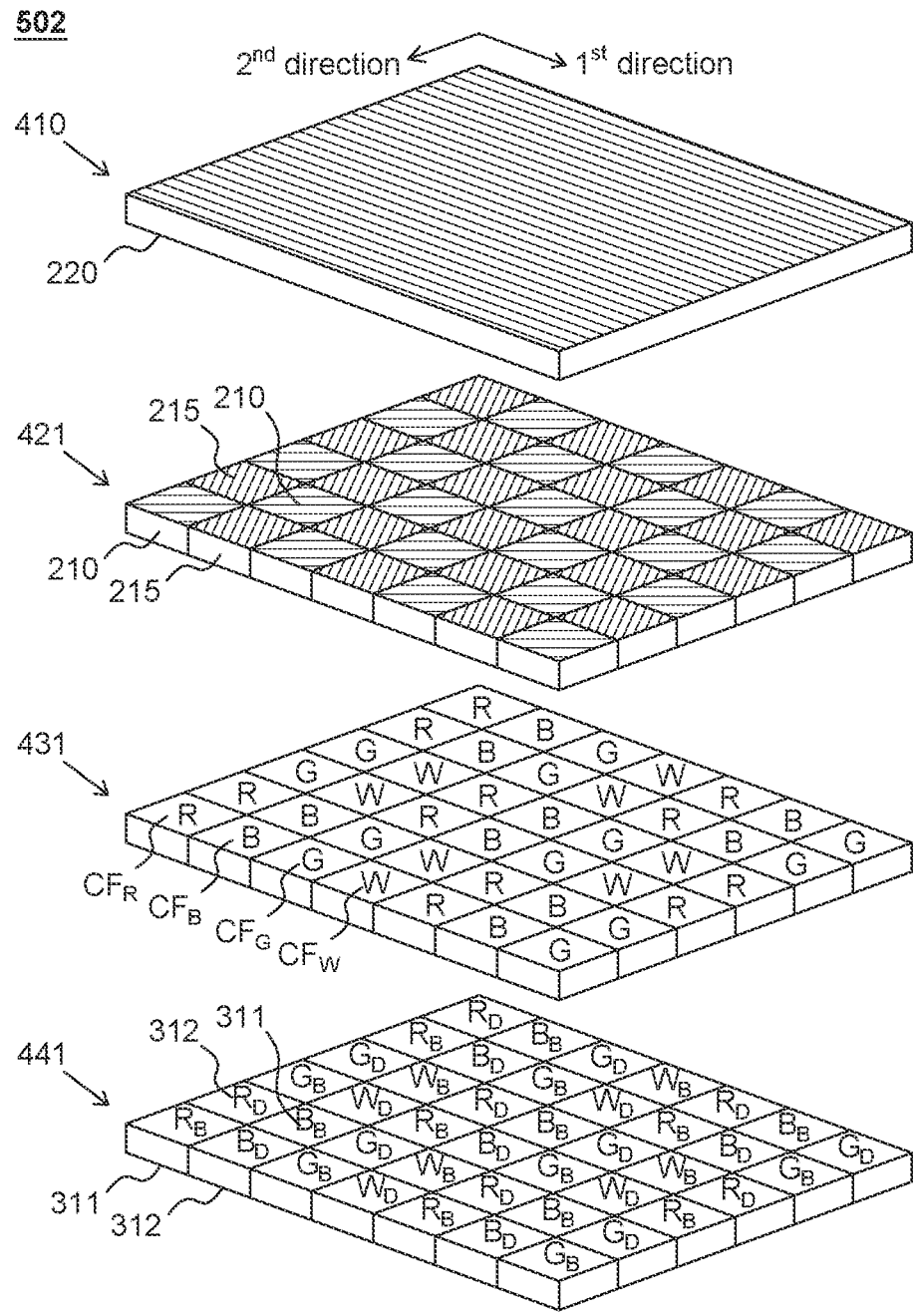
FIG. 10 is an exploded perspective view for exemplarily illustrating still another embodiment of under-display color sensor.

FIG. 10 is an exploded perspective view for exemplarily illustrating still another embodiment of under-display color sensor. The same description as in FIGS. 8 and 9 will be omitted, and differences will be described.

The under-display color sensor 502 may include the sensor retardation layer 410, the sensor polarization layer 421, a color filter layer 431, and an optical sensor 441.

The sensor retardation layer 410 may be the first sensor retardation layer 220 in which the slow axis is substantially horizontally formed throughout.

The sensor polarization layer 421 may be formed by alternately arranging the first sensor polarization layer 210 and the second sensor polarization layer 215, each having different polarization axes. The first sensor polarization layer 210 and the second sensor polarization layer 215 may have a square shape. Therefore, the sensor polarization layer 421 have the arrangement in which each side of the first sensor polarization layer 210 is in contact with the four second sensor polarization layers 215, or each side of the second sensor polarization layer 215 is in contact with the four first polarization layers 210. The polarization axis of the first sensor polarization layer 210 may be inclined at the first angle with respect to the slow axis of the sensor retardation layer 410, and the polarization axis of the second sensor polarization layer 215 may be inclined at the second angle with respect to the slow axis of the sensor retardation layer 410.

The color filter layer 431 is disposed under the sensor polarization layer 421, and the color filter layer 431 is composed of a plurality of repeated unit color patterns. The optical sensor 441 is disposed under the color filter layer 431. The optical sensor 441 includes at least a pair of receivers 311, 312 configured for measuring light belonging to the same wavelength band.

Since the first sensor polarization layer 210 of the sensor polarization layer 421 passes the first sensor linearly-polarized light 23 and the second sensor linearly-polarized light 31, the receiver disposed under the first sensor polarization layer 210 is the first receiver 311. On the other hand, since the second sensor polarization layer 215 passes only the third sensor linearly-polarized light 32, the receiver disposed under the second sensor polarization layer 215 is the second receiver 312. Accordingly, the planar arrangement of the first receiver 311 and the second receiver 312 may be substantially the same as that of the sensor polarization layer 421.

Figure 11:
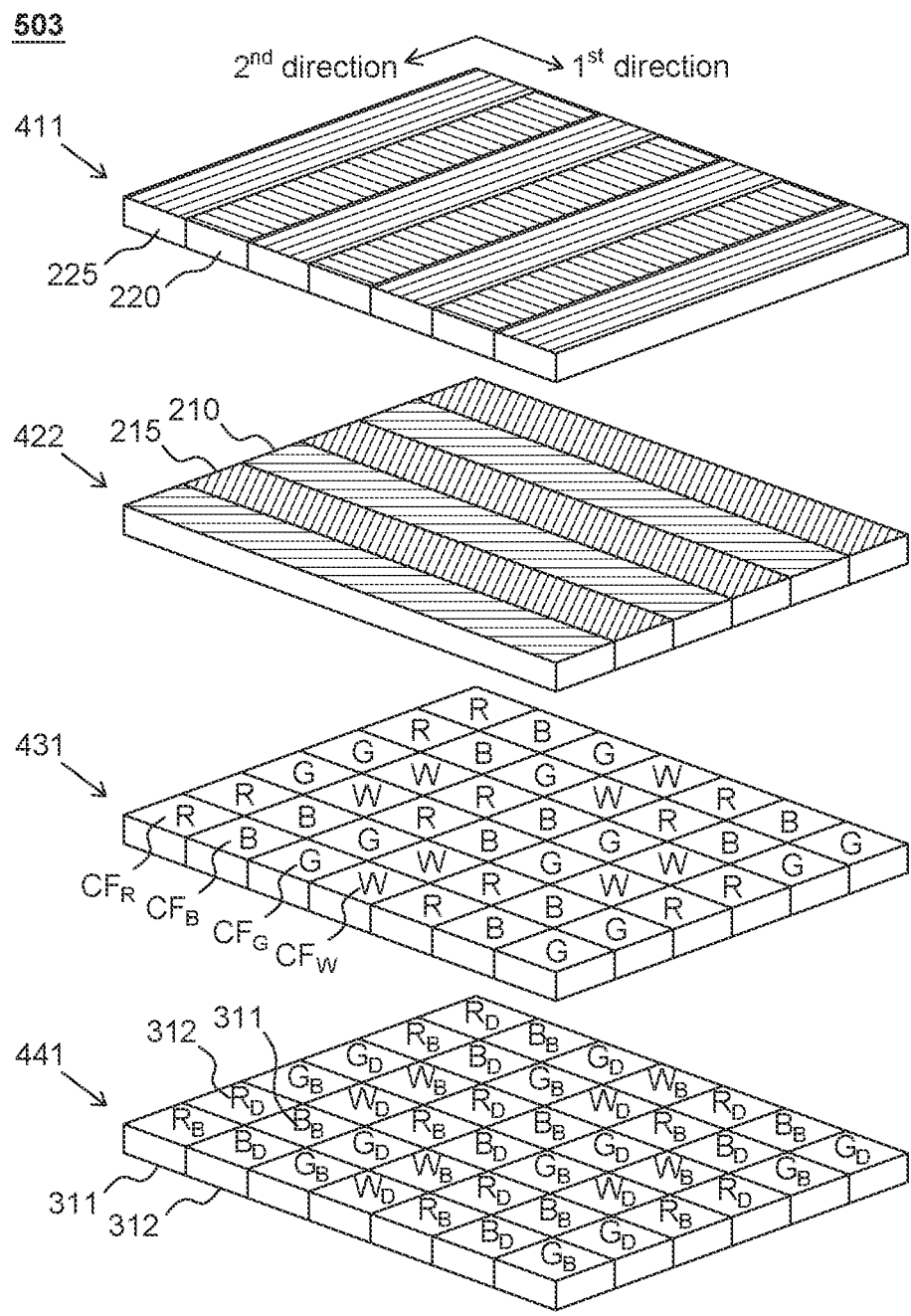
FIG. 11 is an exploded perspective view for exemplarily illustrating still another embodiment of under-display color sensor.

FIG. 11 is an exploded perspective view for exemplarily illustrating still another embodiment of under-display color sensor. The same description as in FIGS. 8 to 10 will be omitted, and differences will be described.

The under-display color sensor 503 may include the sensor retardation layer 411, the sensor polarization layer 422, the color filter layer 431, and the optical sensor 441.

The sensor retardation layer 411 may be formed by alternately arranging the first sensor retardation layer 220 having the first slow axis and the second sensor retardation layer 225 having the second slow axis in the first direction. The first sensor retardation layer 220 and the second sensor retardation layer 225 may have a rectangular shape extending in the second direction. The first slow axis and the second slow axis may be substantially perpendicular to each other.

The sensor polarization layer 422 may be formed by alternately arranging in the second direction the first sensor polarization layer 210 having the first polarization axis and the second sensor polarization layer 215 having the second polarization axis. The first sensor polarization layer 210 and the second sensor polarization layer 215 may have a rectangular shape extending in the first direction. The polarization axis of the first sensor polarization layer 210 may be inclined at the first angle with respect to the slow axis of the first sensor retardation layer 220, and the polarization axis of the second sensor polarization layer 215 may be inclined at the second angle with respect to the slow axis of the first sensor retardation layer 220.

The color filter layer 431 is disposed under the sensor polarization layer 422, and the color filter layer 431 is composed of a plurality of repeated unit color patterns. The optical sensor 441 is disposed under the color filter layer 431. The optical sensor 441 includes at least a pair of receivers 311, 312 for measuring light belonging to the same wavelength band.

The first sensor retardation layer 220-the first sensor polarization layer 210 and the second sensor retardation layer 225-the second sensor polarization layer 215 is the first optical path that passes the first sensor linearly-polarized light 23 and the second sensor linear 31. The first sensor retardation layer 220-the second sensor polarization layer 215 and the second sensor retardation layer 225-the first sensor polarization layer 210 is the second optical path that passes only the third sensor linearly-polarized light 32. Accordingly, in the planar arrangement of the first receiver 311 and the second receiver 312, each side of the first receiver 311 is in contact with the four second receivers 312 or each of side of the second receiver 312 is in contact with the four first receiver 311.

Figure 12:
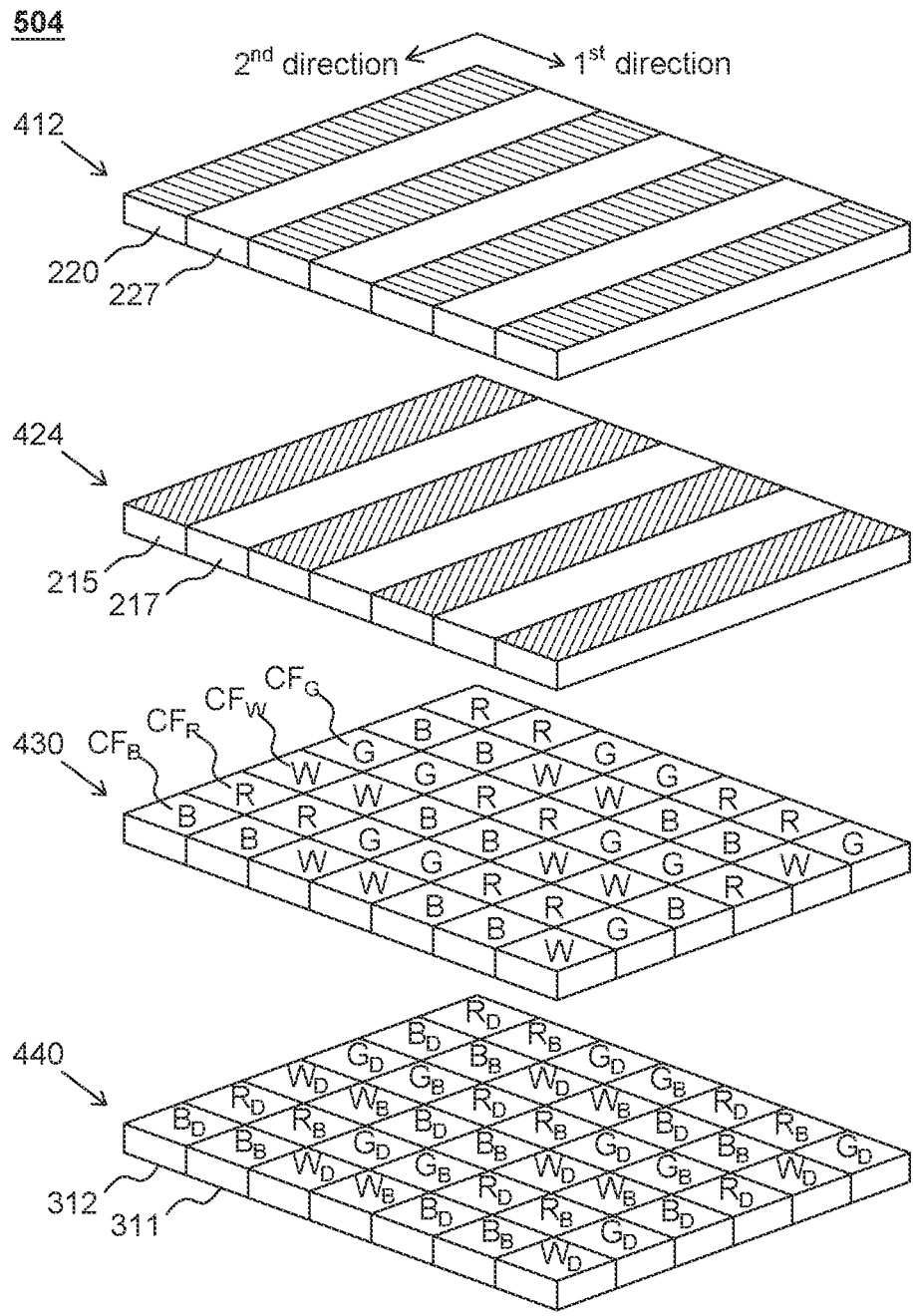
FIG. 12 is an exploded perspective view for exemplarily illustrating still another embodiment of under-display color sensor.

FIG. 12 is an exploded perspective view for exemplarily illustrating still another embodiment of under-display color sensor.

The under-display color sensor 504 may be manufactured by stacking the sensor retardation layer 412, a sensor polarization layer 424, the color filter layer 430, and the optical sensor 440. At least the sensor retardation layer 412 and the sensor polarization layer 424 may be in the form of the film.

The sensor retardation layer 412 may be formed by alternately arranging in the first direction the first sensor retardation layer 220 having the first slow axis and the first light transmission layer 227 configured for transmitting incident light. The first sensor retardation layer 220 and the first light transmission layer 227 may have a rectangular shape extending in the second direction. The first slow axis may be inclined at the second angle with respect to the second polarization axis of the second sensor polarization layer 215.

The sensor polarization layer 424 is disposed under the sensor retardation layer 412. The sensor polarization layer 424 may be formed by alternately arranging in the first direction the second sensor polarization layer 215 having the second polarization axis and the second light transmission layer 217 configured for transmitting incident light. The second sensor polarization layer 215 and the second light transmission layer 217 may have a rectangular shape extending in the second direction. The first light transmission layer 227 and the second light transmission layer 217 may be formed of a material having the same or similar light transmittance.

The color filter layer 430 is disposed under the sensor polarization layer 424, and the color filter layer 430 is composed of a plurality of repeated unit color patterns. The optical sensor 440 is disposed under the color filter layer 430. The optical sensor 440 includes at least a pair of receivers 311, 312 for measuring light belonging to the same wavelength band.

FIG. 13A, FIG. 13B, FIG. 14A and FIG. 14B exemplarily illustrate unit color patterns in color filter layer.

Figure 13A:
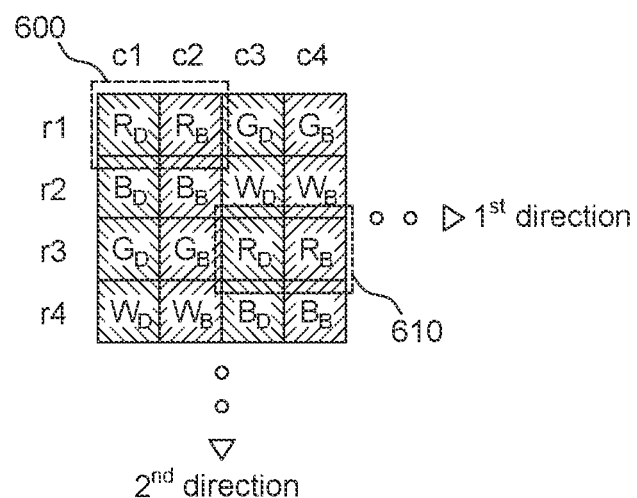
FIG. 13A, FIG. 13B, FIG. 14A and FIG. 14B exemplarily illustrate unit color patterns in color filter layer.
Figure 13B:
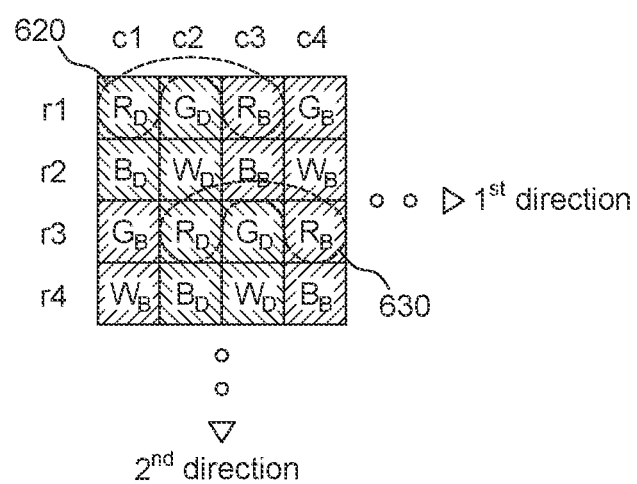
Figure 14A:
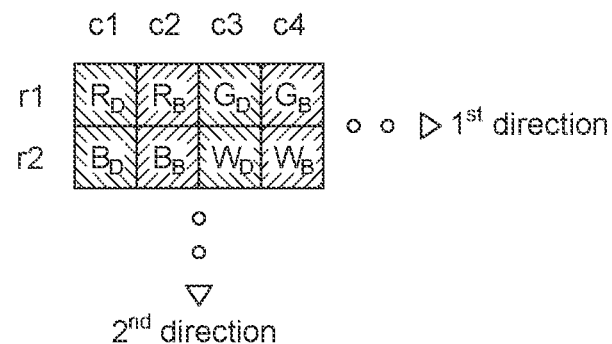
Figure 14B:
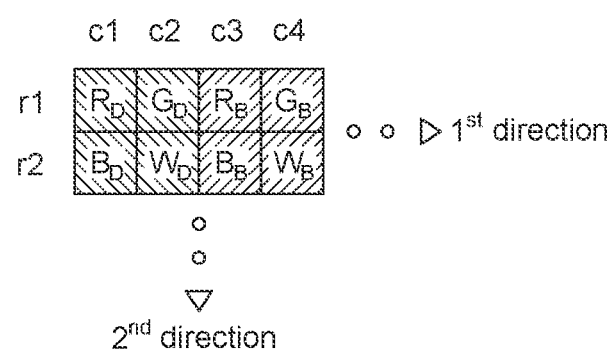

When the number of types of color filters is N (N≥1), the total number of color filters included in the unit color pattern is 2n×N, which is the minimum value. As described above, in the unit color pattern, the number of the same-type color filter is 2n (n≥1). The unit color pattern may be repeated in the first direction, the second direction, and a combination thereof. As an example, FIG. 13A and FIG. 13B illustrate a unit color pattern in which four types of color filters are arranged in 4×4, and FIG. 14A and FIG. 14B illustrate a unit color pattern in which four types of color filters are arranged in 2×4. For the better understanding, in the same manner as the optical sensors of FIGS. 8 through 12, the color filter at a position on which light with the relatively large intensity of light belonging to the same wavelength band is incident is denoted by subscript 'B', and the color filter at a position on which light with the relatively small intensity of light belonging to the same wavelength band is incident is denoted by subscript 'D'.

A unit color pattern in which the first pair of color filters and the second pair of color filters are arranged to be spaced apart is illustrated in FIG. 13A. The color filter pair is composed of two (or more) color filters of the same type. Light with the relatively large intensity of light passes through any one color filter (color filters denoted by subscript 'B') constituting the color filter pair to reach the first receiver, and light with the relatively small intensity of light passes through the remaining color filter (color filters denoted by subscript 'D') to reach the second receiver. In each color filter pair, the two color filters are arranged so as to be in contact with each other. Around a pair of color filters composed of same-type color filters, pairs of color filters composed of different-type color filters are disposed.

Meanwhile, in the unit color pattern, the first pair of color filters 600 and the second pair of color filters 610 are not located in the same column. Taking a red filter as an example, the first pair of red filters 600 is composed of two red filters in columns c1 and c2 of row r1, and the second pair red filters 610 is composed of two red filters in columns c3 and c4 of row r3.

A unit color pattern in which the first pair of same-type color filters and the second pair of same-type color filters are spaced apart from each other is illustrated in FIG. 13B. In each color filter pair, the two color filters are arranged spaced apart. That is, one or more different-type color filters may be interposed between two same-type color filters. For this reason, different-type color filters are disposed around one color filter.

Meanwhile, in the unit color pattern, the first pair of color filters 620 and the second pair of color filters 630 are not located in the same column. Taking a red filter as an example, the first pair of red filters 620 is composed of two red filters in columns c1 and c3 of row r1, and the second pair red filters 630 is composed of two red filters in columns c2 and c4 of row r3.

A unit color pattern in which four types of color filter pairs are arranged is illustrated in FIG. 14A. Each color filter pair is composed of two color filters of the same type. In each color filter pair, the two color filters are arranged so as to be in contact with each other. Light with the relatively large intensity of light passes through one of the two color filters (color filter denoted by subscript 'B') arranged to be in contact with each other, and light with the relatively small intensity of light passes through the other (color filter denoted by subscript 'D'). Around the pair of color filters composed of one type of color filter, pairs of color filters composed of different-type color filters are disposed. In the unit color pattern illustrated in FIG. 14A, a red filter pair is located in columns c1 and c2 of row r1, a green filter pair is located in columns c3 and c4 of row r1, a blue filter pair is located in columns c1 and c2 of row r2, and a white filter pair is located in columns c3 and c4 of row r2, respectively.

A unit color pattern in which four types of color filter pairs are arranged is illustrated in FIG. 14B. Each color filter pair is composed of two color filters of the same type. In each color filter pair, the two color filters are arranged to be spaced apart. That is, one or more different-type color filters may be interposed between two same-type color filters. For this reason, different-type color filters are disposed around one color filter. In the unit color pattern illustrated in FIG. 14B, a red filter pair is located in columns c1 and c3 of row r1, a green filter pair is located in columns c2 and c4 of row r1, a blue filter pair is located in columns c1 and c3 of row r2, and a white filter pair is located in columns c2 and c4 of row r2, respectively.

Figure 15:
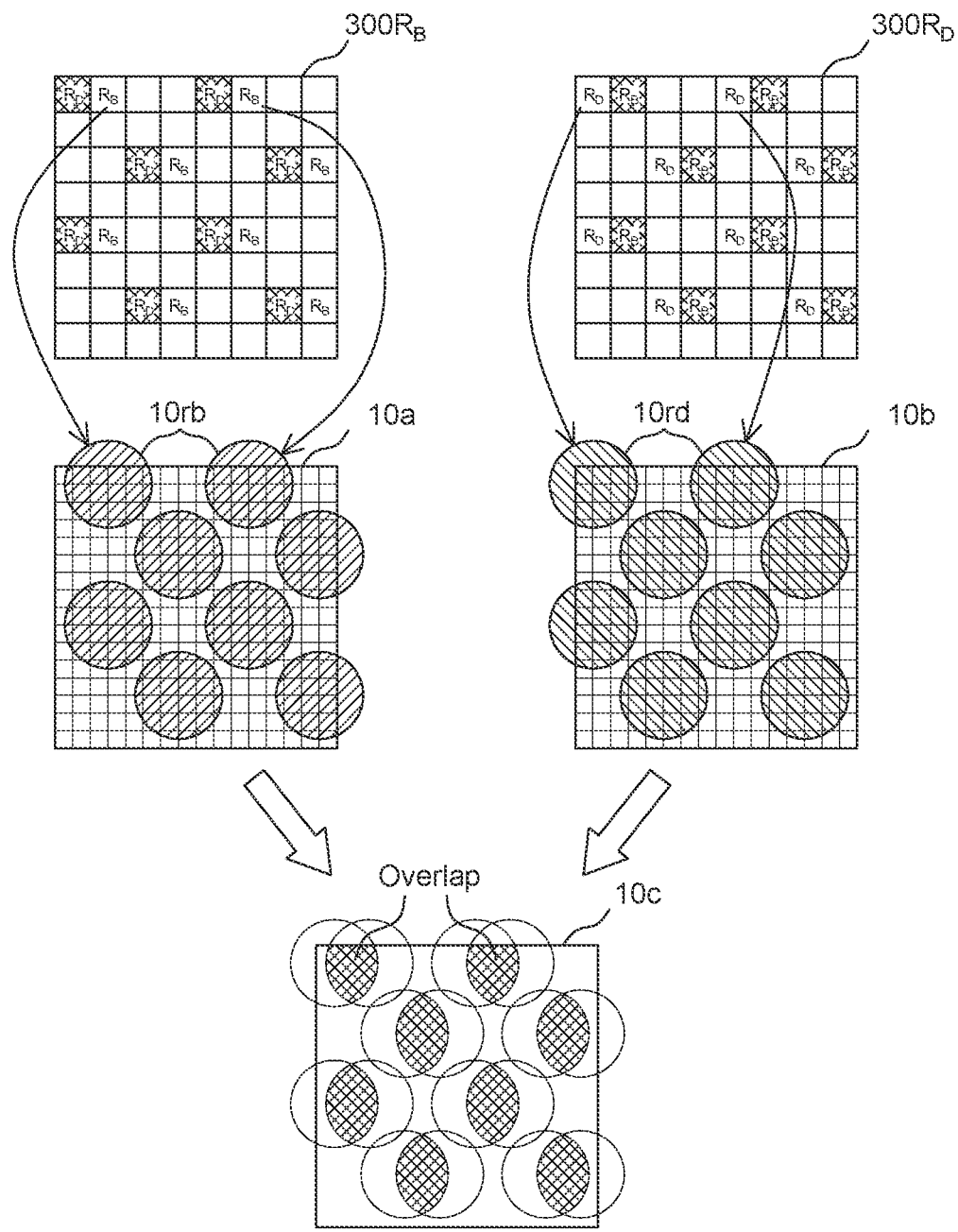
FIG. 15 and FIG. 16 exemplarily illustrate detection regions according to arrangement of a plurality of same-type color filters constituting a color filter pair.
Figure 16:
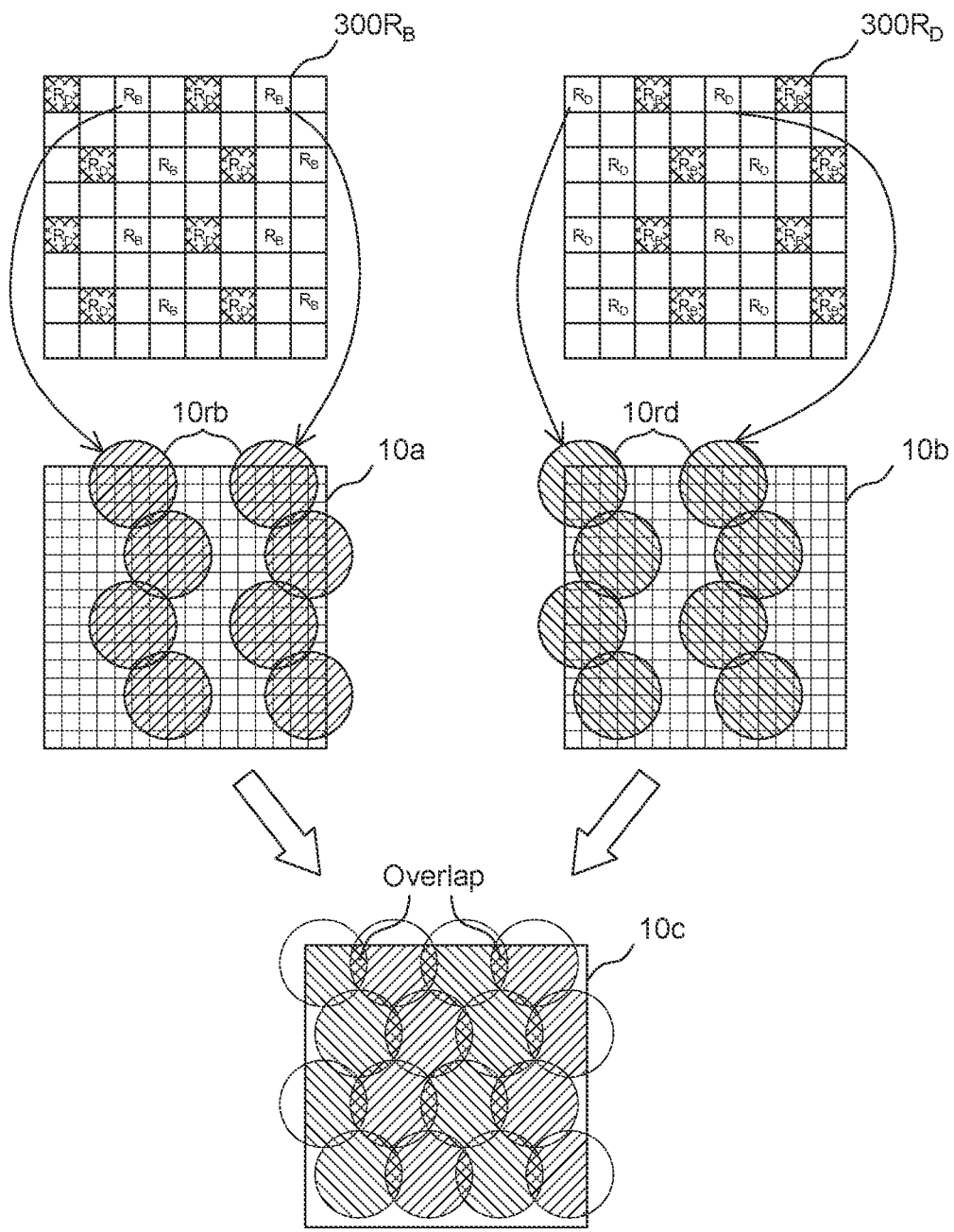

FIG. 15 and FIG. 16 exemplarily illustrate detection regions according to arrangement of a plurality of same-type color filters constituting a color filter pair, and FIG. 15 illustrates a case in which a color filter layer having the unit color pattern illustrated in FIG. 13A is applied and FIG. 16 illustrates a case in which a color filter layer having the unit color pattern illustrated in FIG. 13B is applied, respectively. Reference numeral 300$R_B$ indicates an optical sensor in which the first receivers $R_B$ for measuring light belonging to the red wavelength band with the relatively large intensity of light is emphasized, and 300$R_D$ indicates the optical sensor in which the second receiver $R_D$ for measuring light belonging to the red wavelength band with the relatively small intensity of light Is an emphasized. Reference numerals 10a, 10b, and 10c denote a sensor detection region defined on the bottom surface of the display 10, that is, a region in which the optical sensor can measure light from the display 10. A plurality of sub-regions 10rb through which the first receiver $R_B$ can measure light is indicated in the sensor detection region 10a, and a plurality of sub-regions 10rd through which the second receiver $R_D$ can measure light is indicated in the sensor detection region 10b. In the sensor detection region 10c, both a plurality of sub-regions 10rb and a plurality of sub-regions 10rd are indicated.

The measurement method in which the wavelength bands of light are divided can measure the brightness of ambient light, that is, the illuminance, more accurately than the measurement method in which the wavelength band of light is not divided. In particular, when light belonging to the same wavelength band is separated into light having the relatively large intensity of light and light having the relatively small intensity of light by passing through the light selection layer, the brightness of ambient light of the electronic device can be accurately measured even under the display. In addition, the color temperature may be calculated from the brightness of light for each wavelength band. The calculated color temperature may be provided to a display or a camera of an electronic device and used to correct an image displayed on the display or an image captured by the camera.

Referring to FIG. 15, a pair of color filters is composed of two color filters of the same type, and the two same-type color filters are arranged to be in contact with each other. When the unit color pattern arranged so that two same-type color filters are in contact with each other is applied to the optical sensor, at least a portion of the light measured by the first receiver $R_B$ and the second receiver $R_D$, respectively, may come out of the overlapped sub-region. As the distance between the two same-type color filters is closer, the overlapped sub-region Overlap on the bottom surface of the display emitting light commonly measured by the first receiver $R_B$ and the second receiver $R_D$ may increase. In addition, when the viewing angle of the first receiver $R_B$ and the second receiver $R_D$ is increased, or the distance between the first receiver $R_B$ and the second receiver $R_D$ and the lower surface of the display is increased, the overlapped sub-region Overlap may increase. The first receiver $R_B$ and the second receiver $R_D$ measure light with the relatively large intensity of light and light with the relatively small intensity of light, both originating from the overlapped sub-region Overlap, measurements of brightness of ambient light can be made possible at a plurality of positions in the sensor detection region 10c.

Meanwhile, referring to FIG. 16, a color filter pair is composed of two same-type color filters, and two same-type color filters are disposed to be spaced apart. When the unit color pattern arranged so that two same-type color filters are spaced apart from each other is applied to the optical sensor, the area of the overlapped sub-region from which light commonly measured by the first receiver $R_B$ and the second receiver $R_D$ is emitted may be relatively reduced than that illustrated in FIG. 15. On the other hand, the area of the sensor detection region 10c through which the first receiver $R_B$ and the second receiver $R_D$ can measure light may be relatively increased than that illustrated in FIG. 15. As illustrated in FIG. 16, the plurality of first receivers $R_B$ and second receivers $R_D$ included in the optical sensor 300 may measure light from substantially the entire area of the sensor detection region 10c. That is, the plurality of first receivers $R_B$ and the second receivers $R_D$ can measure light with the relatively large intensity of light and light with the relatively small intensity of light, both originating from substantially the entire area of the sensor detection region 10c. By doing this, it is possible to measure the brightness of ambient light in the entire sensor detection region 10c. For example, all of measurements of light with the relatively large intensity of light generated by the plurality of first receivers $R_B$ may be used to calculate the average brightness of light with the relatively large intensity of light from the sensor detection region. Likely, all of measurements of light with the relatively small intensity of light generated by the plurality of the second receivers $R_D$ may be used to calculate the average brightness of light with the relatively small intensity of light from the sensor detection region. The calculation of the average value for the sensor detection region can also be applied to the case illustrated in FIG. 15.

Using the average brightness over the regions, the influence by the pixels of the display can be significantly reduced. The pixels of the display are turned on or off according to, for example, an image to be displayed, and the intensity of generated light may also vary. Accordingly, when the receiver of the optical sensor measures light emitted from a specific pixel or several to tens of pixels, the brightness of ambient light calculated from the measurements may be significantly distorted. Even if the average brightness of the entire sensor detection region is used, light generated by a specific pixel may affect some receivers, and distortion may occur locally in the measurements. But, even if some of the measurements are distorted, the effect on the average brightness may be negligible.

Figure 17A:
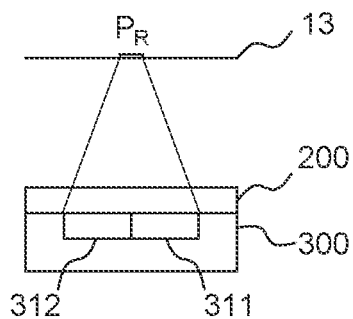
FIG. 17A, FIG. 17B, and FIG. 17C exemplarily illustrate a relationship between under-display color sensor and pixels in the display.
Figure 17B:
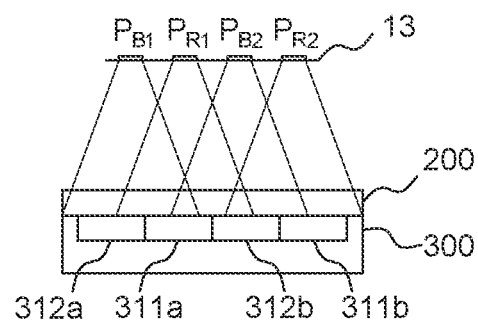
Figure 17C:
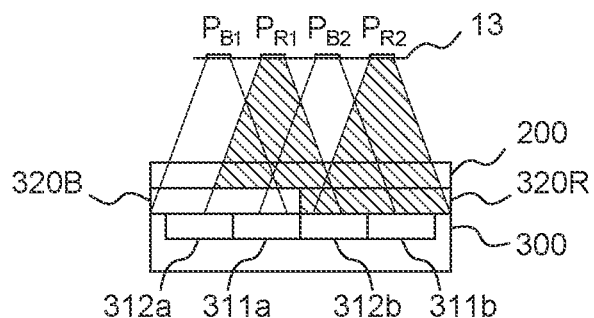

FIG. 17A, FIG. 17B, and FIG. 17C exemplarily illustrate a relationship between under-display color sensor and pixels in the display.

In FIG. 17A, the first receiver 311 and the second receiver 312 may receive light emitted from one display pixel $P_R$. When the first receiver 311 and the second receiver 312 are arranged to face the same point, that is, the display pixel $P_R$, there is no light incident from the point other than the display pixel $P_R$, except for ambient light. Accordingly, a proportional relationship between the light incident on the first receiver 311 and the second receiver 312 is established.

However, as illustrated in FIG. 17B, the pixel layer 13 of the display 10 is composed of a plurality of pixels, and due to an interval between pixels disposed over the pixel layer 13 (i.e., pitch), the lower structure of the pixel (for example, a metal layer for wiring) and so on, a pair of receivers 311a, 312a or 311b, 312b are forced to receive light from several pixels $P_{B1}$, $P_{R1}$, $P_{B2}$, $P_{R2}$. In this case, the first receiver 311a and the second receiver 312a may receive light that is incident from the pixel layer 13, but has different intensities of light. In order to solve such a problem, instead of one-to-one match between a pair of receivers and a pixel, pairs of receivers and pixels may be correlated with m-to-n. That is, the m pairs of receivers receive light from a region consisting of n pixels (hereinafter, pixel region), and measure the intensity of light that has passed through the first and second optical paths by pixel region, thus it becomes possible to minimize the deviation that may occur for each pair of receivers.

Meanwhile, FIG. 17C shows a case in which the color filter layer 320 is further included in the configuration illustrated in FIG. 17B. The first color filter 320B and the second color filter 320R are disposed over the pair of first receivers 311a and 312a and the pair of second receivers 311b and 312b disposed adjacently. The first color filter 320B passes only light belonging to the blue wavelength band, and the second color filter 320R passes only light belonging to the red wavelength band. When the color filters 320B and 320R are disposed in a pair of receivers or in units of receivers, each receiver may receive light of a different intensity. As one of various methods for solving this problem, as described with reference to FIG. 17B, a plurality of pairs of receivers may be disposed under one color filter to measure the intensity of light from the pixel region.

Figure 18:
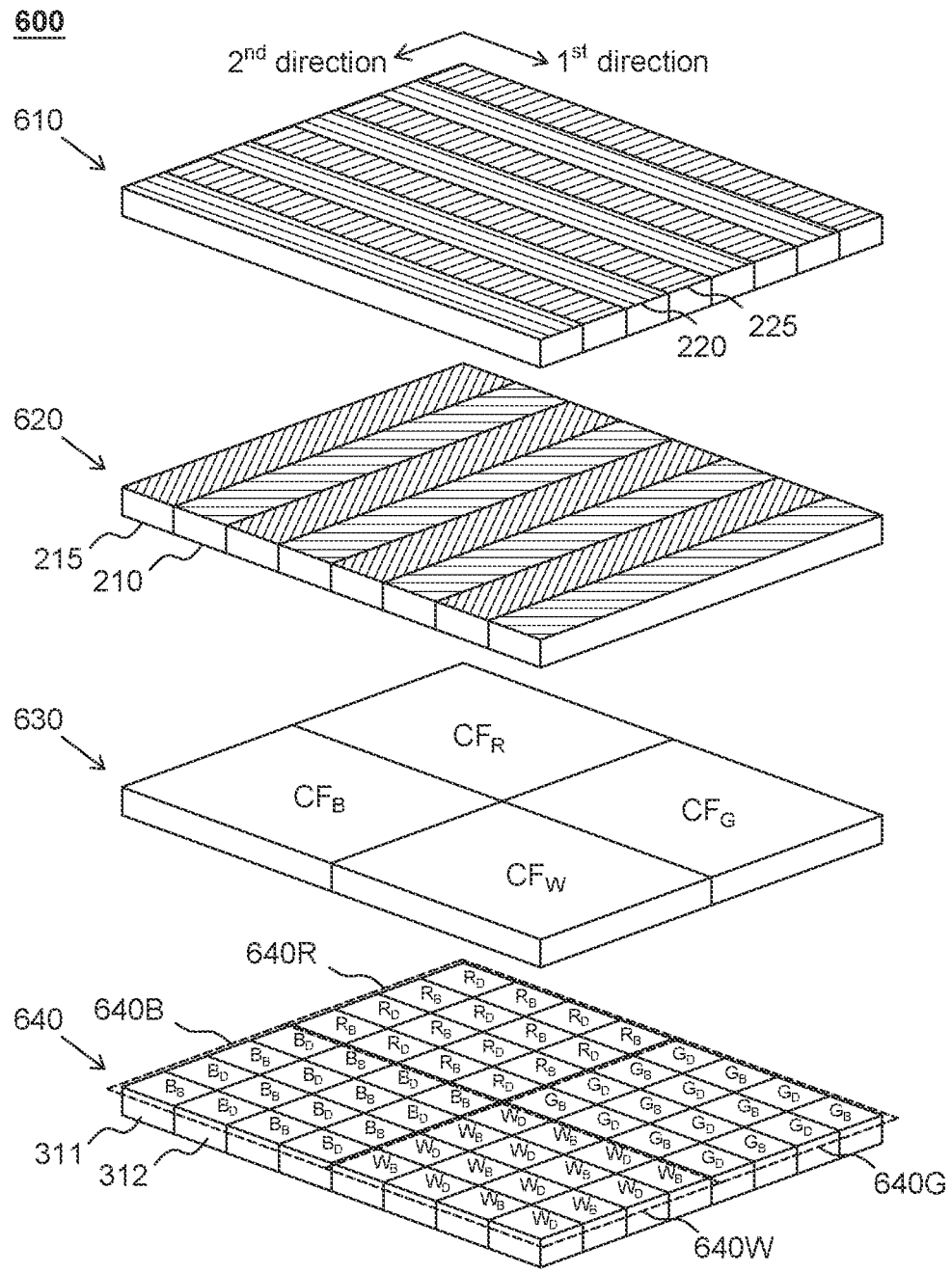
FIG. 18 exemplarily illustrates one embodiment of under-display color sensor.

FIG. 18 exemplarily illustrates one embodiment of under-display color sensor.

The under-display color sensor 600 may be manufactured by stacking a sensor retardation layer 610, a sensor polarization layer 620, a color filter layer 630, and an optical sensor 640. At least the sensor retardation layer 610 and the sensor polarization layer 620 may be in the form of the film.

The sensor retardation layer 610 may be formed by alternately arranging in the second direction the first sensor retardation layer 220 and the second sensor retardation layer 225, each having different slow axes. The first sensor retardation layer 220 and the second sensor retardation layer 225 may have a rectangular shape extending in the first direction.

The sensor polarization layer 620 is disposed under the sensor retardation layer 610. The sensor polarization layer 620 may be formed by alternately arranging in the first direction the first sensor polarization layer 210 and the second sensor polarization layer 215, each having different polarization axes. The first sensor polarization layer 210 and the second sensor polarization layer 215 may have a rectangular shape extending in the second direction.

The sensor retardation layer 610 and the sensor polarization layer 620 form a unit transmission pattern. The unit transmission pattern is the smallest unit among arrangements of the repeated first and second optical paths formed by the sensor retardation layer 610 and the sensor polarization layer 620. The intensity of light received by the receiver of the optical sensor is determined by the unit transmission pattern. In the structure illustrated in FIG. 18, the unit transmission pattern is composed of two first optical paths and two second optical paths, and the same optical paths are disposed diagonally.

The color filter layer 630 is disposed under the sensor polarization layer 620. The color filter layer 630 may pass light belonging to a specific wavelength band and block light belonging to wavelength bands other than the specific wavelength band. The color filter layer 630 may include, for example, a red filter $CF_R$ that passes only light in a red wavelength band, a green filter $CF_G$ that passes only light in a green wavelength band, a blue filter $CF_B$ that passes only light in a blue wavelength band, and a white filter $CF_W$ that passes only light in a white wavelength band.

The plurality of color filters $CF_R$, $CF_G$, $CF_B$ and $CF_W$ are single color filters formed on a plurality of adjacent receivers. That is, the single color filter is formed in a planar shape having a predetermined area to provide light belonging to the same wavelength band to a plurality of adjacent receivers. For example, when a plurality of color filters $CF_R$, $CF_G$, $CF_B$ and $CF_W$ are disposed over the plurality of receivers arranged 4M×4M, under each of the plurality of color filters $CF_R$, $CF_G$, $CF_B$ and $CF_W$, receivers arranged in M×M are disposed respectively.

Accordingly, under the plurality of single color filters $CF_R$, $CF_G$, $CF_B$ and $CF_W$ constituting the color filter layer 630, the color light-receiving regions 640R, 640G, 640B, 640W composed of the plurality of receivers of the optical sensor 640 are formed. In the accompanying drawings, the color filter layer 630 is illustrated in the form of separate film, such as the sensor retardation layer 610 and the sensor polarization layer 620, but this is only an example. That is, the single color filters $CF_R$, $CF_G$, $CF_B$ and $CF_W$ are formed in the form of the film and stacked to cover the plurality of receivers, or may be integrally formed with each receiver. In any cases, the plurality of adjacent receivers can receive light belonging to the same wavelength band. Therefore, regardless of the method of forming the color filter or the color filter layer, if light belonging to the same wavelength band can be provided to the plurality of adjacent receivers, it is referred to as the single color filter.

The optical sensor 640 includes the plurality of receivers and is disposed under the color filter layer 630. The plurality of receivers are divided into a plurality of color light-receiving regions 640R, 640G, 640B, and 640W respectively corresponding to a plurality of single color filters $CF_R$, $CF_G$, $CF_B$ and $CF_W$ disposed thereon. The plurality of receivers belonging to the same color light-receiving area, according to a unit transmission pattern defined by the sensor retardation layer 610 and the sensor polarization layer 620, operate as the first receiver 311 configured for receiving light belonging to the same wavelength band passing through the first optical path and as the second receiver 312 configured for receiving light belonging to the same wavelength band passing through the second optical path. The first receiver 311 and the second receiver 312 have a substantially same structure, and the first receiver 311 at a position on which light with the relatively large intensity of light belonging to the same wavelength band is incident is denoted by subscript 'B' and the second receiver 312 at a position on which light with the relatively small intensity of light belonging to the same wavelength band is incident is denoted by a subscript 'D'.

Figure 19:
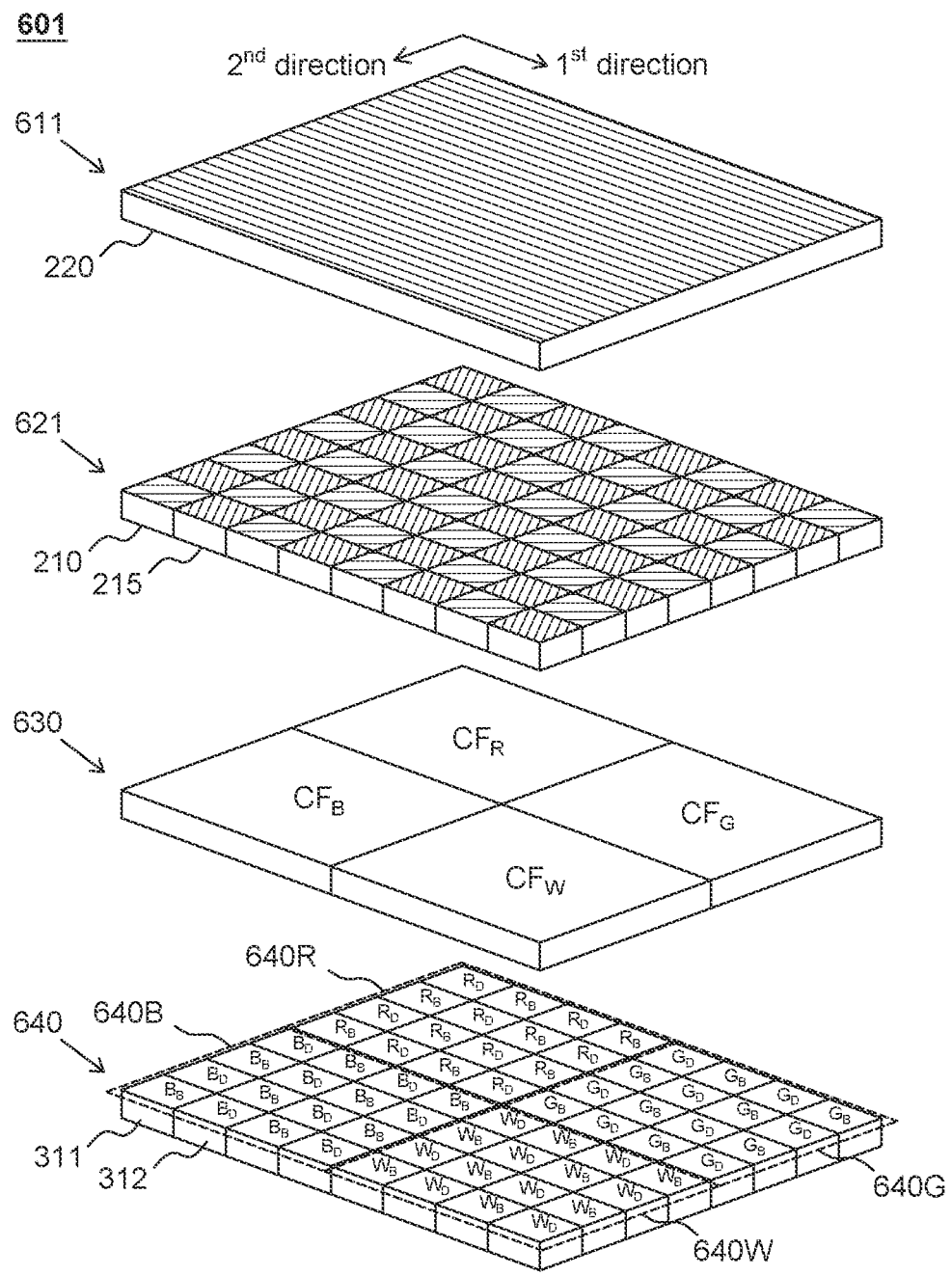
FIG. 19 exemplarily illustrates another embodiment of under-display color sensor.

FIG. 19 exemplarily illustrates another embodiment of under-display color sensor. The same description as in FIG. 18 is omitted, and only differences are described.

The under-display color sensor 601 may include a sensor retardation layer 611, a sensor polarization layer 621, the color filter layer 630, and the optical sensor 640.

The sensor retardation layer 611 may be the first sensor retardation layer 220 in which the slow axis is substantially horizontally formed throughout.

The sensor polarization layer 621 may be formed by alternately arranging the first sensor polarization layer 210 and the second sensor polarization layer 215, each having different polarization axes. The first sensor polarization layer 210 and the second sensor polarization layer 215 may have a square shape. The sensor polarization layer 621 has an arrangement in which the first sensor polarization layer 210 and the second sensor polarization layer 215 are arranged in zigzag. The polarization axis of the first sensor polarization layer 210 may be inclined at the first angle with respect to the slow axis of the sensor retardation layer 611, and the polarization axis of the second sensor polarization layer 215 may be inclined at the second angle with respect to the slow axis of the sensor retardation layer 611.

Since the first sensor polarization layer 210 of the sensor polarization layer 621 passes the first sensor linearly-polarized light 23 and the second sensor linearly-polarized light 31, receivers disposed under the first sensor polarization layer 210 are the first receivers 311 configured for receiving light that has passed through the first optical path. On the other hand, since the second sensor polarization layer 215 passes only the third sensor linearly-polarized light 32, the receivers disposed under the second sensor polarization layer 215 are the second receivers 312 configured for receiving light that has passed through the second optical path. Accordingly, the planar arrangement of the first receivers 311 and the second receivers 312 may be substantially the same as the structure illustrated in FIG. 18.

Figure 20:
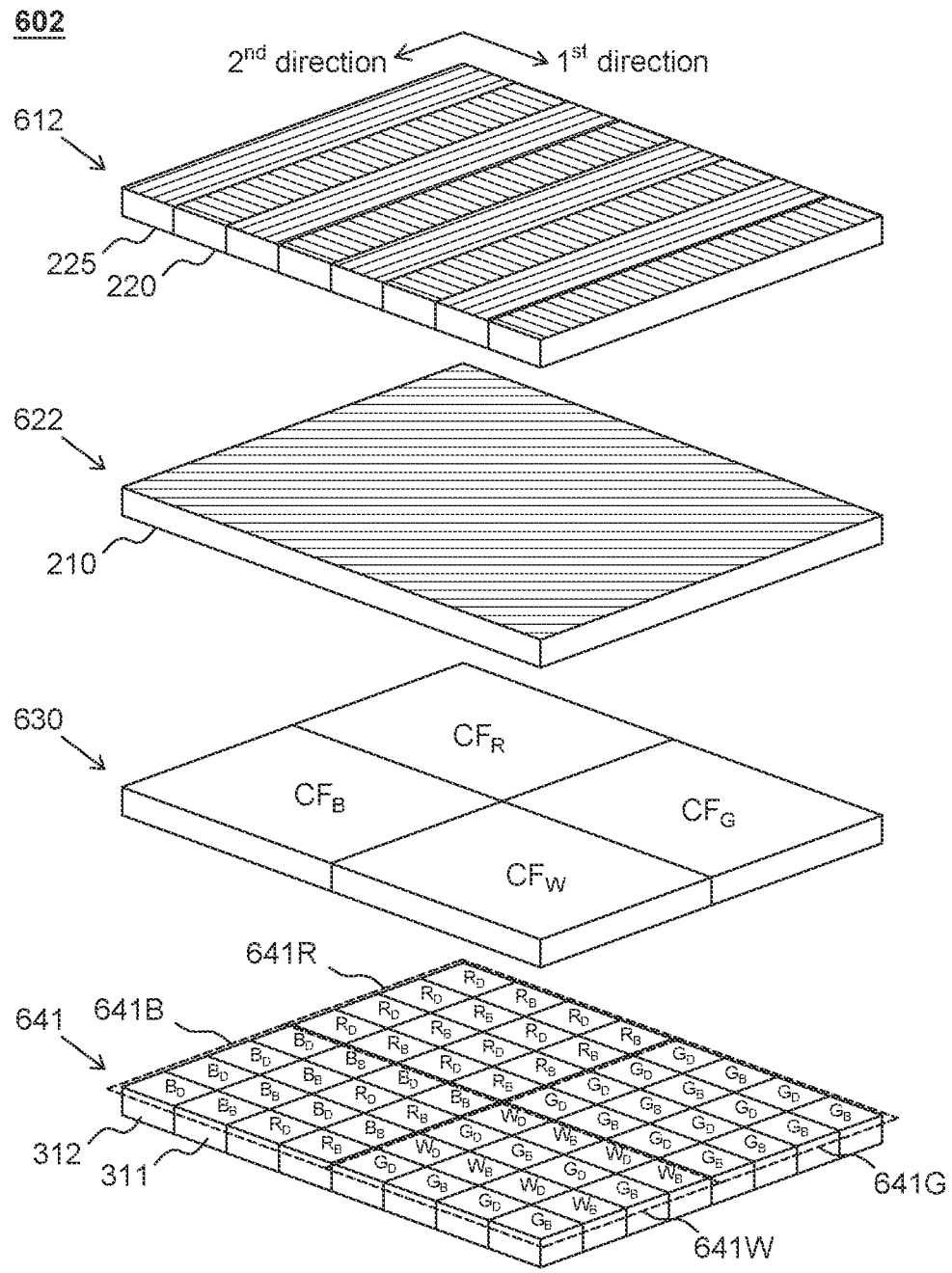
FIG. 20 exemplarily illustrates still another embodiment of under-display color sensor.

FIG. 20 exemplarily illustrates still another embodiment of under-display color sensor. The under-display color sensor illustrated in FIG. 20 has the same unit pattern as the embodiment illustrated in FIG. 21. The same description as in FIGS. 18 and 19 is omitted, and only differences are described.

The under-display color sensor 602 may include a sensor retardation layer 612, a sensor polarization layer 622, the color filter layer 630, and the optical sensor 641.

The sensor retardation layer 612 may be formed by alternately arranging in the first direction the first sensor retardation layer 220 having the first slow axis and the second sensor retardation layer 225 having the second slow axis. The first slow axis and the second slow axis may be substantially perpendicular to each other. The first sensor retardation layer 220 and the second sensor retardation layer 225 may have a rectangular shape extending in the second direction. The first slow axis may be inclined at the first angle with respect to the polarization axis of the sensor polarization layer 622, and the second slow axis may be inclined at the second angle with respect to the polarization axis of the sensor polarization layer 622.

The sensor polarization layer 622 is disposed under the sensor retardation layer 612. The sensor polarization layer 622 may be the first sensor polarization layer 210 having the same polarization axis throughout. Since the sensor polarization layer 622 passes the first sensor internal linearly-polarized light 22b and the second sensor linearly-polarized light 31 that have passed through the first sensor retardation layer 220, the receivers disposed under the sensor polarization layer 622 along the length direction of the first sensor retardation 220, that is, in the second direction, are the first receivers 311 configured for receiving light that have passed through the first optical path. On the other hand, since the sensor polarization layer 622 passes only the third sensor linearly-polarized light 32 that has passed through the second sensor retardation layer 225, the receivers disposed under the sensor polarization layer 622 along the length direction of the second sensor retardation 225, that is, in the second direction, are the second receivers 312 configured for receiving light that have passed through the second optical path.

The optical sensor 641 includes the plurality of receivers and is disposed under the color filter layer 630. The plurality of receivers are divided into color light-receiving regions 641R, 641G, 641B and 641W respectively corresponding to the plurality of single color filters $CF_R$, $CF_G$, $CF_B$ and $CF_W$ disposed thereon.

Figure 21:
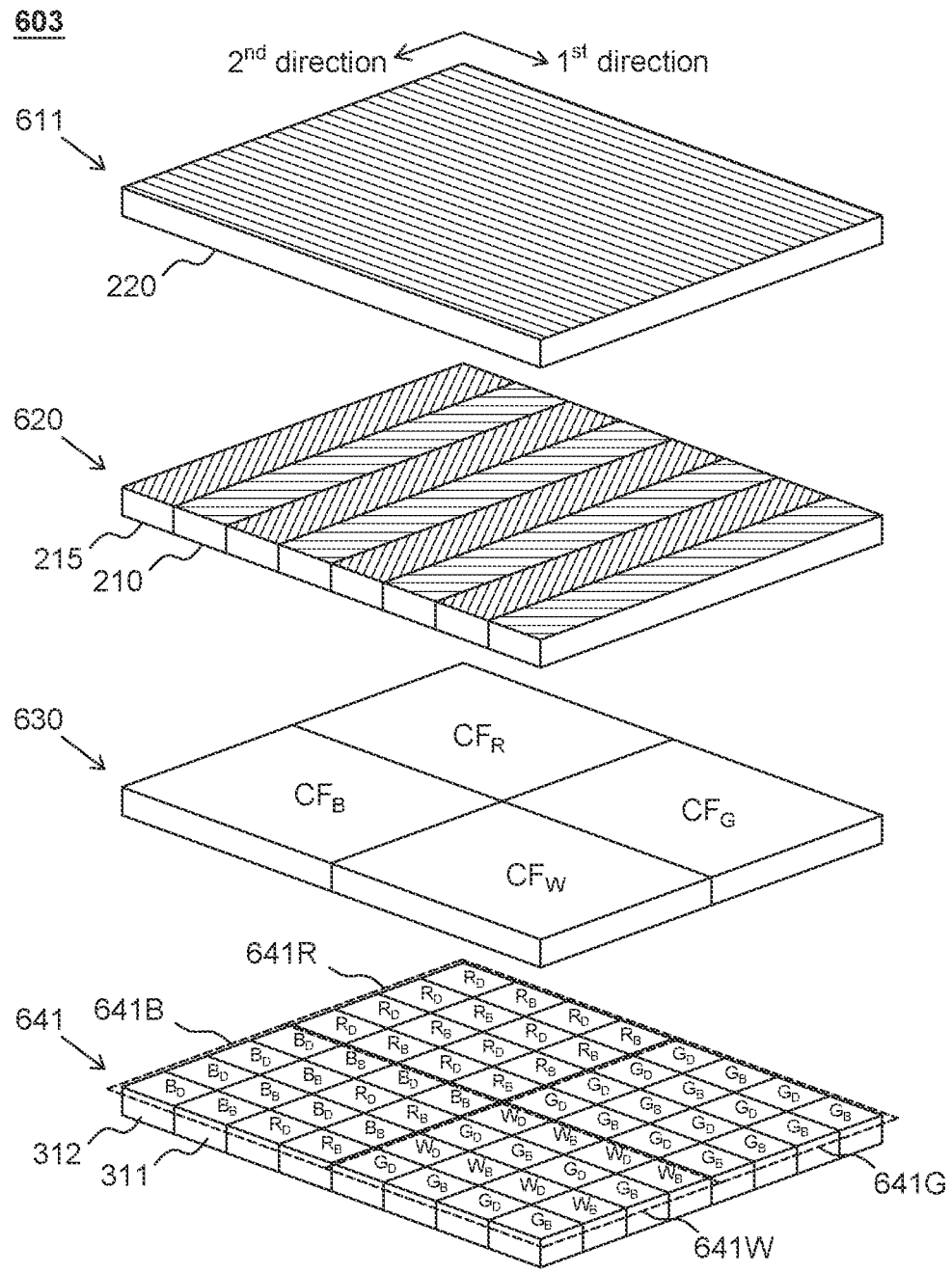
FIG. 21 exemplarily illustrates still another embodiment of under-display color sensor.

FIG. 21 exemplarily illustrates still another embodiment of under-display color sensor. The same description as in FIGS. 18 to 20 will be omitted, and only differences will be described.

The under-display color sensor 603 may include the sensor retardation layer 611, the sensor polarization layer 620, the color filter layer 630, and the optical sensor 641.

The sensor retardation layer 611 may be the first sensor retardation layer 220 in which the slow axis is substantially horizontally formed throughout.

The sensor polarization layer 620 is disposed under the sensor retardation layer 611. The sensor polarization layer 620 may be formed by alternately arranging in the first direction the first sensor polarization layer 210 and the second sensor polarization layer 215, each having different polarization axes. The first sensor polarization layer 210 and the second sensor polarization layer 215 may have a rectangular shape extending in the second direction.

The optical sensor 641 includes the plurality of receivers and is disposed under the color filter layer 630. The plurality of receivers are divided into color light-receiving regions 641R, 641G, 641B and 641W respectively corresponding to a plurality of single color filters $CF_R$, $CF_G$, $CF_B$ and $CF_W$ disposed thereon.

Figure 22:
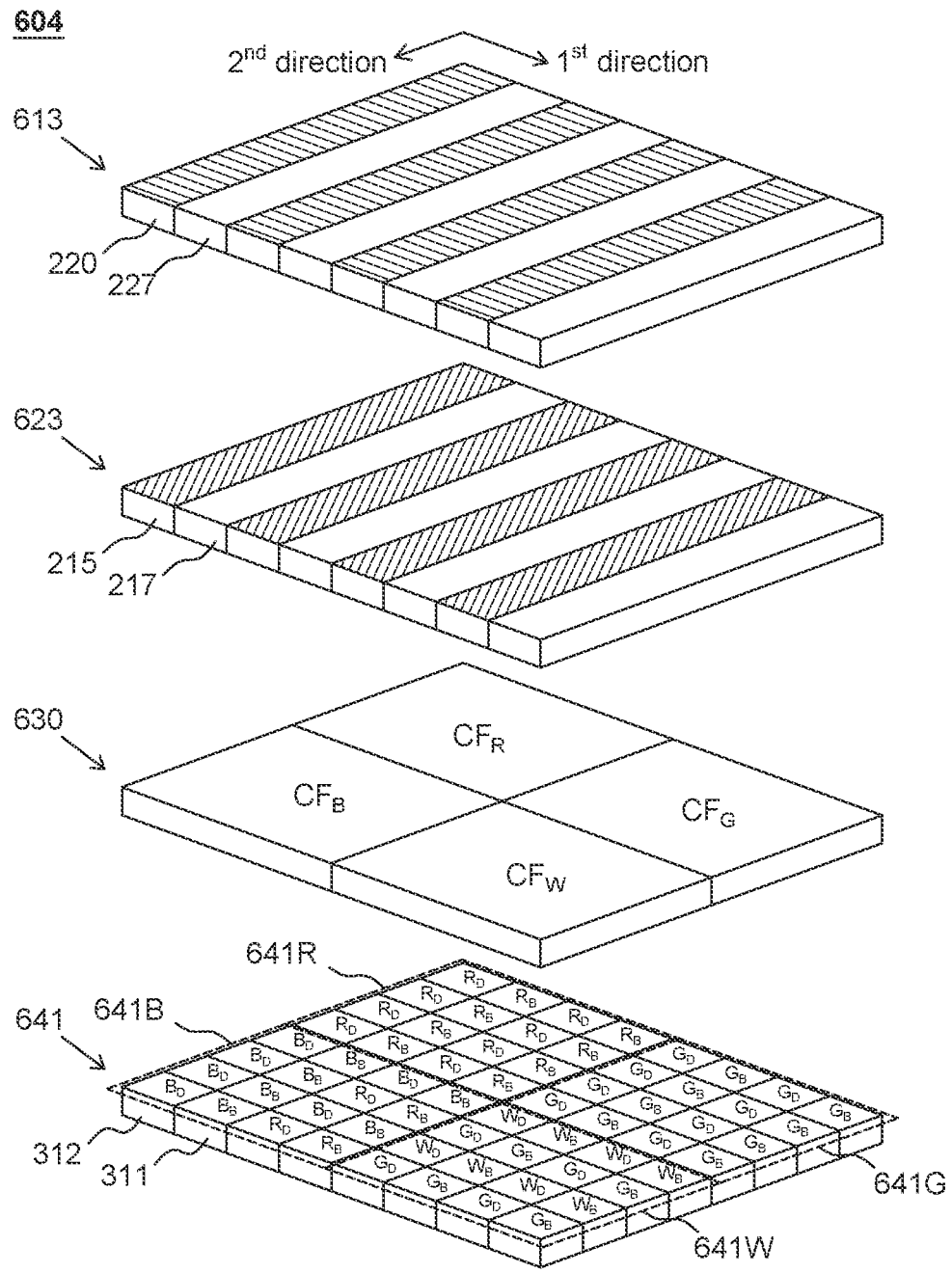
FIG. 22 exemplarily illustrates still another embodiment of under-display color sensor.

FIG. 22 exemplarily illustrates still another embodiment of under-display color sensor. The same description as in FIGS. 18 to 21 will be omitted, and only differences will be described.

The under-display color sensor 604 may include a sensor retardation layer 613, a sensor polarization layer 623, the color filter layer 630, and the optical sensor 641.

In one embodiment, the sensor retardation layer 613 may be formed by alternately arranging the first sensor retardation layer 220 having the first slow axis and the second light transmission layer 227 in the first direction. The first sensor retardation layer 220 and the second light transmission layer 227 may have a rectangular shape extending in the second direction. The sensor polarization layer 623 is disposed under the sensor retardation layer 613. The sensor polarization layer 623 may be formed by alternately arranging the second sensor polarization layer 215 having the second polarization axis and the first light transmission layer 217 in the first direction. The second sensor polarization layer 215 and the first light transmission layer 217 may have a rectangular shape extending in the second direction. The second sensor polarization layer 215 and the first sensor retardation layer 220 form the second optical path, and the first light transmission layer 217 and the second light transmission layer 227 form the first optical path.

In another embodiment, the sensor retardation layer 613 may be formed by alternately arranging the second sensor retardation layer 225 having the second slow axis and the second light transmission layer 227 in the first direction. The second sensor retardation layer 225 and the second light transmission layer 227 may have a rectangular shape extending in the second direction. The sensor polarization layer 623 is disposed under the sensor retardation layer 613. The sensor polarization layer 623 may be formed by alternately arranging the first sensor polarization layer 210 having the first polarization axis and the first light transmission layer 217 in the first direction. The first sensor polarization layer 210 and the first light transmission layer 217 may have a rectangular shape extending in the second direction. The first sensor polarization layer 210 and the second sensor retardation layer 225 form the second optical path, and the first light transmission layer 217 and the second light transmission layer 227 form the first optical path.

In one embodiment, the receivers disposed under the second sensor polarization layer 215 along the second direction are the second receivers 312 configured for receiving light that has passed through the second optical path. Similarly, in another embodiment, the receivers disposed under the first sensor polarization layer 210 along the second direction are the second receivers 312 configured for receiving light that has passed through the second optical path. On the other hand, the receivers disposed under the first light transmission layer 217 along the second direction are the first receivers 311 configured for receiving light that has passed through the first optical path. Accordingly, the planar arrangement of the first receivers 311 and the second receivers 312 may be substantially the same as that of the sensor polarization layer 623.

Figure 23:
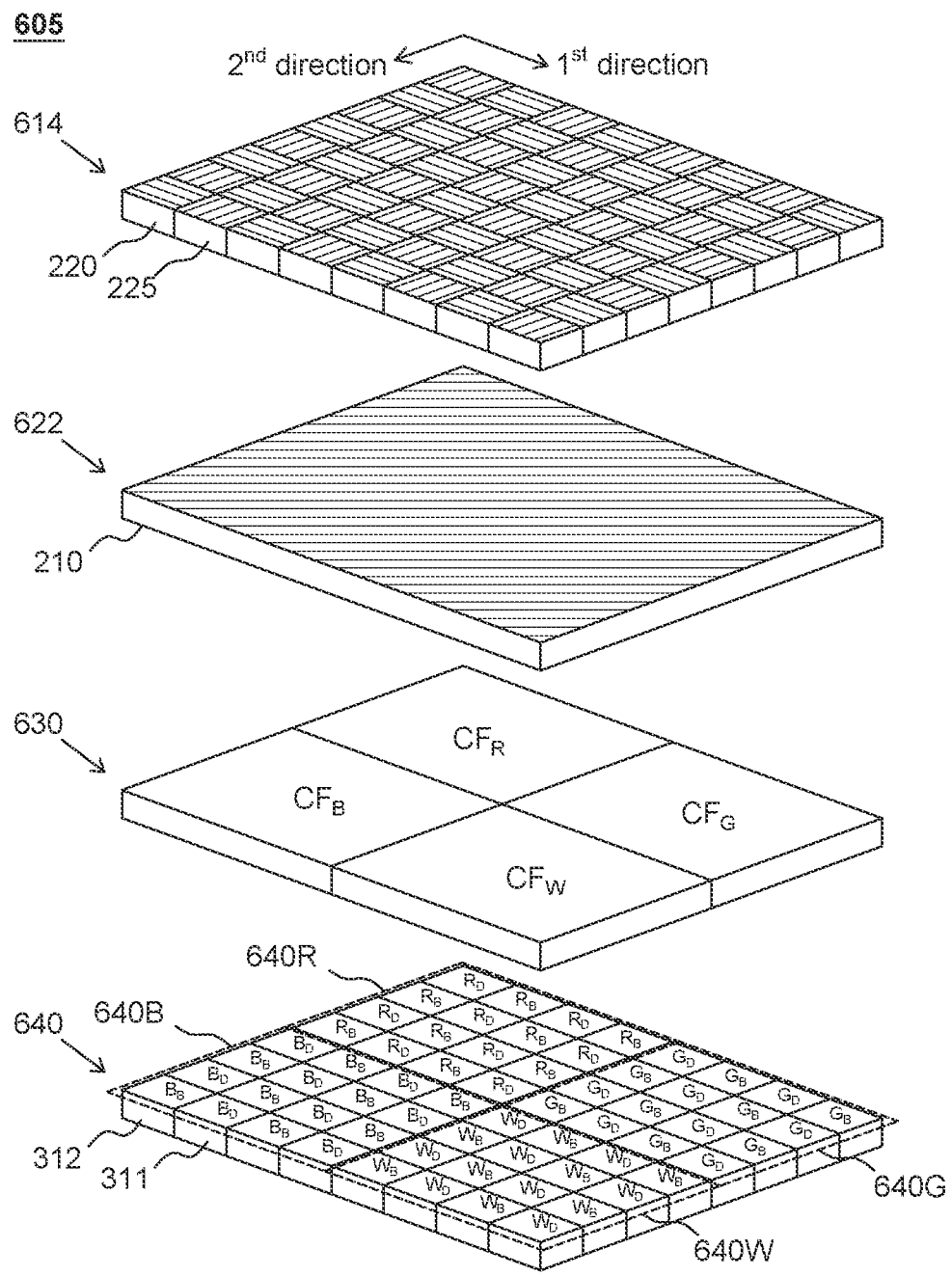
FIG. 23 exemplarily illustrates still another embodiment of under-display color sensor.

FIG. 23 exemplarily illustrates still another embodiment of under-display color sensor. The same description as in FIGS. 18 to 22 will be omitted, and only differences will be described.

The under-display color illuminance sensor 605 may include a sensor retardation layer 614, the sensor polarization layer 622, the color filter layer 630, and the optical sensor 640.

The sensor retardation layer 614 may be formed by alternately arranging the first sensor retardation layer 220 and the second sensor retardation layer 225, each having different slow axes. The first sensor retardation layer 220 and the second sensor retardation layer 225 may have a square shape. The sensor retardation layer 614 has the arrangement in which the first sensor retardation layer 220 and the second sensor retardation layer 225 are arranged in zigzag.

The sensor polarization layer 622 is disposed under the sensor retardation layer 614. The sensor polarization layer 622 may be the first sensor polarization layer 210 having the same polarization axis throughout. The polarization axis of the first sensor polarization layer 210 may be inclined at the first angle with respect to the slow axis of the first sensor retardation layer 220 and at the second angle with respect to the slow axis of the second sensor retardation layer 225.

Since the sensor polarization layer 622 disposed under the first sensor retardation layer 220 passes the first sensor internal linearly-polarized light 22b and the second sensor linearly-polarized light 31 that have passed through the first sensor retardation layer 220, the receivers disposed under the first sensor retardation layer 220 are the first receivers 311 configured for receiving light that has passed through the first optical path. On the other hand, since the sensor polarization layer 622 disposed under the second sensor retardation layer 225 passes only the third sensor linearly-polarized light 32 that has passed through the second sensor retardation layer 225, the receivers disposed under the second sensor retardation layer 225 are the second receivers 312 configured for receiving light that has passed through the second optical path. Accordingly, the planar arrangement of the first receivers 311 and the second receivers 312 may be substantially the same as the structure illustrated in FIG. 18.

Figure 24A:
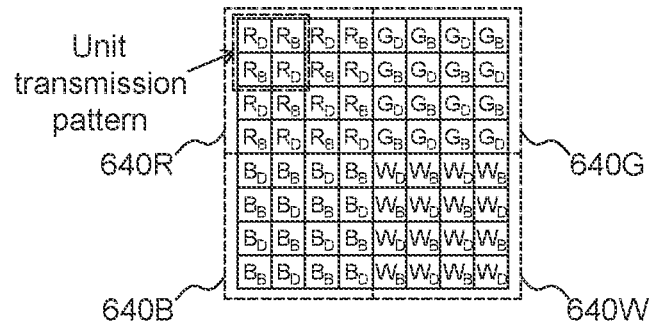
FIG. 24A and FIG. 24B exemplarily illustrate one embodiment of measuring light from pixel region by using color receiving region formed by combination of unit transmission pattern and color filter.
Figure 24B:
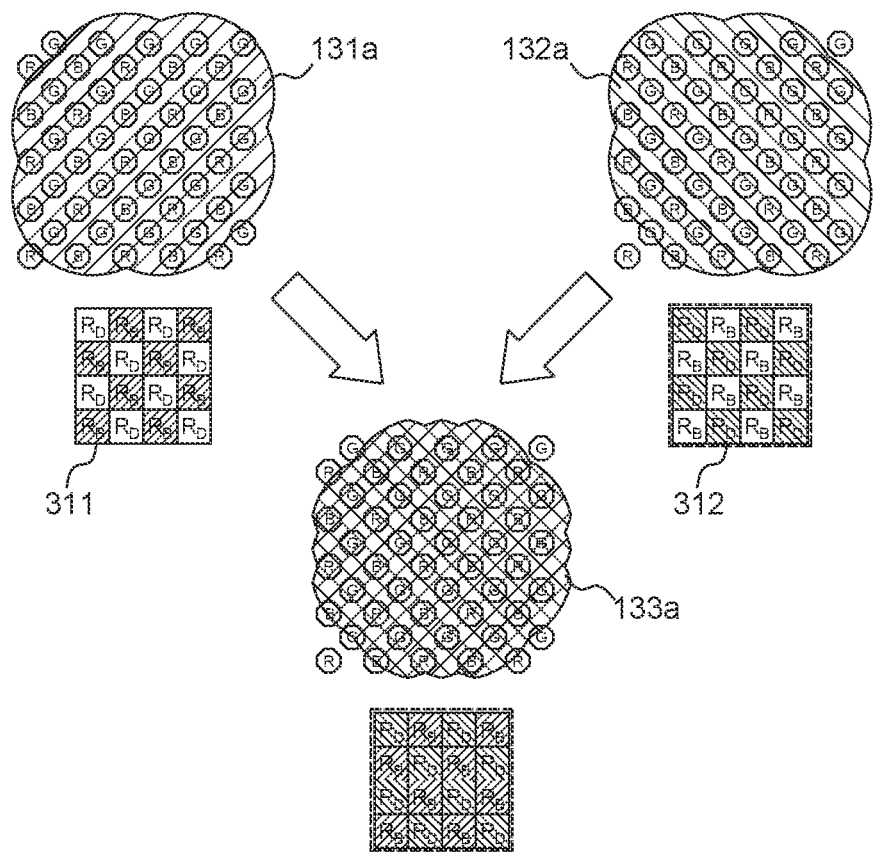

FIG. 24A and FIG. 24B exemplarily illustrate one embodiment of measuring light from pixel region by using color receiving region formed by combination of unit transmission pattern and color filter. In order to simplify the description, ambient light that is substantially uniformly incident on the entire color light-receiving region is not described.

The method of measuring light in each of divided wavelength bands can measure the brightness of ambient light, that is, the illuminance, more accurately than the measurement method in which the wavelength bands of light are not divided. In particular, when light belonging to the same wavelength band is separated into light having the relatively large intensity of light and light having the relatively small intensity of light by passing the light selection layer, the brightness of ambient light around the electronic device can be accurately measured even under the display. In addition, the color temperature may be calculated from the brightness of light for each wavelength band. The calculated color temperature may be provided to a display or a camera of the electronic device and used to correct an image displayed on the display or an image captured by the camera.

Four color light-receiving areas 640R, 640G, 640B, and 640W that a unit transmission pattern formed by a combination of the sensor polarization layer and the sensor retardation layer and four single color filters $CF_R$, $CF_G$, $CF_B$, and $CF_W$ define in the optical sensor 640 are shown in FIG. 24A. The unit transmission pattern is formed by two first optical paths and two second optical paths, and the same optical paths are disposed diagonally. For this reason, the first receiver 311 and the second receiver 312 are disposed in a diagonal direction on the color light-receiving area (hereinafter, zigzag arrangement).

In FIG. 24B, the first pixel region 131a corresponding to the plurality of the first receivers 311, the second pixel region 132a corresponding to the plurality of the second receivers 312 (the first receivers 311 and the second receivers 312 belonging to the first color light-receiving region 640R among four color light-receiving regions 640R, 640G, 640B, 640W illustrated in FIG. 24A), and the joined pixel region 133a thereof are presented. The first receivers 311 and the second receivers 312 may receive light having an incident angle within a viewing angle range. The region emitting light toward the first receivers 311 and the second receivers 312 may be approximated to a circular region on the pixel layer 13. Accordingly, the region emitting light toward the plurality of first receivers 311 may be defined as the first pixel region 131a, and the region emitting light toward the plurality of second receivers 312 may be defined the second pixel region 132a.

The joined pixel region 133a of the first pixel region 131a corresponding to the plurality of first receivers 311 and the second pixel region 132a corresponding to the plurality of second receivers 312 is formed. The joined pixel region 133a may be formed in a shape close to a circle due to the zigzag arrangement of the plurality of first receivers 311 and the plurality of second receivers 312.

Among the light emitted from the joined pixel region 133a, light belonging to the red wavelength band passes through the red color filter $CF_R$, but light belonging to the other wavelength band is blocked by the red color filter $CF_R$. Accordingly, the plurality of first receivers 311 belonging to the first color light-receiving region 640R may receive light belonging to the red wavelength band emitted from the joined pixel region 133a through the first optical path, and the plurality of second receivers 312 may receive light belonging to the red wavelength band through the second optical path.

In FIG. 24B, the intensity of light measured by the plurality of first receivers 311 and the intensity of light measured by the second receiver 312 may be processed in various ways. The measured intensity of light may be presented not only as a pixel current, which is an analog signal output from the receivers 311, 312, but also pixel data obtained by converting this into a digital signal. For example, the intensity of light measured by the plurality of first receivers 311 is used to calculate the average intensity of light that has passed through the first optical path from the joined pixel region 133a, and the intensity of light measured by the plurality of second receivers 312 is used to calculate the average intensity of light that has passed through the second optical path from the joined pixel region 133a. As another example, the intensity of light measured by the pair of receivers apart from the boundary of the first color light-receiving region 640R among the plurality of first receivers 311 may be used to calculate the average intensity of light.

Figure 25A:
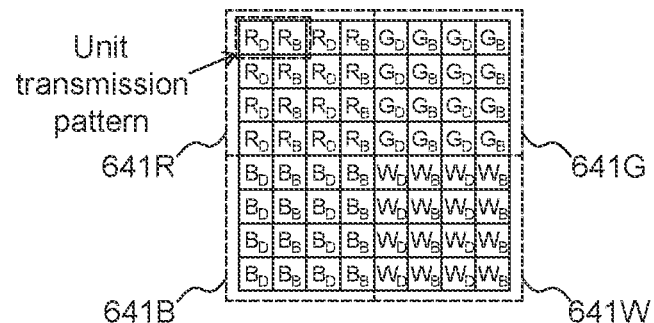
FIG. 25A and FIG. 25B exemplarily illustrate another embodiment of measuring light from pixel region by using color receiving region formed by combination of unit transmission pattern and color filter.
Figure 25B:
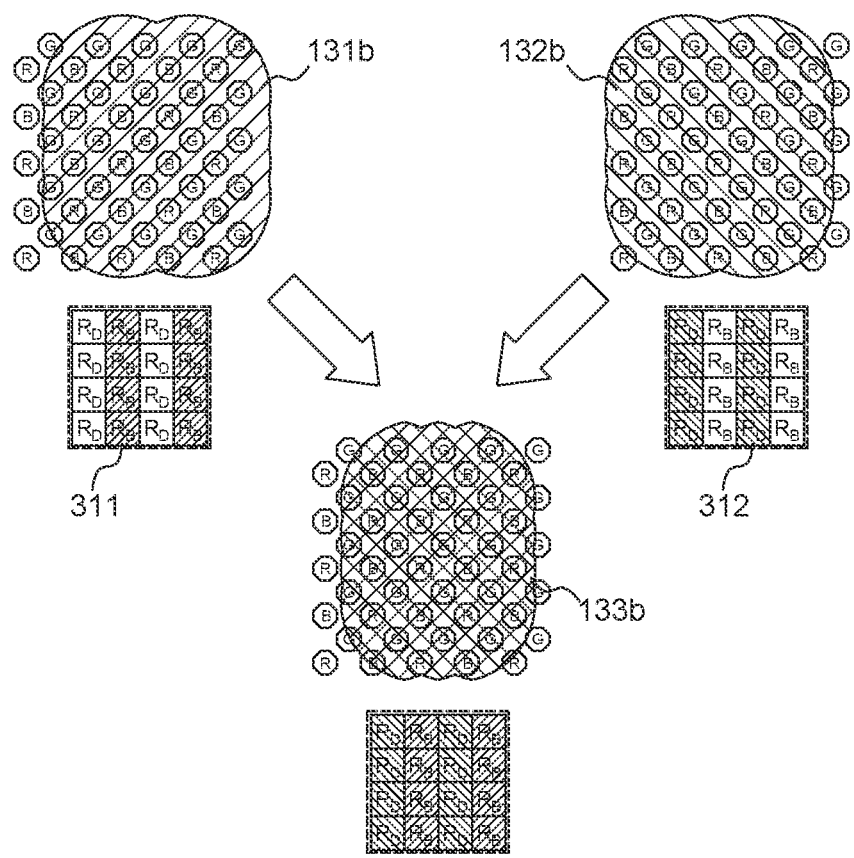

FIG. 25A and FIG. 25B exemplarily illustrate another embodiment of measuring light from pixel region by using color receiving region formed by combination of unit transmission pattern and color filter. In order to simplify the description, the same description same as in FIG. 24A and FIG. 24B will be omitted.

Four color light-receiving areas 641R, 641G, 641B, and 641W that a unit transmission pattern formed by a combination of the sensor polarization layer and the sensor retardation layer and four single color filters $CF_R$, $CF_G$, $CF_B$, and $CF_W$ define in the optical sensor 641 are shown in FIG. 25A. The unit transmission pattern is formed by one first optical path and one second optical path, and these two optical paths are disposed in contact with each other. For this reason, the first receiver 311 and the second receiver 312 are disposed over the same line (hereinafter, stripe arrangement).

In FIG. 25B, the first pixel region 131b corresponding to the plurality of the first receivers 311, the second pixel region 132b corresponding to the plurality of the second receivers 312 (the first receivers 311 and the second receivers 312 are stripe-arranged in the first color light-receiving region 641R), and the joined pixel region 133b thereof are presented. The joined pixel region 133b may be formed in a shape close to a rectangle due to the stripe arrangement of the plurality of first receivers 311 and the plurality of second receivers 312. Compared with the joined pixel region 133a illustrated in FIG. 24B, the area of the joined pixel region 133b may be relatively reduced.

Figure 26A:
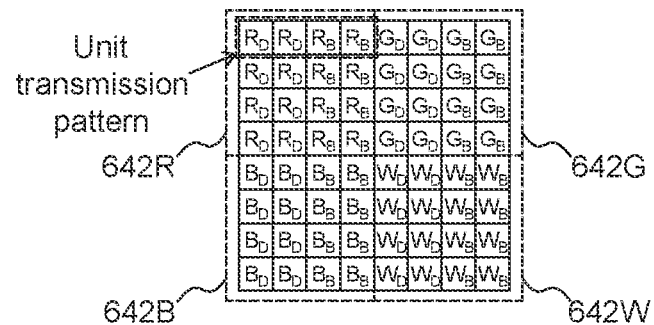
FIG. 26A and FIG. 26B exemplarily illustrate still another one embodiment of measuring light from pixel region by using color receiving region formed by combination of unit transmission pattern and color filter.
Figure 26B:
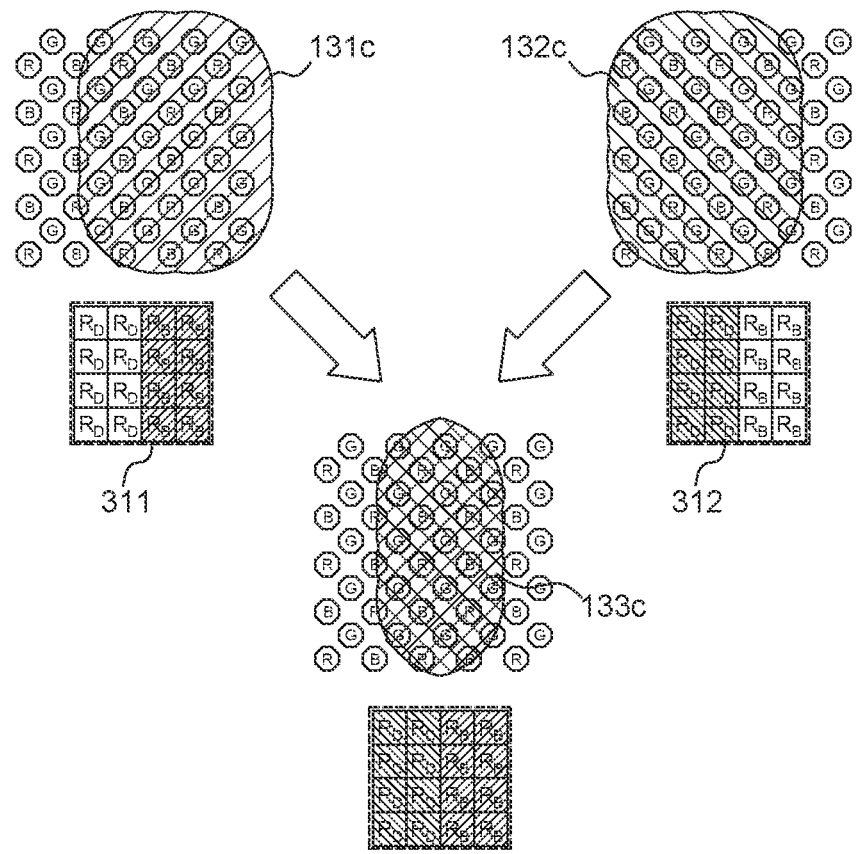

FIG. 26A and FIG. 26B exemplarily illustrate still another embodiment of measuring light from pixel region by using color receiving region formed by combination of unit transmission pattern and color filter. In order to simplify the description, the same description same as in FIG. 24A and FIG. 24B will be omitted.

Four color light-receiving areas 642R, 642G, 642B, and 642W that a unit transmission pattern formed by a combination of the sensor polarization layer and the sensor retardation layer and four single color filters $CF_R$, $CF_G$, $CF_B$, and $CF_W$ define in the optical sensor are shown in FIG. 26A. The unit transmission pattern is formed by n first optical paths and n second optical paths (n≥2), and same type optical paths are disposed over the same line so as to be in contact with each other. For this reason, the sum of the first receiver 311 and the second receiver 312 in the same color light-receiving area is $4n^2$ (hereinafter, half-and-half arrangement).

In FIG. 26B, the first pixel region 131c corresponding to the plurality of the first receivers 311, the second pixel region 132c corresponding to the plurality of the second receivers 312 (the first receivers 311 and the second receivers 312 are stripe-arranged in the first color light-receiving region 641R), and the joined pixel region 133c thereof are presented. The joined pixel region 133c may be formed in a shape close to an ellipse due to the half-and-half arrangement of the plurality of first receivers 311 and the plurality of second receivers 312. Compared with the joined pixel region 133*b* illustrated in FIG. 25B, the area of the joined pixel region 133*c* may be relatively reduced.

Figure 27A:
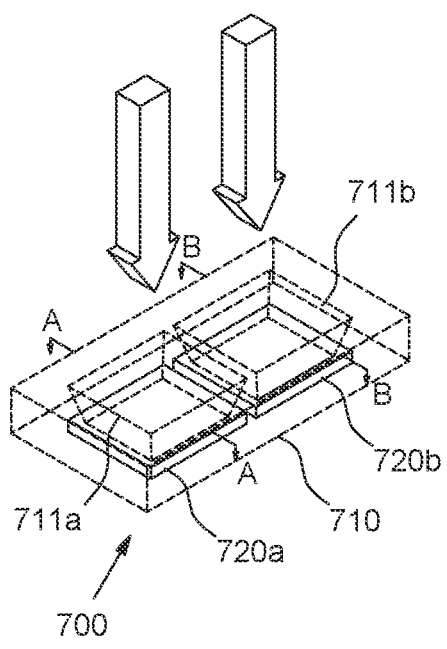
FIG. 27A and FIG. 27B exemplarily illustrate a need to drive two or more separated under-display sensors simultaneously.
Figure 27B:
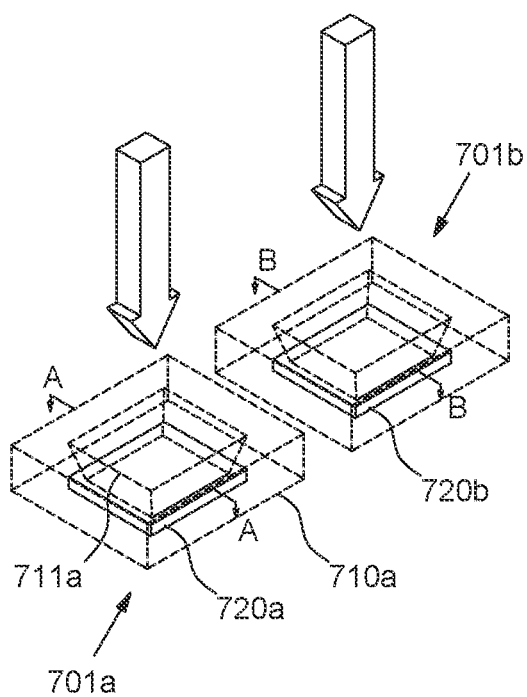

FIG. 27A and FIG. 27B exemplarily illustrate a need to drive two or more separated under-display sensors simultaneously.

Simultaneous driving is required in under-display sensors operating in an environment in which the object to be measured is affected by temporally changing noise. The under-display sensor measures not only reflected light but also noise such as ambient light, internally-reflected sensor circular polarization, and light incident from the display. Therefore, since the measurements are affected not only by reflected light but also by noise, in order to measure the intensity of reflected light alone, a plurality of sensors are disposed under the display, and in particular, it is necessary to be driven simultaneously. Compared to reflected light that is kept relatively constant, the intensity of noise may vary within a few to tens of microseconds. Therefore, even when a plurality of sensors are used, if the operating time is different for each sensor, the measurements are different for each sensor, and the noise cannot be removed from the measurements. It goes without saying that the simultaneous driving method proposed in the present specification can be applied not only to under-display sensors, but also to other types of semiconductor devices supporting I²C communication.

Referring to FIG. 27A and FIG. 27B, the under-display sensor may be implemented in various configurations. The first type of sensor 700 includes a plurality of chips 720*a*, 720*b* in one packaging 710. The second type of sensor 701*a* includes one chip 720*a* in one packaging 710*a*. The packaging 710 of the first type of sensor 700 includes a plurality of through holes 711*a*, 711*b* for exposing the chips 720*a*, 720*b* to the outside. The packaging 710*a* of the second type of sensor 701*a* includes one through hole 711*a* for exposing the chip 720*a* to the outside.

Basically, the chips 720*a*, 720*b* may have a function of measuring the intensity of reflected light and noise in common. However, the characteristics of light incident on each of the chips 720*a*, 720*b* may be different. In one embodiment, in the sensor 700 of the first type, the chips 720*a*, 720*b* receive both reflected light and noise, but the first chip 720*a* receives substantially lossless reflected light and noise (both have passed through the first optical path), and the second chip 720*b* receives reflected light and noise (both have passed through the first optical path) having an intensity proportional to the intensity of the light received by the first chip 720*a*. Similarly, in the second type of sensor 701*a*, 701*b*, the chip 720*a* of the sensor 701*a* receives substantially lossless reflected light and noise, and the chip 720*b* of the sensor 701*b* receives reflected light and noise having an intensity proportional to the intensity of light received by the first chip 720*a*.

In the first and second types of sensors 700, 701*a*, 701*b*, the operating of the chips 720*a*, 720*b* is substantially synchronized. That is, an operating start time and an operating end time of the chips 720*a*, 720*b* are substantially the same. This is because the influence of noise can be removed from the measurements only when the chips 720*a*, 720*b* receive the same noise.

The first and second types of sensors 700, 701*a*, 701*b* are substantially, except for the difference between whether the first optical path and the second optical path are implemented in one packaging or in each packaging, they are the same sensor. Therefore, in the following description, the first type of sensor 700 will be mainly described.

Figure 28A:
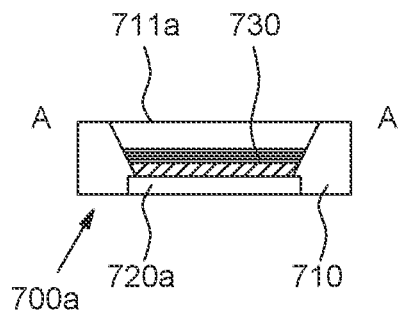
FIG. 28A, FIG. 28B, FIG. 28C, FIG. 28D and FIG. 28E exemplarily illustrate cross-sections along AA and BB of FIG. 27A and FIG. 27B.
Figure 28D:
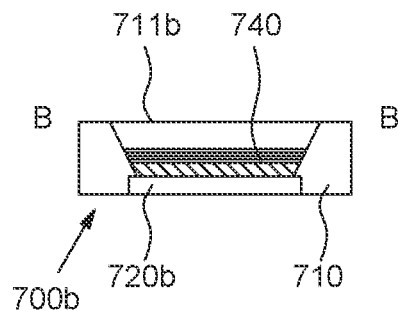
Figure 28B:
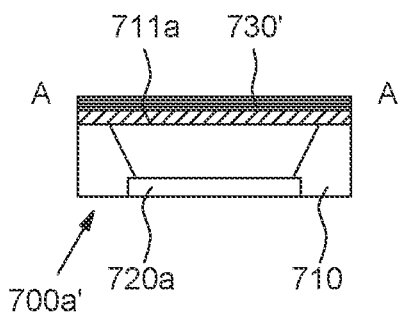
Figure 28E:
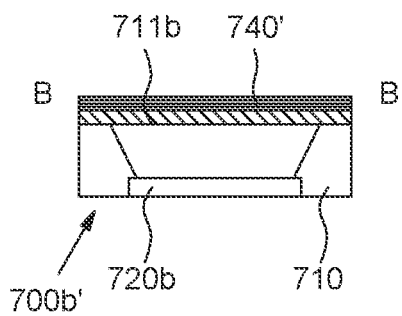

FIG. 28A, FIG. 28B, FIG. 28C, FIG. 28D and FIG. 28E exemplarily illustrate cross-sections along AA and BB of FIG. 27A and FIG. 27B, and FIGS. 28A, 28B, 28C are cross-section for receiving light passing through the first optical path, and FIGS. 28D, 28E show cross-section for receiving light passing through the second optical path.

Referring to FIG. 28A, the first sensor 700*a* includes a packaging 710, a first light selection layer 730, and the first chip 720*a*. The first light selection layer 730 forms the first optical path and may be disposed over the upper surface of the first chip 720*a*. The first light selection layer 730 covers at least the photo cell area of the first chip 720*a*. The first light selection layer 730 and the photo cell area may receive reflected light and/or noise incident from the display through the through hole 711*a*.

Referring to FIG. 28B, the first sensor 700*a*′ includes the packaging 710, a first light selection layer 730′, and the first chip 720*a*. The first light selection layer 730′ forms the first optical path and may be disposed over the upper surface of the packaging 710. The first light selection layer 730′ covers at least the through hole 711*a*.

Referring to FIG. 28D, the second sensor 700*b* includes the packaging 710, a second light selection layer 740, and the second chip 720*b*. The second light selection layer 740 may form the second optical path and may be disposed over the upper surface of the second chip 720*b*. Here, the second light selection layer 740 covers at least the photo cell area of the second chip 720*b*. The second light selection layer 740 and the photo cell area may receive reflected light and/or noise incident from the display through the through hole 711*b*.

Referring to FIG. 28E, the second sensor 700*b*′ includes the packaging 710, a second light selection layer 740′, and the second chip 720*b*. The second light selection layer 740′ forms the second optical path and may be disposed over the upper surface of the packaging 710. The second light selection layer 740′ covers at least the through hole 711*b*.

Figure 28C:
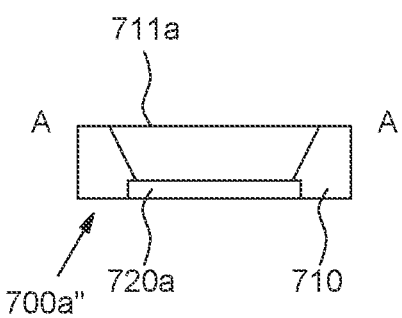

Referring to FIG. 28C, the first sensor 700*a*″ includes the packaging 710 and the first chip 720*a*. As described above, the first chip 720*a* and the second chip 720*b* may remove the effect of noise by using a difference in measurements for reflected light and noise received within the same operating period. Therefore, if there is only a proportional relationship between the measurements of the first chip 720*a* of the first sensor 700*a*″ and the second chip 720*b* of the second sensors 700*b*, 700, the first sensor 700*e* does not need to include the light selection layer 730 or 730′.

The first light selection layer 730 and the first light selection layer 730′ provide the same function, that is, the first optical path, but may have different structures, and the second light selection layer 740 and the second light selection layer 740′ also provide the second optical path, but may have a different structure. The first light selection layers 730, 730′ may include the first sensor retardation layer 220 and the first sensor polarization layer 210, as described with reference to FIGS. 1 through 7. Meanwhile, the first light selection layers 730, 730′ may include the second sensor retardation layer 225 and the second sensor polarization layer 215. The second light selection layers 740, 740′ may include the first sensor retardation layer 220 and the second sensor polarization layer 215 as described with reference to FIGS. 1 to 7. Meanwhile, the second light selection layers 740, 740′ may include the second sensor retardation layer 225 and the first sensor polarization layer 210. The examples shown in FIGS. 28A through 28E are only for explaining that the light selection layers 730, 730′, 740, 740′ may be disposed at various locations, and does not limit that a specific structure should be disposed at a specific location.

Figure 29A:
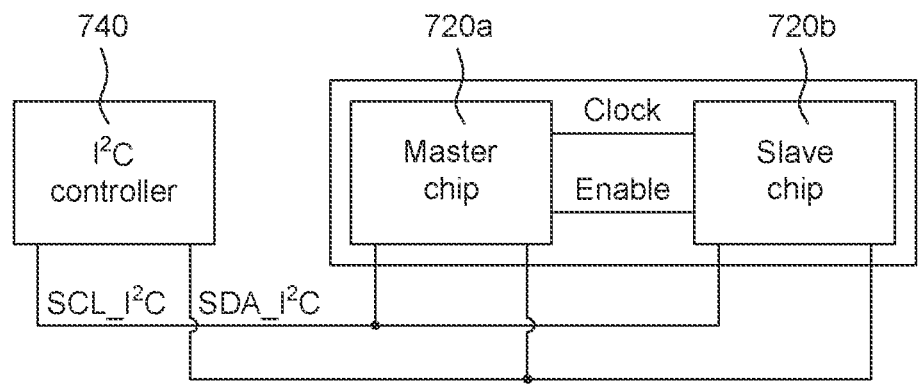
FIG. 29A and FIG. 29B exemplarily illustrate a configuration for simultaneously driving a plurality of chips.
Figure 29B:
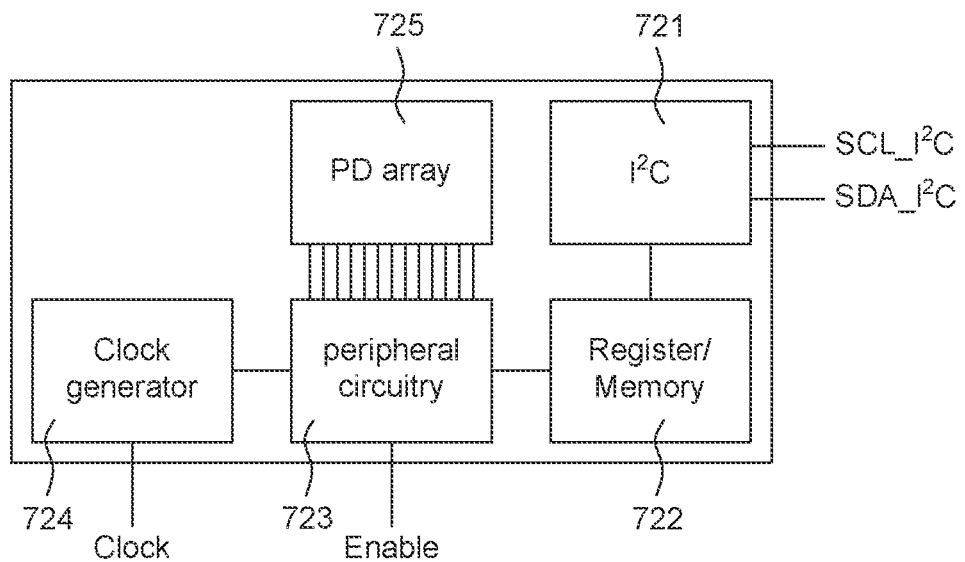

FIG. 29A and FIG. 29B exemplarily illustrate a configuration for simultaneously driving a plurality of chips, in which FIG. 29A shows two chips and a controller that drives them, and FIG. 29B shows a functional configuration of the chip.

Referring to FIG. 29A, two chips are set in a master mode and a slave mode, and the chip 720*a* (hereinafter, referred to as a master chip) set as a master mode provides an operating start signal Enable required for simultaneous operating start to the chip 720*b* (hereinafter, referred to as a slave chip) set as a slave mode. Meanwhile, one of the two chips may provide an operating clock Clock required for simultaneous operating end to another chip.

Simultaneous driving means that the operating start time are same and the operating end time are the same. In order for the operating start time to be the same, any one of the plurality of chips must be able to notify the remaining chips of the operating start, and for the operating end time to be the same, the plurality of chips must be driven by the same clock. To this end, the chips 720*a*, 720*b* include an enable input/output pad for inputting/outputting the operating start signal Enable and a clock input/output pad for inputting/outputting the operating clock Clock as well as pads for inputting or outputting a signal required for basic driving control. Additionally or alternatively, the chips 720*a*, 720*b* may further include one or more option pads for determining the master mode or the slave mode. Using the option pad, the operation mode of each chip can be determined in advance.

The pad or contact (hereinafter, referred to as a pad) is a metal layer or terminal formed on the upper or lower surface of the chip. The pad is electrically connected to a lead frame, a printed circuit board (PCB), etc. by various means such as wires and solder balls, and is for receiving a signal from the outside or transmitting a signal to the outside through the lead frame. When the plurality of chips 720*a*, 720*b* are included in one packaging 710, for example, the enable input/output pads can be directly connected by wiring, or if the chips 720*a*, 720*b* are attached to the PCB, they can be connected indirectly by the PCB. When one chip 720*a* is included in one packaging 710*a*, for example, enable input/output pads may be electrically connected through lead frames. In summary, signal transmission between two chips through the enable input/output pad and/or the clock input/output pad is not dependent on the electrical connection method between the pads.

The master chip 720*a* and the slave chip 720*b* may communicate with the controller 750 through data line SDA_I$^2$C and one clock line SCL_I$^2$C. The controller 750 designates any one of a plurality of chips having substantially the same function as the master chip 720*a* and the remaining chips as the slave chip 720*b*. The master chip 720*a* provides the operating start signal Enable for controlling driving of the slave chip 720*b* to the plurality of slave chips 720*b* through the enable input/output pads. The controller 750 may control the operating start of one master chip 720*a*, thereby enabling the operating start of the plurality of slave chips 720*b*.

Meanwhile, the operating clock Clock may be provided by the master chip 720*a* to the slave chip 720*b* or may be provided externally. When the operating clocks are different for each of the plurality of chips, the operating end time may be also different. Therefore, in order to simultaneously drive a plurality of chips, the plurality of chips must be driven by substantially the same operating clock Clock. To this end, the master chip 720*a* provides the operating clock Clock to the plurality of slave chips 720*b* through a clock input/output pad, or the master chip 720*a* and the slave chip 720*b* can be provided the operating clock Clock externally through the clock input/output pads.

The master chip 720*a* and the slave chip 720*b* are semiconductors having substantially the same function, and as described with reference to FIGS. 27 and 28, only detection targets may be different. Referring to FIG. 29B, the master chip 720*a* and the slave chip 720*b* may include an I$^2$C communication unit 721, a register/memory 722, a peripheral circuit 723, a clock generator 724, and a photo cell area 725.

The I$^2$C communication unit 721 receives a control signal from the controller 750 through the data line SDA_I$^2$C and the clock line SCL_I$^2$C, and transmits data generated by the chips 720*a*, 720*b* to the controller 750. During I$^2$C communication, the controller 750 transmits a unique chip address allocated for each chip through the data line SDA_I$^2$C, and the I$^2$C communication unit 721 of the chip having the corresponding chip address transmits the response signal Ack through the data line SDA_I$^2$C to the controller 750, but the communication unit 721 of the remaining chips does not transmit the response signal. The controller 750 transmits register address and/or data to be stored in the corresponding register address to the I$^2$C communication unit 721 of the responding chip through the data line SDA_I$^2$C. The I$^2$C communication unit 721 stores the received data in the register address on the register/memory 722, and the peripheral circuit 723 is driven by the stored data. Meanwhile, the I$^2$C communication unit 721 transmits the measurements stored in the register/memory 722 to the controller 750 through the data line SDA_I$^2$C under the control of the controller 750.

The register/memory 722 has an address for identifying a storage location and a data storage area allocated for each address. The register/memory 722 does not need to be physically configured as one, and if necessary, the registers are embedded in the peripheral circuit 723, and the memory can be separated from the peripheral circuit 723.

The peripheral circuit 723 refers to circuits for controlling the driving of a chip, such as a driver for driving the photo cell area, a readout for reading pixel currents from the photo cell area, and an ADC for converting pixel currents into measurements. That is, the peripheral circuit 723 drives the photo cell area 725 according to the data stored in the register address on the register/memory 722 to generate analog pixel currents corresponding to the intensity of incident light and convert into digital measurements and to store in the register/memory 722. In particular, the peripheral circuit 723 is driven in the master mode or the slave mode under the control of the controller 750. When set to the master mode, the peripheral circuit 723 provides the operating start signal Enable to the slave chip 720*b*. Additionally, the peripheral circuit 723 may provide the operating clock Clock to the slave chip 720*b*. On the other hand, when set to the slave mode, the peripheral circuit 723 starts operating by the operating start signal Enable received from the master chip 720*a*, and is driven for a time corresponding to a certain number of operating clocks Clock. Clock Clock may be provided from the master chip 720*a* or externally.

The clock generator 724 generates the operating clock Clock. When the operating clock Clock is provided externally, the clock generator 724 may be omitted. When the master chip 720*a* provides the operating clock, the clock generator 724 of the slave chip 720*b* may be deactivated by the peripheral circuit 722, or the peripheral circuit 722 may operate with the operating clock Clock input through the clock input/output pad.

The photo cell area 725 is composed of a plurality of receivers 320, 330. The receivers 320, 330 may be, for example, photodiodes, but may be replaced with various light receiving devices. The receivers 320, 330 generate pixel currents corresponding to the incident light.

Figure 30:
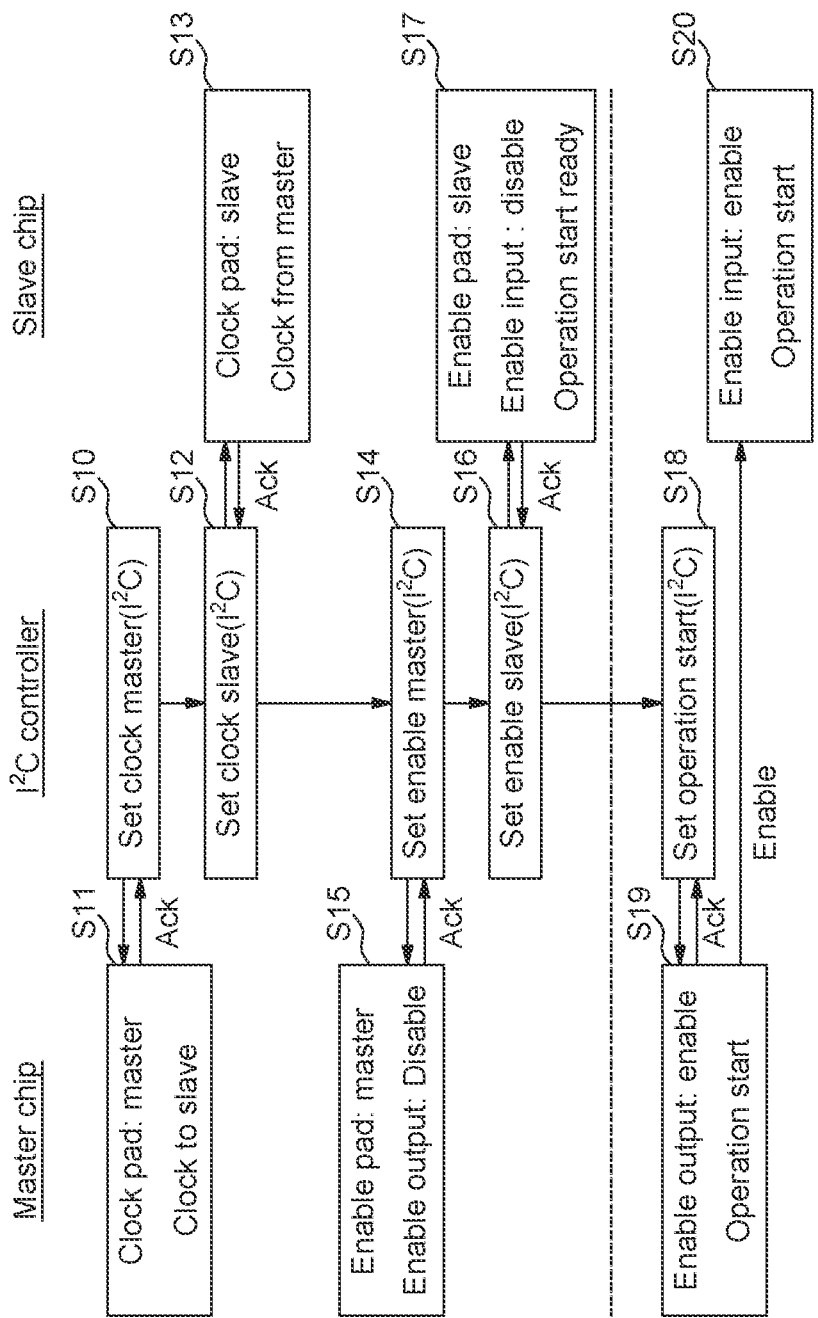
FIG. 30 exemplarily illustrates a method of simultaneously driving a plurality of chips in the configuration illustrated in FIG. 29B.

FIG. 30 exemplarily illustrates a method of simultaneously driving a plurality of chips in the configuration illustrated in FIG. 29B.

The method of driving a plurality of chips includes a master/slave setting process (S10 to S17) of setting one of the plurality of chips to the master mode and the remaining chips to the slave mode, and an operating start process (S18 to S20) of starting simultaneous driving the master chip 720a and the slave chip 720b. If the master chip 720a and the slave chip 720b are predetermined by the option pad, all of the master/slave setting process (S10 to S17) or a clock master/clock slave setting process (S10 to S13) in the master/slave setting process may be omitted.

Referring to FIG. 30, the controller 750 sets any one of a plurality of chips as a clock master (S10). The controller 750 transmits a chip address of a chip to be set as the clock master, a first register address, and a first register value (data) indicating the clock master to be stored in the first register address through the data line SDA_I$^2$C.

The chip designated as the clock master stores the first register value in the first register address and then transmits the response signal Ack through the data line SDA_I$^2$C (S11). The chip designated as the clock master provides the operating clock Clock through the clock input/output pad.

The controller 750 sets the remaining chips that are not set as the clock master among the plurality of sensors as clock slaves (S12). The controller 750 transmits a chip address of a chip to be set as the clock slave, the first register address, and a second register value indicating the clock slave to be stored in the first register address through the data line SDA_I$^2$C.

The chip designated as the clock slave stores the second register value in the first register address and then transmits the response signal Ack through the data line SDA_I$^2$C (S13). The chip designated as the clock slave receives the drive clock Clock through the clock input/output pad.

If a plurality of chips are provided with the same operating clock Clock externally, S10 to S13 may be omitted.

The controller 750 sets any one of the plurality of chips as an enable master (master chip) (S14). The controller 750 transmits a chip address of the master chip 720a, a second register address, and a third register value indicating the enable master to be stored in the second register address through the data line SDA_I$^2$C.

After storing the third register value in the second register address, the master chip 720a transmits the response signal Ack through the data line SDA_I$^2$C (S15). The master chip 720a provides an operating standby signal Disable through the enable input/output pad.

The controller 750 sets the remaining chips that are not set as the enable master among the plurality of sensors as enable slaves (slave chips) (S16). The controller 750 transmits a chip address of the slave chip 720b, the second register address, and a fourth register value indicating the enable slave to be stored in the second register address through the data line SDA_I2C.

After storing the fourth register value in the second register address, the slave chip 720b transmits the response signal Ack through the data line SDA_I$^2$C (S17). The slave chip 720b receives the operating standby signal Disable through the enable input/output pad. Accordingly, the slave chip 720b enters an operating standby state.

In one embodiment, the clock master and the enable master may be the same chip. In this case, S14 and S15 may be omitted, and a chip set as the clock master may output the operating clock Clock through the clock input/output pad and simultaneously output the operating standby signal Disable through the enable input/output pad. Meanwhile, in another embodiment, the clock master and the enable master may be different chips. In this case, the clock master may be set as the enable slave and may be driven by receiving the operating start signal Enable from the enable master, or may provide only a clock to the clock slave. That is, the clock master may be a clock generator connected to a plurality of chips through clock input/output pads.

When the controller 750 commands the master chip 720a to start operating (S18), the master chip 720a provides the operating start signal Enable to the slave chip 720b through the enable input/output pad (S19). The operating start command may include a chip address of the master chip 720a, the third register address, and a fifth register value indicating the operating start to be stored in the third register address. Accordingly, a plurality of chips designated as the master chip 720a and the slave chip 720b can start operating simultaneously.

Figure 31:
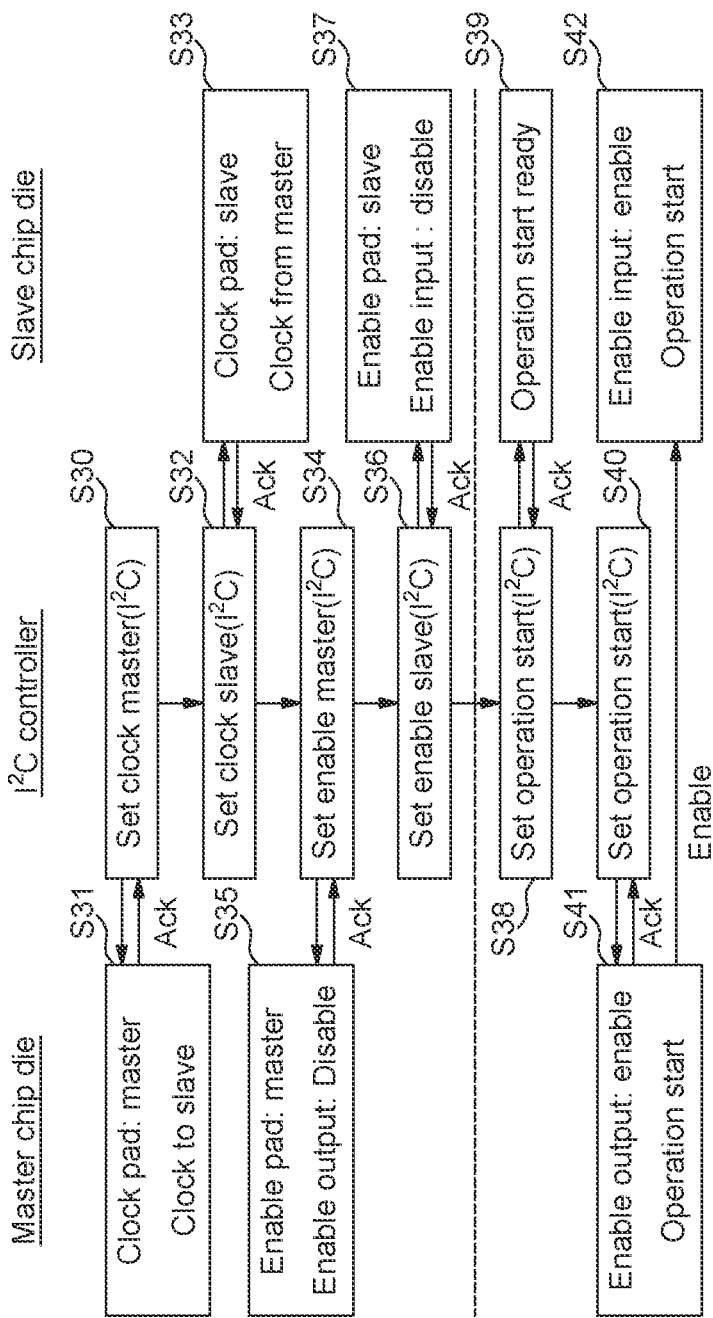
FIG. 31 exemplarily illustrates another method of simultaneously driving a plurality of chips in the configuration illustrated in FIG. 30.

FIG. 31 exemplarily illustrates another method of simultaneously driving a plurality of chips in the configuration illustrated in FIG. 30. Since S30 to S37 are the same as S10 to S17 of FIG. 30, same description will be omitted.

When the controller 750 commands the slave chip 720b to start operating (S38), the slave chip 720b transmits the response signal Ack and enters the operating standby state (S39). The operating start command may include the chip address of the slave chip 720b, the third register address, and the fifth register value indicating the operating start to be stored in the third register address. That is, the controller 750 commands the slave chip 720b to drive, and after receiving the operating start command from the controller 750, the slave chip 720b waits until receiving the operating start signal Enable from the master chip 720a.

When the controller 750 commands the master chip 720a to start operating (S40), the master chip 720a provides the operating start signal Enable to the slave chip 720b through the enable input/output pad (S41). Accordingly, the plurality of chips designated as the master chip 720a and the slave chip 720b can start to drive simultaneously.

Figure 32A:
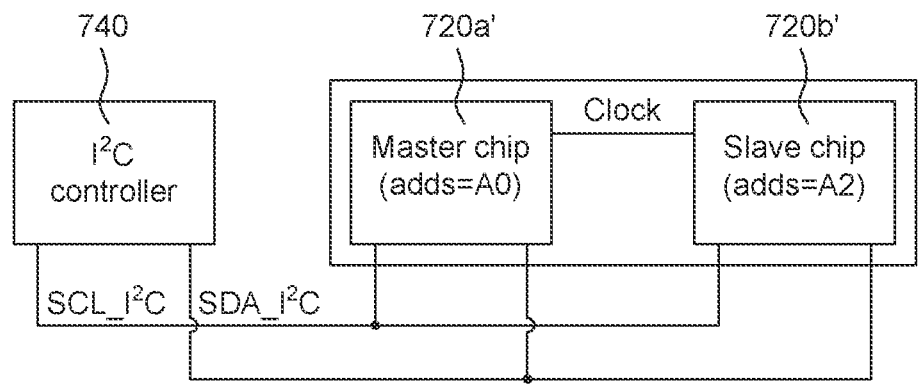
FIG. 32A and FIG. 32B exemplarily illustrate a configuration for simultaneously driving a plurality of chips.
Figure 32B:
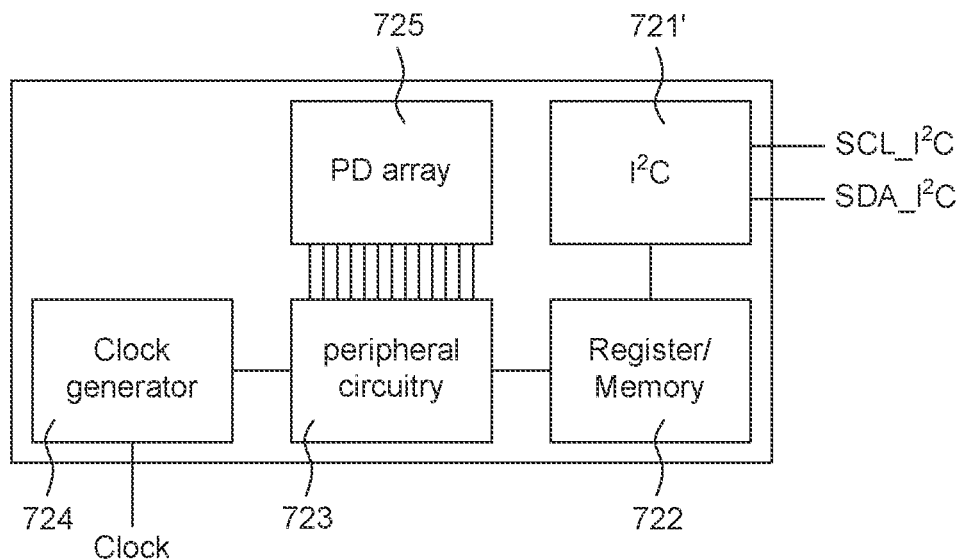

FIG. 32A and FIG. 32B exemplarily illustrate a configuration for simultaneously driving a plurality of chips, in which FIG. 32A shows two chips and a controller that drives them, and FIG. 32B shows a functional configuration of the chip. The same description as in FIG. 29A and FIG. 29B will be omitted, and differences will be described.

Referring to FIG. 32A, a plurality of chips are set to the master mode and the slave mode, respectively, and the chip 720a' set to a master mode (hereinafter, master chip) monitors operating start of chip 720' set to a slave mode (hereinafter, slave chip) to start operating. Accordingly, compared with the embodiment described with reference to FIGS. 29 through 31, the chip illustrated in FIG. 32B does not include the enable input/output pad. Meanwhile, any one of the plurality of chips may provide the operating clock Clock required for simultaneous operating end to the remaining chips.

Simultaneous driving means that the operating start time are same and the operating end time are the same. In order for the operating start time to be the same, at least one master chip 720a' among the plurality of chips must be able to measure the operating start of one slave chip 720b' and for the operating end time to be the same, the plurality of chips must be driven by the same clock. To this end, the chips 720a', 720b' include clock input/output pads for inputting and outputting the operating clock Clock. The clock input/output pad is a pad for one chip to supply the operating clock Clock to the other chip or to receive the operating clock Clock externally. Additionally or alternatively, the chips 720a', 720b' may further include one or more option pads for determining the master mode or the slave mode. Using the option pad, the operation mode of each chip can be determined in advance.

The master chip 720a' and the slave chip 720b' may communicate with the controller 750 through the data line SDA_I²C and one clock line SCL_I²C. The controller 750 designates at least one or more of a plurality of chips having substantially the same function as the master chip 720a' and designates any one of the remaining chips as the slave chip 720b'. The master chip 720a' monitors the operating start of the slave chip 720b' and starts operating substantially simultaneously with the slave chip 720b'. The controller 750 may control the operating start of the slave chip 720b', thereby enabling the operating start of one or more master chips 720a'.

Referring to FIG. 32B, the master chip 720a' and the slave chip 720b' include an I²C communication unit 721', the register/memory 722, the peripheral circuit 723, the clock generator 724, and the photo cell area 725.

The I²C communication unit 721' receives the control signal from the controller 750 through the data line SDA_I²C and the clock line SCL_I²C, and transmits data generated by the chips 720a' and 720b' to the controller 750. When operating in the master mode, the I²C communication unit 721' monitors control signals transmitted and received through the data line SDA_I²C to measure the operating start of the slave chip 720b'. Specifically, the I²C communication unit 721' knows the chip address of the slave chip 720b', the third register address in which the operation start command is to be stored, and the fifth register value corresponding to the operation start command, and when the operating start command of the slave chip 720b' is transmitted through the data line SDA_I²C, a register value corresponding to the operating start command is stored in the register of the master chip 720a' accordingly. The I²C communication unit 721' of the master chip 720a' may store the fifth register value in the register/memory 722, (1) when the slave chip 720b' transmits to the controller 750 the response signal Ack indicating that has completed receiving the third register address in which the register value indicating the operating start is stored, or (2) when the slave chip 720b' transmits to the controller the response signal Ack indicating that has completed receiving the fifth register value indicating the operating start.

Figure 33:
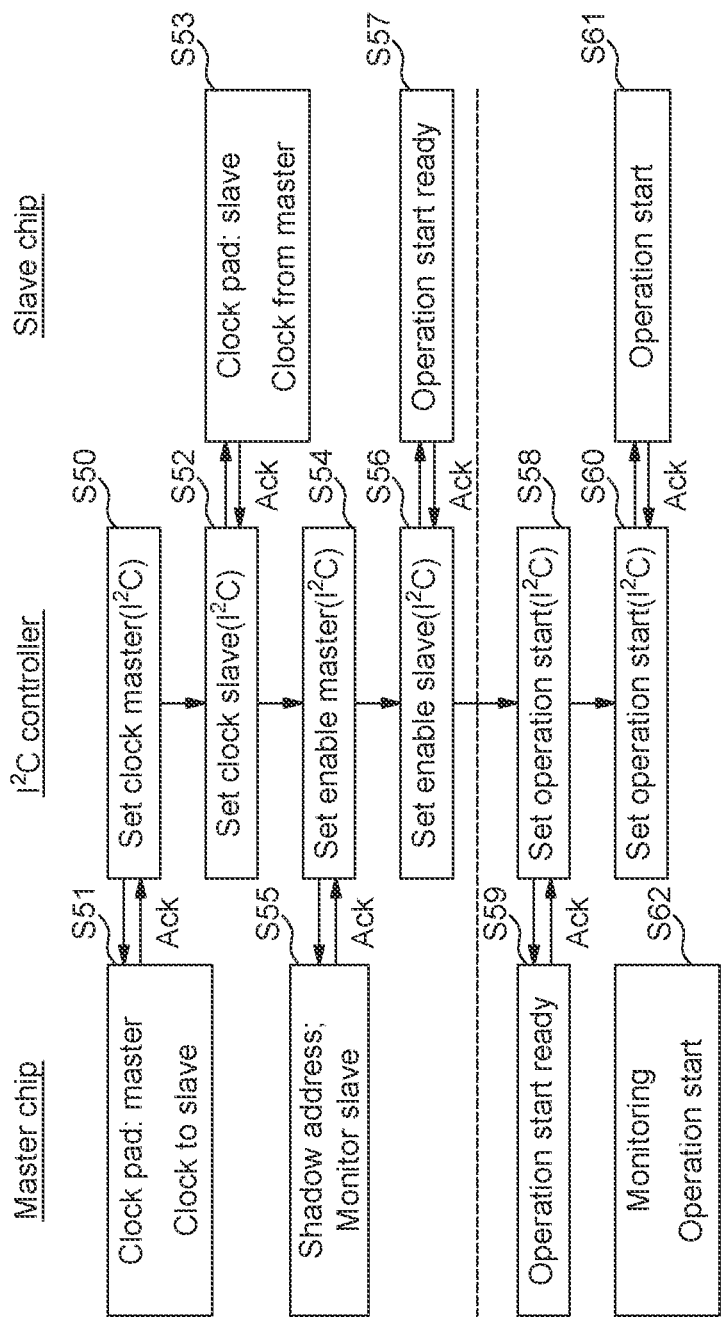
FIG. 33 exemplarily illustrates a method of simultaneously driving a plurality of chips in the configuration illustrated in FIG. 32B.

FIG. 33 exemplarily illustrates a method of simultaneously driving a plurality of chips in the configuration illustrated in FIG. 32B. Since S50 to S53 are the same as S10 to S13 of FIG. 30, same description will be omitted.

The controller 750 sets at least one or more of the plurality of chips as the master chip 720a' (S54). The controller 750 transmits a chip address of the master chip 720a', the second register address, the third register value indicating the enable master to be stored in the second register address, and the chip address of the slave chip 720b' through the data line SDA_I²C.

The master chip 720a' stores the third register value and the chip address of the slave chip 720b' in the second register address, and then transmits the response signal Ack through the data line SDA_I²C (S55). Thereafter, the master chip 720a' captures the chip address transmitted through the data line SDA_I²C and performs monitoring that compares the captured chip address with the chip address of the slave chip 720b' stored in the second register address.

During monitoring, even if the master chip 720a' receives the chip address of the slave chip 720b', it only compares and does not transmit the response signal Ack. When the chip address of the slave chip 720b' is captured and the slave chip 720b' transmits the response signal Ack, the master chip 720a' captures the register address transmitted from the controller 750 and checks whether the captured register address is the third register address in which the fifth register value indicating the operating start is stored. When the slave chip 720b' transmits the response signal Ack, the master chip 720a' captures the register value transmitted from the controller 150 and checks whether it is the fifth register value indicating the operating start.

After monitoring of the master chip 720a' starts, the controller 750 sets any one of the plurality of sensors as a slave chip (S56). The controller 750 transmits a chip address of the slave chip 720b', the second register address, and the fourth register value indicating the enable slave to be stored in the second register address through the data line SDA_I²C.

The slave chip 720b' stores the fourth register value in the second register address and then transmits the response signal Ack through the data line SDA_I²C (S57). The slave chip 720b' enters the operating standby state.

When the controller 750 commands the master chip 720a' to start operating (S58), the master chip 720a' transmits the response signal Ack and enters the operating standby state (S59). The operating start command may include a chip address of the master chip 720a', the third register address, and the fifth register value indicating the operating start to be stored in the third register. That is, although the controller 750 commands the master chip 720a' to start operating, but the master chip 720a' wait until the slave chip 720b' being monitored receives the command to start operating from the controller 750.

When the controller 750 commands the slave chip 720b' to start operating (S60), the slave chip 720b' transmits the response signal Ack to start operating (S61). The operating start command may include a chip address of the slave chip 720b', the third register address, and the fifth register value indicating the operating start to be stored in the third register address.

When the master chip 720a' captures the chip address of the slave chip 720b', it starts operating by the register address and the response signal Ack to be transmitted thereafter, or by the register value or response signal Ack for receiving the register value (S62). Accordingly, the plurality of chips designated as the master chip 720a' and the slave chip 720b' can start operating simultaneously.

The aforementioned description for the present invention is exemplary, and those skilled in the art can understand that the invention can be modified in other forms without changing the technical concept or the essential feature of the invention. Therefore, it should be understood that the embodiments described above are illustrative and non-limiting in all respects. In particular, the features of the present invention described with reference to the drawings are not limited to the structures shown in the specific drawings, and may be implemented independently or in combination with other features.

The scope of the invention is defined by the appended claims, not by the above detailed description, and it should be construed that all changes or modifications derived from the meanings and scope of the claims and equivalent concepts thereof are included in the scope of the invention.

What is claimed is:

1. An under-display sensor of measuring brightness of ambient light and being disposed under a display having a pixel configured for generating light, and a display retardation layer and a display polarization layer, both being disposed over the pixel, comprising:
   a light selection layer, having a first optical path and a second optical path through which a display circularly-polarized light generated by an ambient light and an unpolarized light generated by a pixel pass;
   an optical sensor, having a first receiver configured for measuring light that has passed the first optical path and a second receiver configured for measuring light that has passed the second optical path; and
   a color filter layer, interposed between the light selection layer and the optical sensor, and configured for passing light that has passed the first optical path and the second optical path for each wavelength band,
   wherein the first optical path passes all of the display circularly-polarized light and the unpolarized light,
   wherein the second optical path blocks the display circularly-polarized light and passes the unpolarized light.

2. The under-display sensor according to claim 1, wherein the light selection layer comprises:
   a first sensor retardation layer, having a first slow axis and extending in a first direction;
   a second sensor retardation layer, being alternately disposed with the first sensor retardation layer, having a second slow axis perpendicular to the first slow axis, and extending in the first direction;
   a first sensor polarization layer, being disposed under the first sensor retardation layer and the second sensor retardation layer, configured for forming the first optical path under the first sensor retardation layer and the second optical path under the second sensor retardation layer, and extending in a second direction; and
   a second sensor polarization layer, being alternately disposed with the first sensor polarization layer under the first sensor retardation layer and the second sensor retardation layer, configured for forming the second optical path under the first sensor retardation layer and the first optical path under the second sensor retardation layer, and extending in the second direction.

3. The under-display sensor according to claim 1, wherein the light selection layer comprises:
   a first sensor retardation layer;
   a first sensor polarization layer, configured for forming the first optical path under the first sensor retardation layer; and
   a second sensor polarization layer, configured for forming the second optical path under the first sensor retardation layer,
   wherein the first sensor polarization layer and the second sensor polarization layer are disposed in a zigzag arrangement.

4. The under-display sensor according to claim 1, wherein the light selection layer comprises:
   a first sensor retardation layer, having a first slow axis and extending in a second direction;
   a second sensor retardation layer, being alternately disposed with the first sensor retardation layer, having a second slow axis orthogonal to the first slow axis, and extending in the second direction; and
   a first sensor polarization layer, being disposed under the first sensor retardation layer and the second sensor retardation layer, and configured for forming the first optical path under the first sensor retardation layer and the second optical path under the second sensor retardation layer.

5. The under-display sensor according to claim 1, wherein the light selection layer comprises:
   a first sensor retardation layer;
   a first sensor polarization layer, configured for forming the first optical path under the first sensor retardation layer; and
   a second sensor polarization layer, being alternately disposed with the first sensor polarization layer, and configured for forming the second optical path under the first sensor retardation layer.

6. The under-display sensor according to claim 1, wherein the first receiver is configured for measuring a first sensor linearly-polarized light derived from the display circularly-polarized light and a second sensor linearly-polarized light derived from the unpolarized light, and the second receiver is configured for measuring a third sensor linearly-polarized light derived from the unpolarized light.

7. The under-display sensor according to claim 1, wherein the first receiver and the second receiver are configured for measuring light in the same wavelength band.

8. The under-display sensor according to claim 7, wherein the color filter layer comprises a plurality of repeated unit color patterns, wherein the unit color pattern is composed of 2n×N (n, N are natural numbers greater than 1, N is the number of types of color filter) color filters, wherein the unit color pattern comprises 2n same-type color filter.

9. The under-display sensor according to claim 8, wherein the first receiver in the unit color pattern is disposed under n of 2n same-type color filters and the second receiver in the unit color pattern is disposed under remaining n same-type color filters, respectively.

10. The under-display sensor according to claim 9, wherein two same-type color filters in the unit color pattern are disposed to contact each other.

11. The under-display sensor according to claim 9, wherein two same-type color filters in the unit color pattern are disposed to be spaced apart.

12. The under-display sensor according to claim 8, wherein the optical sensor measures the brightness of light for each of N wavelength bands by use of N types of color filters.

13. The under-display sensor according to claim 12, wherein a plurality of the first receivers and a plurality of the second receivers respectively measure the brightness of light from a sensor detection region defined on a bottom surface of the display,
   wherein a plurality of measurements are used to calculate an average brightness of light from the sensor detection region.

14. The under-display sensor according to claim 7 the color filter layer having a plurality of single color filters,
   wherein a plurality of the first receivers and a plurality of second receivers are disposed under the single color filter.

15. The under-display sensor according to claim 14, wherein the plurality of single color filters comprising:
   a red color filter, configured for passing light belonging to a red wavelength band;

a green color filter, configured for passing light belonging to a green wavelength band; and a blue color filter, configured for passing light belonging to a blue wavelength band.

16. The under-display sensor according to claim 14, wherein the optical sensor measures brightness of light for each of a plurality of wavelength bands by use of the plurality of single color filters.

17. The under-display sensor according to claim 14, wherein a unit transmission pattern composed of the first optical path and the second optical path defined by the light selection layer is repeated under each of the plurality of single color filters.

18. The under-display sensor according to claim 17, wherein the unit transmission pattern is composed of two first optical paths and two second optical paths, wherein same type of optical paths are disposed diagonally.

19. The under-display sensor according to claim 18, wherein the unit transmission pattern is composed of two first optical paths and two second optical paths, wherein same type of optical paths are disposed to contact each other.

20. The under-display sensor according to claim 18, wherein the unit transmission pattern is composed of one first optical path and one second optical path.

21. The under-display sensor according to claim 14, wherein the plurality of the first receivers and the second receivers located in a same color receiving area receive light from a same pixel region on a pixel layer of the display.

22. The under-display sensor according to claim 21, wherein the plurality of the first receivers and the second receivers respectively measure brightness of light from the same pixel region,
wherein a plurality of measurements are used to calculate an average brightness of light from the same pixel region.

23. An under-display sensor of measuring brightness of ambient light and being disposed under a display having a pixel configured for generating light, and a display retardation layer and a display polarization layer, both being disposed over the pixel, comprising:
a light selection layer, having a first optical path and a second optical path through which a display circularly-polarized light generated by an ambient light and an unpolarized light generated by a pixel pass, wherein the light selection layer comprises:
a first sensor retardation layer, having a first slow axis;
a second sensor retardation layer, having a second slow axis orthogonal perpendicular to the first slow axis; and
a sensor polarization layer, configured for forming the first optical path under the first sensor retardation layer and the second optical path under the second sensor retardation layer,
wherein the first sensor retardation layer and the second sensor retardation layer are disposed in a zigzag arrangement;
an optical sensor, having a first receiver configured for measuring light that has passed the first optical path and a second receiver configured for measuring light that has passed the second optical path;
wherein the first optical path passes all of the display circularly-polarized light and the unpolarized light,
wherein the second optical path blocks the display circularly-polarized light and passes the unpolarized light.

24. An under-display sensor of measuring brightness of ambient light and being disposed under a display having a pixel configured for generating light, and a display retardation layer and a display polarization layer, both being disposed over the pixel, comprising:
a light selection layer, having a first optical path and a second optical path through which a display circularly-polarized light generated by an ambient light and an unpolarized light generated by a pixel pass, wherein the light selection layer comprises:
a first sensor retardation layer;
a first light transmission layer, being alternately disposed with the first sensor retardation layer;
a second sensor polarization layer, configured for forming the second optical path under the first sensor retardation layer; and
a second light transmission layer, configured for forming the first optical path under the first light transmission layer;
an optical sensor, having a first receiver configured for measuring light that has passed the first optical path and a second receiver configured for measuring light that has passed the second optical path;
wherein the first optical path passes all of the display circularly-polarized light and the unpolarized light,
wherein the second optical path blocks the display circularly-polarized light and passes the unpolarized light.

25. An under-display sensor of measuring brightness of ambient light and being disposed under a display having a pixel configured for generating light, and a display retardation layer and a display polarization layer, both being disposed over the pixel, comprising:
a light selection layer, having a first optical path and a second optical path through which a display circularly-polarized light generated by an ambient light and an unpolarized light generated by a pixel pass; and
an optical sensor, having a first receiver configured for measuring light that has passed the first optical path and a second receiver configured for measuring light that has passed the second optical path;
wherein the first optical path passes all of the display circularly-polarized light and the unpolarized light, and the second optical path blocks the display circularly-polarized light and passes the unpolarized light;
wherein the first receiver and the second receiver are respectively located in at least two chips that are physically separated,
wherein the under-display sensor is simultaneously driven under the control of a controller when at least two chips are connected to the controller through $I^2C$ communication.

26. The under-display sensor according to claim 25, wherein each of the two or more chips comprises:
an enable input/output pad;
an $I^2C$ communication unit configured for receiving a first register value designating any one of a master chip and a slave chip and a second register value indicating an operating start from the controller through a data line;
a register/memory configured for storing the first register value in a first register address and storing the second register value in a second register address; and
a peripheral circuit configured for outputting an operating standby signal through the enable input/output pad when set as the master chip by the first register value, and configured for outputting an operating start signal through the enable input/output pad based on the second register value.

27. The under-display sensor according to claim 26, wherein when set as the slave chip by the first register value, the peripheral circuit is configured for receiving the operating standby signal through the enable input/output pad, and is configured for starting when receiving the operating start signal through the enable input/output pad.

28. The under-display sensor according to claim 26 further comprising a clock input/output pad for providing an operating clock to another chip connected through the I²C communication when set as a clock master by the controller, and is configured for receiving the operating clock from one of the other chips or from an external device when set as a clock slave.

29. The under-display sensor according to claim 27 further comprising a clock generator configured for generating the operating clock to be outputted through the clock input/output pad.

30. The under-display sensor according to claim 26, wherein the two or more chips start operating at a same operating start time and operating end at a same operating end time.

31. The under-display sensor according to claim 25, wherein each of the two or more chips comprise:
   an I²C communication unit configured for receiving a register value designating any one of a master chip and a slave chip from the controller through a data line, and configured for monitoring an operating start of the slave chip through the data line;
   a register/memory for storing the register value; and
   a peripheral circuit configured for starting when set as the master chip by the register value and the slave chip being monitored starts operating.

32. The under-display sensor according to claim 31, wherein when set to the master chip by the register value, the I²C communication unit is configured for:
   storing a chip address of the slave chip provided by the controller;
   capturing a chip address being transmitted through the data line and comparing the stored chip address with the capture chip address;
   if the captured chip address is the same as the stored chip address, capturing a register address being transmitted to the slave chip; and
   comparing the captured register address with a register address in which a register value indicating the operating start is stored,
   wherein the master chip does not transmit a response signal to the controller even if the captured chip address is the same as the stored chip address.

33. The under-display sensor according to claim 32, wherein the peripheral circuit is configured for starting when the captured register address is the register address in which the register value indicating the operating start is stored.

34. The under-display sensor according to claim 32, wherein the I²C communication unit is configured for capturing the register value being transmitted to the slave chip, if the captured register address is the register address in which the register value indicating operating start is to be stored,
   wherein the peripheral circuit is configured for starting when the captured register value is the register value indicating the operating start.

35. The under-display sensor according to claim 31, wherein when the controller transmits an operating start command, the peripheral circuit waits until the slave chip starts operating.

36. The under-display sensor according to claim 31 further comprising a clock input/output pad for providing an operating clock to another chip connected through the I²C communication when set as a clock master by the controller, and is configured for receiving the operating clock from one of the other chips or from an external device when set as a clock slave.

* * * * *